US009321926B2

United States Patent
Katoh et al.

(10) Patent No.: US 9,321,926 B2
(45) Date of Patent: Apr. 26, 2016

(54) INK FOR INKJET RECORDING, INK CARTRIDGE, AND INK-RECORDED MATTER

(71) Applicants: Keita Katoh, Shizuoka (JP); Shigeyuki Harada, Shizuoka (JP); Masayuki Fukuoka, Shizuoka (JP); Mitsuru Naruse, Shizuoka (JP); Masayasu Nonogaki, Shizuoka (JP); Akihiko Matsuyama, Shizuoka (JP); Kazukiyo Nagai, Shizuoka (JP); Yuusuke Koizuka, Shizuoka (JP)

(72) Inventors: Keita Katoh, Shizuoka (JP); Shigeyuki Harada, Shizuoka (JP); Masayuki Fukuoka, Shizuoka (JP); Mitsuru Naruse, Shizuoka (JP); Masayasu Nonogaki, Shizuoka (JP); Akihiko Matsuyama, Shizuoka (JP); Kazukiyo Nagai, Shizuoka (JP); Yuusuke Koizuka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/676,168

(22) Filed: Apr. 1, 2015

(65) Prior Publication Data

US 2015/0291817 A1 Oct. 15, 2015

(30) Foreign Application Priority Data

Apr. 15, 2014 (JP) ................................. 2014-083468
Apr. 21, 2014 (JP) ................................. 2014-087241
Jan. 30, 2015 (JP) ................................. 2015-016883

(51) Int. Cl.
*C09D 11/30* (2014.01)
*C09D 11/107* (2014.01)
*C09D 11/326* (2014.01)

(52) U.S. Cl.
CPC ............ *C09D 11/107* (2013.01); *C09D 11/326* (2013.01)

(58) Field of Classification Search
CPC .................................................. C09D 11/107
USPC .................................................. 523/160, 161
See application file for complete search history.

(56) References Cited

U.S. PATENT DOCUMENTS

| | | | |
|---|---|---|---|
| 2011/0009540 A1* | 1/2011 | Terrenoire ............ | C08F 220/18 524/145 |
| 2012/0242741 A1 | 9/2012 | Hasegawa et al. | |
| 2012/0328854 A1 | 12/2012 | Matsuyama et al. | |
| 2014/0072779 A1 | 3/2014 | Matsuyama et al. | |
| 2014/0120331 A1 | 5/2014 | Koizuka et al. | |
| 2014/0141209 A1 | 5/2014 | Koizuka et al. | |
| 2014/0198160 A1 | 7/2014 | Harada et al. | |
| 2014/0199530 A1 | 7/2014 | Katoh et al. | |
| 2014/0242352 A1 | 8/2014 | Naruse et al. | |
| 2015/0056425 A1 | 2/2015 | Nagai et al. | |
| 2015/0064418 A1 | 3/2015 | Matsuyama et al. | |
| 2015/0064425 A1 | 3/2015 | Matsuyama et al. | |

FOREIGN PATENT DOCUMENTS

| | | |
|---|---|---|
| JP | 2003-147243 | 5/2003 |
| JP | 2009-513802 | 4/2009 |
| JP | 2011-515527 | 5/2011 |
| JP | 2011-122072 | 6/2011 |
| JP | 2013-103954 | 5/2013 |
| JP | 2013-204025 | 10/2013 |
| WO | WO 2007/053563 * | 5/2007 |
| WO | WO2007/053563 A2 | 5/2007 |
| WO | WO2009/115607 A1 | 9/2009 |

OTHER PUBLICATIONS

U.S. Appl. No. 14/505,667, filed Oct. 3, 2014.
U.S. Appl. No. 14/524,189, filed Oct. 27, 2014.
U.S. Appl. No. 14/674,361, filed Mar. 31, 2015 Inventor: Nonogaki, et al.

* cited by examiner

*Primary Examiner* — Doris Lee
(74) *Attorney, Agent, or Firm* — Oblon, McClelland, Maier & Neustadt, L.L.P.

(57) ABSTRACT

An ink for inkjet recording includes water; a hydrosoluble solvent; a pigment; and a copolymer including a phosphonic acid group. The copolymer including a phosphonic acid group includes structural units having the following formulae (1) and (2):

$$\begin{array}{c} R1 \\ | \\ -CH_2-C- \\ | \\ C=O \\ | \\ O^-M^+ \quad O \quad O^-M^+ \\ \phantom{O^-M^+}| \phantom{O}| \phantom{O}| \\ O=P-C-P=O \\ | \phantom{O}| \phantom{O}| \\ O^-M^+ \quad CH_3 \quad O^-M^+ \end{array} \quad (1)$$

wherein R1 represents a hydrogen atom or a methyl group; and M represents a hydrogen atom, an alkali metal or an organic ammonium; and $$\begin{array}{c} R2 \\ | \\ -CH_2-C- \\ | \\ C=O \\ | \\ O-(CH_2-CH_2-O)_n-(CH_2-CH_2-CH_2-O)_m-R3 \end{array} \quad (2)$$

wherein R2 represents a hydrogen atom or a methyl group; R3 represents an alkyl group having 1 to 4 carbon atoms; and each of n and m represents 0 or an integer of from 1 to 30, provided n+m is from 2 to 30.

18 Claims, 4 Drawing Sheets

INK FOR INKJET RECORDING, INK CARTRIDGE, AND INK-RECORDED MATTER

CROSS-REFERENCE TO RELATED APPLICATIONS

This patent application is based on and claims priority pursuant to 35 U.S.C. §119 to Japanese Patent Applications Nos. 2014-083468, 2015-016883 and 2014-087241 filed on Apr. 15, 2014, Jan. 30, 2015 and Apr. 21, 2014, respectively in the Japan Patent Office, the entire disclosure of which is hereby incorporated by reference herein.

BACKGROUND

1. Technical Field

The present invention relates to an ink for inkjet recording, and an ink cartridge and a recorded matter using the ink.

2. Description of the Related Art

Recently, inkjet recording methods have been popular as image forming methods because of having advantages of having simpler process and easier full-colorization than the other recording methods, and producing high-resolution images even with an apparatus having simple composition. The inkjet recording methods have a small amount of ink soar and adhere to recording media such as papers to form images thereon with an inkjet recorder, and applications thereof are expanding, e.g., personal and industrial printers and printings.

In the inkjet recorder, an aqueous ink using a hydrosoluble dye is mostly used as a colorant. However, the ink has disadvantages of having poor weatherability and water resistance. Therefore, a pigment ink using a pigment instead of the hydrosoluble dye has been studied recently. However, the pigment ink is still inferior to the dye ink in colorability, ink discharge stability and preservation stability. In company with improvement of higher-quality image technology of OA printers, even when recorded on plain papers as recording media with the pigment ink, image density equivalent to that of the dye ink is required. However, the pigment ink penetrates into a plain paper as a recording medium and pigment density at the surface of the paper lowers, resulting in lower image density. In order to dry the ink adhering to the recording medium quicker to print quicker, a penetrant is added to the ink for water to penetrate into the recording medium. Then, not only water but also pigment penetrates deeper into the recording medium, resulting in lower image density.

Various methods are disclosed to improve image density. Japanese Patent No. JP-5001291-B2 (PCT Japanese published national phase application No. 2009-513802) discloses an inkjet composition including a liquid vehicle, a colorant, and a polymer having at least one functional group having a specific calcium index value. Monomers forming the polymer include 4-methacrylamide-1-hydroxybutane-1,1-diphosphonic acid. The colorant is destabilized by the diphosphonic acid group and Ca salt in a paper when contacting the paper, and the resultant printed image improves in quality.

Japanese published unexamined application No. JP-2011-122072-A discloses an ink used for recording on a paper including a hydrosoluble multivalent metal salt. The ink includes (a) a pigment and (b) at least one compound having no surface activating ability, a molecular weight of from 150 to 10000, and a content rate of phosphorous ((p/molecular weight)×100) from a functional group selected from a functional group having a basic skeleton of phosphoric acid and functional group having a basic skeleton of phosphonic acid not less than 1.4. Further, the ink includes the (b) compound of from 1.5 to 10.0% by weight.

Japanese published unexamined application No. JP-2013-103954-A discloses adding a salt having a specified concentration to a self-dispersion type pigment ink to improve intermittent discharge stability, and image density and uniformity of the printed matter due to interaction between a functional group of the self-dispersion type pigment and an electrolyte (the salt).

Japanese Patent No. JP-5001291-B2 does not use a polymer as a dispersant and an additive, but covers a colorant with the polymer. A functional group of the polymer has a diphosphonic acid group adjacent to a hydroxyl group, and the ink has low dispersion stability probably because diphosphonic acid group and the hydroxyl group tend to be bonded by hydrogen bond. 4-methacrlyamide-1-hydroxy-butane-1,1-diphosphonic acid is disclosed as a monomer forming the polymer. However, neither a monomer having the following formula (3) used in the present invention nor a copolymer using the following formulae (3) and (4) is disclosed, and an effect of improving dispersion stability of a pigment is not disclosed, either.

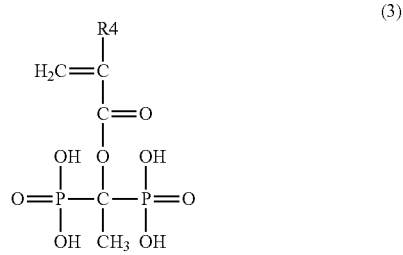

wherein R4 represents a hydrogen atom or a methyl group.

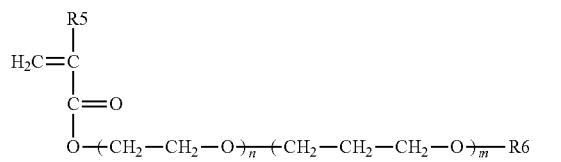

wherein R5 represents a hydrogen atom or a methyl group; R6 represents an alkyl group having 1 to 4 carbon atoms; and each of n and m represents 0 or an integer of from 1 to 30, provided n+m is from 2 to 30.

Japanese published unexamined application No. JP-2011-122072-A discloses none of a copolymer using the formulae (3), effect of image density improvement, and reduction effect of strike-through and dispersion stability of a pigment of a plain paper having a low content of a hydrosoluble multivalent metal salt.

Japanese published unexamined application No. JP-2013-103954-A is assumed to lower the preservability of an ink because of adding salt to the ink to destabilize dispersion sate of a dispersion.

SUMMARY

Accordingly, one object of the present invention is to provide an ink for inkjet recording, producing images having high image density even on a plain paper, reducing strike-through of images, and having good storage stability including a pigment having good dispersion stability in a pigment dispersion and the ink.

Another object of the present invention is to provide an ink cartridge containing the ink.

A further object of the present invention is to provide an inkjet recorder using the ink.

Another object of the present invention is to provide a recorded matter recorded by the ink.

These objects and other objects of the present invention, either individually or collectively, have been satisfied by the discovery of an ink for inkjet recording, including water; a hydrosoluble solvent; a pigment, and a copolymer including a phosphonic acid group, wherein the copolymer including a phosphonic acid group includes structural units having the following formulae (1) and (2):

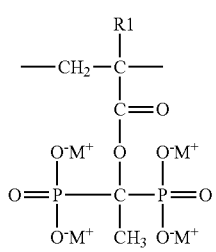
(1)

wherein R1 represents a hydrogen atom or a methyl group; and M represents a hydrogen atom, an alkali metal or an organic ammonium; and

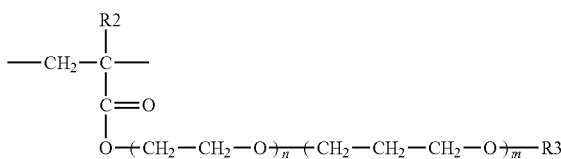
(2)

wherein R2 represents a hydrogen atom or a methyl group; R3 represents an alkyl group having 1 to 4 carbon atoms; and each of n and m represents 0 or an integer of from 1 to 30, provided n+m is from 2 to 30.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
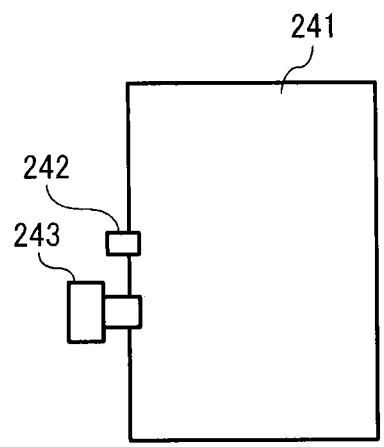
FIG. 1 is a schematic plain view illustrating an embodiment of the ink cartridge of the present invention.

The present invention provides an ink for inkjet recording, producing images having high image density even on a plain paper, reducing strike-through of images, and having good storage stability including a pigment having good dispersion stability in a pigment dispersion and the ink.

The phosphonic acid group having the formula (1) is hydrophilic, but hydrophobized when reacted with ions such as Ca ion, Mg ion and Al ion. Therefore, an ink using a copolymer including the phosphoric acid group and the phosphonic acid group as a pigment dispersant is used on a recording medium including a hydrosoluble multivalent metal salt, the pigment dispersant is reacted with a multivalent metal ion eluted from the recording medium to be hydrophobized and the pigment agglomerates. As a result, the pigment becomes difficult to penetrate in a paper and the resultant image has higher image density. Further, strike though that an image is seen through the paper can be reduced.

However, since the multivalent metal ion is scarcely eluted from a PPC plain paper including almost no hydrosoluble multivalent metal salt, the image density hardly improves due to the pigment agglomeration.

In order to solve the problem, a method of using a copolymer having a phosphonic acid group which is a hydrophilic functional group and a method of increasing a ratio of hydrophobic structural units in a pigment dispersant to increase adsorbability between the dispersant and the pigment can be thought. However, when a phosphonic acid group is introduced in a copolymer, the pigment lowers in dispersibility, and viscosity increases when the pigment dispersion and the hydrosoluble solvent are mixed probably because interactions between phosphonic acid groups increase. When a ratio of hydrophobic structural units is increased, the pigment lowers in dispersion stability in the pigment dispersion and the ink, resulting in increase of viscosity.

A combination of the structural units having the formulae (1) and (2) solves the problem, images having high image density can be produced even on a plain paper having a low content of the hydrosoluble multivalent metal salt or including only an insoluble metal salt. Further, the pigment has good dispersion stability in the pigment dispersion and the ink.

In addition to this combination, a structural unit having any one of the following formulae (5) to (9) is combined to obtain an ink having good storage stability as well.

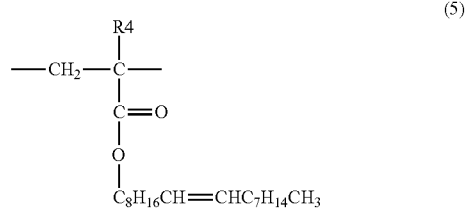
(5)

wherein R4 represents a hydrogen atom or a methyl group.

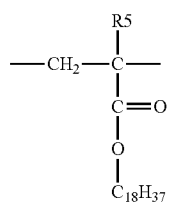
(6)

wherein R5 represents a hydrogen atom or a methyl group.

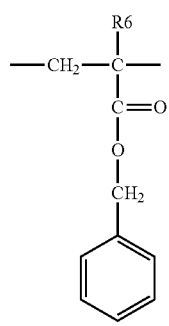
(7)

wherein R represents a hydrogen atom or a methyl group.

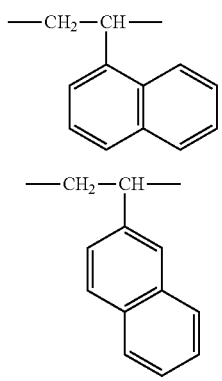
(8)

(9)

The effects of the structural unit having the formula (1), the structural unit having the formula (2), and the structural units having the formulae (5) to (9) are as follows.

[1] The structural unit having the formula (1) increases reactivity of the copolymer with a metal ion. When an ink including the copolymer lands on a paper, the pigment easily agglomerates. As a result, the resultant image has very high image density and strike-through is reduced.

[2] The structural unit having the formula (2) has high affinity with the hydrosoluble solvent and prevents an ink in which a pigment dispersion including the copolymer and the hydrosoluble solvent are mixed from increasing in viscosity, which is advantageous to discharge the ink.

[3] The structural unit having any one of the formulae (5) to (9) improves adsorbability of the copolymer to a pigment, and the pigment improves in dispersion stability when used as a dispersant. Further, when the copolymer reacts with a metal ion, the pigment easily agglomerates. As a result, the resultant image has higher image density <Copolymer>

The copolymer of the present invention includes the structural unit having the formula (1), the structural unit having the formula (2), the structural unit having any one of the formulae (5) to (9), and other structural units when necessary.

Specific examples of the alkali metal of M in the formula (1) include, but are not limited to, lithium, sodium and potassium.

Specific examples of the organic amine in the organic ammonium include, but are not limited to, alkyl amines such as mono, di or trimethylamine and mono, di or triethylamine; alcohol amines such as ethanol amine, diethanolamine, triethanolamine, methylethanolamine(2-(methylamine)ethanol), methyldiethanolamine, dimethylethanolamine, monopropanolamine, dipropanolamine, tripropanolamine, isopropanolamine, trishydroxymethylaminomethane and 2-amino-2-ethyl-1,3propanedil (AEPD); and cyclic amine such as choline, morpholine, N-methylmorpholine, N-methyl-2-pyrrolidone and 2-pyrrolidone.

Particularly, the sodium ion or the potassium is preferably used in terms of image density and storage stability.

The copolymer preferably includes hydrogen atoms in an amount not greater than 30% based on total number of M in the formula (1) to improve reactivity with a calcium ion or a multivalent metal ion and expect image density improvement.

The structural unit having the formula (1) preferably has the following formula (10):

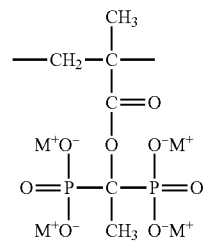
(10)

wherein M represents a hydrogen atom, an alkali metal or an organic ammonium.

The structural unit having the formula (2) preferably has n of 9 and m of 0.

The structural unit having the formula (6) or (7) preferably has the following formula (11) or (12):

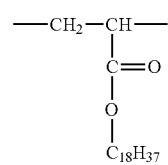
(11)

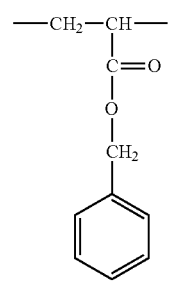
(12)

The copolymer of the present invention may include other structural units coming from polymerizable monomers besides the structural unit having the formula (1), the structural unit having the formula (2) and the structural unit having any one of the formulae (5) to (9).

Specific examples of the polymerizable monomer include, but are not limited to, polymerizable hydrophobic monomers and polymerizable hydrophilic monomers.

Specific examples of the polymerizable hydrophobic monomers include, but are not limited to, unsaturated ethylene monomers having an aromatic ring such as styrene, α-methylstyrene, 4-t-butylstyrene and 4-chloromethylestyrene; alkyl(meth)acrylate such as methyl(meth)acrylate, ethyl(meth)acrylate, n-butyl(meth)acrylate, dimethyl maleate, dimethyl itaconate, dimethyl fumarate, lauryl(meth)acrylate (C12), tridecyl(meth)acrylate (C13), tetradecyl(meth)acrylate (C14), pentadecyl(meth)acrylate (C15), hexadecyl(meth)acrylate (C16), heptadecyl(meth)acrylate (C17), nonadecyl(meth)acrylate (C19), eicosyl(meth)acrylate (C20), heneicosyl(meth)acrylate (C21) and docosyl(meth)acrylate (C22); unsaturated ethylene monomers having an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene and 1-docosene.

These can be used alone or in combination.

Specific examples of the polymerizable hydrophilic monomers include, but are not limited to, anionic unsaturated ethylene monomers such as a (meth)acrylic acid or its salt, a maleic acid or its salt, monomethyl maleate, an itaconic acid, monomethyl itaconate, a fumaric acid, 4-styrenesulfonic acid and 2-acrylamide-2-methylpropane sulfonic acid; and non-ionic unsaturated ethylene monomers such as (meth)acrylic acid-2-hydroxyethyl, diethyleneglycol mono(meth)acrylate, triethyleneglycol mono(meth)acrylate, tetraethyleneglycol mono(meth)acrylate, polyethyleneglycol mono(meth)acrylate, (meth)acrylamide, N-methylol(meth)acrylamide, N-vinyl formamide, N-vinyl acetoamide, N-vinyl pyrrolidone, acrylamide, N,N-dimethylacrylamide, N-t-butylacrylamide, N-octyl acrylamide and N-t-octyl acrylamide.

These can be used alone or in combination.

Specific examples of the monomers having the formula (4) include monomers having the following formula (4-1) to (4-7).

(4-1): methoxy polyethylene glycol acrylate (MPEGA)
(4-2): methoxy polyethylene glycol methacrylate (MPEGMA 9)
(4-3): ethoxy diethylene glycol acrylate (EDEGA)
(4-4): butoxy diethylene glycol methacrylate (BDEGMA)
(4-5): methoxy triethylene glycol acrylate (MTEGA)
(4-6): methoxy polyethylene glycol methacrylate (MPEGMA 30)
(4-7): methoxy dipropylene glycol acrylate (MDPGA)

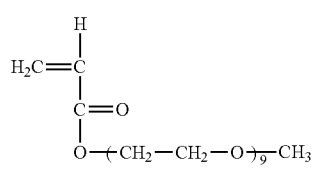

(4-1)

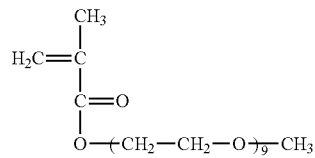

(4-2)

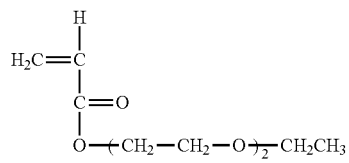

(4-3)

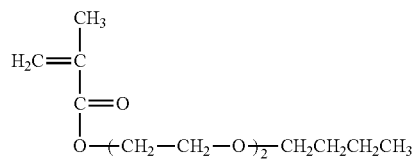

(4-4)

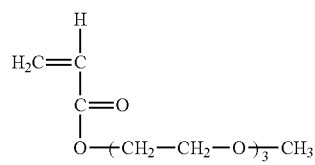

(4-5)

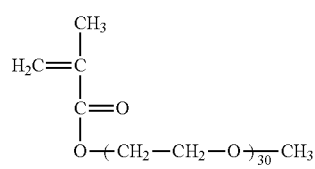

(4-6)

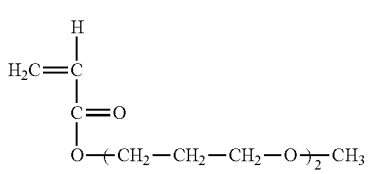

(4-7)

The copolymer preferably includes the structural unit represented by the formula (1), but are not limited to, in an amount of from 10 to 60% by weight, and more preferably from 20 to 40% by weight. When 10 to 60% by weight, the ink produces images having high image density, and improves in pigment dispersion stability and storage stability.

The copolymer preferably includes the structural unit represented by the formula (2) in an amount of from 10 to 35% by weight. When not less than 10% by weight, the dispersion and the ink lower in viscosity. When not greater than 35% by weight, the image density is apparently improved.

The copolymer preferably includes the structural unit represented by any one of the formulae (5) to (9) in an amount of from 20 to 70% by weight. When 20 to 70% by weight, the ink produces images having high image density, and improves in pigment dispersion stability and storage stability.

The copolymer is widely used in various fields, and preferably used as a pigment dispersant, a pigment concentration improver, a binder resin for pigment and a viscosity regulator.

<Method of Preparing Copolymer>

At least the monomer represented by the formula (3), the monomer represented by the formula (4), monomers represented by any one of the following formulae (13) to (17), and the other polymerizable monomers when necessary are copolymerized.

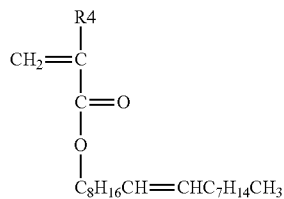

(13)

wherein R4 represents a hydrogen atom or a methyl group.

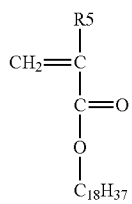

(14)

wherein R5 represents a hydrogen atom or a methyl group.

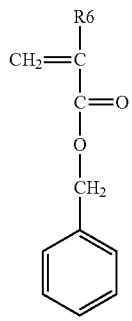

(15)

wherein R6 represents a hydrogen atom or a methyl group.

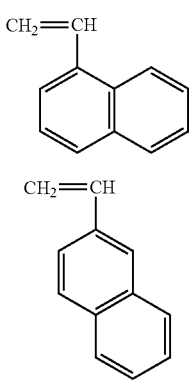

(16)

(17)

The resultant copolymerized product is neutralized with an alkali metal base or an organic amine base. Specifically, after a solvent and the monomers are reacted with a polymerization initiator under a nitrogen gas stream at 50 to 150° C. in a flask equipped with a stirrer, a thermometer and a nitrogen introduction pipe, the reactant is neutralized with the alkali metal base or the organic amine base.

Alternatively, the monomer represented by the formula (3) is previously neutralized with an alkali metal base or an organic amine base to form a monomer represented by the following formula (18), and which may be copolymerized.

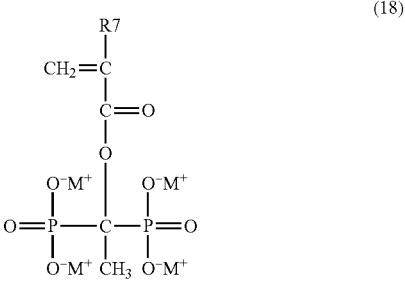

(18)

wherein R7 represents a hydrogen atom or a methyl group; and M represents a hydrogen atom, an alkali metal or an organic ammonium.

Specific examples of the compound represented by the formula (3) include 1-methacryloxyethane-1,1-diphosphonic acid represented by the following formula (I) when R4 is a methyl group and 1-acryloxyethane-1,1-diphosphonic acid represented by the following formula (II) when R4 is a hydrogen atom.

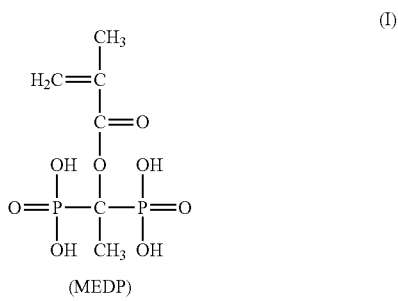

(I)

(MEDP)

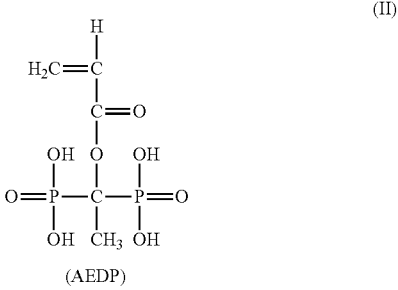

(II)

(AEDP)

Specific examples of the compound represented by the formula (13) include oleyl methacrylate represented by the following formula (19) when R4' is a methyl group and oleyl acrylate represented by the following formula (20) when R4' is a hydrogen atom.

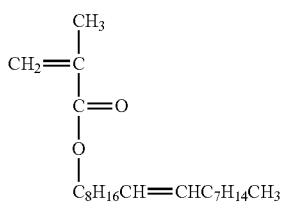

(19)

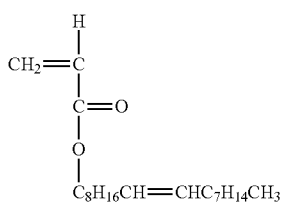

(20)

Specific examples of the compound represented by the formula (14) include stearyl methacrylate represented by the following formula (21) when R5' is a methyl group and stearyl acrylate represented by the following formula (22) when R5' is a hydrogen atom.

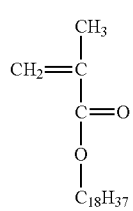

(21)

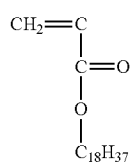

(22)

Specific examples of the compound represented by the formula (15) include benzyl methacrylate represented by the following formula (23) when R6' is a methyl group and benzyl acrylate represented by the following formula (24) when R6' is a hydrogen atom.

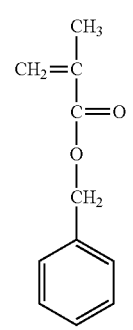

(23)

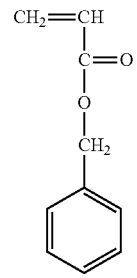

(24)

The copolymer is preferably synthesized by a method using a radical polymerization initiator because the polymerization operation and the molecular weight control are simple. A solution polymerization method polymerizing in an organic solvent is more preferably used.

Specific examples of radical polymerization initiators include, but are not limited to, such as peroxyketal, hydroperoxide, dialkylperoxide, diacylperoxide, peroxydicarbonate, peroxyester, cyano azobisisobutylonitrile, azobis(2-methylbutylnitrile), azobis(2,2'-isovaleronitrile), and non-cyano dimethyl-2,2'-azobisisobutylate. Organic peroxides and azo compounds having an easily-controllable molecular weight and a low decomposition temperature are preferably used, and the azo compounds are more preferably used. The polymerization initiators are preferably used in an amount of from 1 to 10% by weight based on total weight of polymerizable monomers.

Specific examples of the solvent include, but are not limited to, ketone solvents such as methanol, ethanol, acetone, methyl ethyl ketone and methyl isobutyl ketone; ester acetate solvents such as ethyl acetate and butyl acetate; aromatic hydrocarbon solvents such as benzene, toluene and xylene; isopropanol; ethanol; cyclohexane; tetrahydrofuran; dimethylformamide; dimethylsulfoxide; and hexamethyl phosphoamide. Among these, ketone solvents, ester acetate solvents and alcohol solvents are preferably used.

The copolymer may include a chain-transfer agent in a proper amount to control its molecular weight.

Specific examples thereof include, but are not limited to, mercapto acetic acid, mercapto propionic acid, 2-propanethiol, 2-mercaptoethanol, thiophenol, dodecylmercaptan, 1-dodecanethiol and thioglycerol.

The polymerization temperature is preferably, but are not limited to, from 50 to 150° C., and more preferably from 60 to 100° C. The polymerization time is preferably, but is not limited to, from 3 to 48 hrs.

The copolymer is neutralized, and the previously neutralized monomer represented by the formula (18) may be copolymerized as mentioned above. The neutralization can be made while a pigment and the copolymer are mixed with each other in the process of preparing an ink.

The phosphonic acid groups of the copolymer are partially or all neutralized.

In the present invention, the neutralization index of the phosphonic acid groups in the neutralized copolymer is defined by the following formulae. This is different from a ratio of a proton in the copolymer actually substituted with a metallic ion or an organic amine ion. When the compound represented by the formula (18) is monomer 1, Neutralization index $X(\%)$=(molar number of base added×valence of cation of base)/(molar number of monomer 1 included in copolymer)×100

Molar number of base added=added amount of base Yg/molecular weight of base

Molar number of monomer 1 included in copolymer=charge-in quantity of monomer 1 Zg/molecular weight of monomer 1

Therefore, base quantity needed to obtain neutralization index (%) is determined by the following formula.

Added amount of base Yg=neutralization index $X(\%)$×(charge-in quantity of monomer 1 Zg×4)×molecular weight of base/(valence of cation of base×100×molecular weight of monomer 1).

An aqueous solution or an aqueous dispersion of the copolymer preferably has a viscosity of from 1.5 to 30.0 mPa·s at 25° C. When not less than 1.5 mPa·s, reactivity between a metal ion eluted from paper and a pigment dispersant improves, and image density noticeably improves. When not greater than 30.0 mPa·s, a pigment further improves in dispersion stability and a pigment dispersant further improves in storage stability.

The copolymer preferably has a weight-average molecular weight of from 2000 to 50000. When not less than 2000, reactivity between a metal ion eluted from paper and a pigment dispersant improves, and image density noticeably improves. When not greater than 50000, a pigment further improves in dispersion stability and a pigment dispersant further improves in storage stability.

The weight-average molecular weight of the copolymer is somewhat controllable by the polymerization temperature, an amount of the polymerization initiator and the monomer concentration in the reaction. The copolymer tends to have a low molecular weight when polymerized at high temperature for a short time, and a high molecular weight when polymerized at low temperature for a long time.

<<Ink for Inkjet Recording>>

The ink of the present invention includes water, a hydrosoluble organic solvent, besides the copolymer, and other components further when necessary.

The ink preferably includes the copolymer in an amount of from 0.5 to 10% by weight, and more preferably from 1.0 to 5.0% by weight. The ink does not substantially improve in image density until including the copolymer not less than 0.5% by weight, and has suitable viscosity in discharging from head when including the copolymer not greater than 10% by weight.

The copolymer may be used as an additive, and when used as a dispersant for a pigment in a pigment dispersion, the image density and strike-through reduction further improve. When used as a dispersant for a pigment, besides the structural units represented by the formulae (1), (2), and (5) to (9), the copolymer may include the structural units coming from the above-mentioned other hydrophilic polymerizable monomers.

The ink preferably includes the copolymer when used as a dispersant for a pigment, bit are not limited to, in an amount of from 10 to 100 parts by weight per 100 parts by weight of the pigment to have high image density. Dispersants mentioned later may be used together as long as the effect of the copolymer as a dispersant is not impaired.

The ink of the present invention is preferably used on a paper eluting Ca ion in an amount of from $1.0\times10^{-4}$ to $5.0\times10^{-4}$ g/g. When less than $1.0\times10^{-4}$ g/g, improvement of the image density due to reaction agglomeration with the pigment dispersant deteriorates. When greater than $5.0\times10^{-4}$ g/g, an ink noticeably becomes difficult to penetrate a paper and poorly dried, resulting in deterioration of scratch resistance and marker resistance.

Ca ion amount eluted from a paper is calculated by the following method.

Namely, a paper is cut to paper slips of 2.5 cm (±0.5 cm)×3.5 cm (±0.5 cm), and 16 g thereof are dipped in 200 g of high-purity water (25° C.) for 40 hrs. The high-purity water after the paper slips are dipped therein is filtered with a 0.8 μm cellulose acetate filter (from Advantech Co., Ltd.) to remove foreign particles such as paper dusts, and Ca ion included therein is determined by an ICP emission spectrometer. The resultant Ca ion concentration [ppm] is multiplied by 200 g which is the weight of the high-purity water, and further divided by 16 g which is the weight of the paper dipped to determine an amount of Ca ion [g/g] eluted from the paper.

For example, My Paper from Ricoh Company, Ltd. includes Ca ion in an amount of $4.3\times10^{-4}$ g/g, and Xerox 4024 from Fuji Xerox Co, Ltd. includes Ca ion in an amount of $1.7\times10^{-4}$ g/g.

<Water>

As the water, ion-exchanged water, ultrafiltrated water, Mill Q water, pure water such as distilled water or ultrapure water can be used.

The ink preferably includes water in an amount of from 20 to 60% by weight.

<Hydrosoluble Solvent>

The hydrosoluble solvent imparts moisturizing effect to the ink to improve discharge stability. The ink preferably includes the hydrosoluble solvent in an amount of from 10 to 50% by weight. When not less than 10% by weight, a moisture in the ink is difficult to evaporate to prevent ink clogging in an inkjet recorder. When not greater than 50% by weight, the ink has low viscosity even when including many solid contents such as a pigment and a resin to have high image density.

Specific examples of the hydrosoluble solvent include, but are not limited to, polyols such as ethylene glycol, diethylene glycol, 1,3-butane diol, 3-methyl-1,3-butyl glycol, triethylene glycol, polyethylene glycol, polypropylene glycol, dipropylene glycol, tripropylene glycol, polypropylene glycol, 1,5-pentane diol, 1,6-hexane diol, glycerin, 1,2,6-hexane triol, 2-ethyl-1,3-hexane diol, 2,2,4-trimethyl-1,3-pentan diol, 1,2,4-butane triol, 1,2,3-butane triol, trimethylol propane, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, and N,N-dimethylformamide; amines such as monoethanolamine, diethanolamine, and triethanolamine; sulfur-containing compounds such as dimethyl sulfoxide, sulfolane, and thiodiethanol; propylene carbonate, and ethylene carbonate.

These hydrosoluble solvents can be used alone or in combination.

Of these, if 1,3-butane diol, diethylene glycol, 2,2,4-trimethyl-1,3-pentanediol, triethylene glycol, and/or glycerin are contained, poor ejection caused by evaporation of moisture can be prevented greatly.

The hydrosoluble solvents for use in the present invention include a penetrant. The penetrant preferably includes a polyol compound having 8 to 11 carbon atoms or a glycol ether compound having 8 to 11 carbon atoms.

The penetrant can be "a non-wettable medium".

The non-wettable penetrant preferably has a solubility of from 0.2 to 50% by weight in water at 25° C. Particularly, 2-ethyl-1,3-hexane diol (solubility: 4.2% by weight at 25° C.) and 2,2,4-trimethyl-1,3-pentane diol (solubility: 2.0% by weight at 25° C.) are more preferably used.

Specific examples of the other polyol compounds include, but are not limited to, aliphatic diols such as 2-ethyl-2-methyl-1,3-propanediol, 3,3-dimethyl-1,2-butane diol, 2,2-diethyl-1,3-propane diol, 2-methyl-2-propyl-1,3-propane diol, 2,4-dimethyl-2,4-pentane diol, 2,5-dimethyl-2,5-hexane diol, and 5-hexene-1,2-diol.

The other penetrants usable in combination can be any agents capable of being dissolved in an ink and adjusting to desired properties and are suitably selected to particular applications. Specific example thereof include, but are not limited to, alkyl and aryl ethers of polyols such as diethylene glycol monophenyl ether, ethylene glycol monophenyl ether, ethylene glycol monoaryl ether, diethylene glycol monophenyl ether, diethylene glycol monobutyl ether, propylene glycol monobutyl ether, and tetraethylene glycol chlorophenyl ether; and lower alcohols such as ethanol.

The ink preferably include the penetrant in an amount of from 0.1 to 4% by weight. When not less than 0.1% by weight, the ink is quickly dried and blurred images are not produced. When not greater than 4.0% by weight, the dispersion stability of the pigment does not deteriorate, nozzles are not clogged, the permeation into a recording medium is not excessively high, the image density does not decrease and strike-through does not occur.

<Pigment>

The ink preferably includes a pigment in an amount of from 0.1 to 20.0% by weight. The volume average particle diameter (D50) of the pigment is preferably 150 nm or less. The volume average particle diameter (D50) is measured by Microtrac UPA (manufactured by Nikkiso Co., Ltd.) at 23° C. and 55% RH according to dynamic light scattering method.

There is no specific limit to the selection of the pigment. For examples, inorganic pigments and organic pigments can be suitably selected. These can be used alone or in combination.

Specific examples of the inorganic pigments include, but are not limited to, titanium oxide, iron oxide, calcium oxide, barium sulfate, aluminum hydroxide, barium yellow, Prussian blue, cadmium red, chrome yellow, metal powder, and carbon black. Of these, carbon black is preferably used. Carbon black manufactured by known methods such as a contact method, a furnace method, and a thermal method can be used.

Specific examples of the organic pigments include, but are not limited to, azo pigments, azomethine pigments, polycyclic pigments, dye chelates, nitro pigments, nitroso pigments, and aniline black. Of these, azo pigments and polycyclic pigments are more preferably used.

Specific examples of the azo pigments include, but are not limited to, azo lake, insoluble azo pigments, condensation azo pigments, and chelate azo pigments.

Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, quinofuranone pigments, and, Rhodamine B lake pigments.

Specific examples of the dye chelates include, but are not limited to, bass dye type chelates and acid dye type chelates.

Specific examples of the black pigments include, but are not limited to, carbon black (C.I. Pigment Black 7) such as furnace black, lamp black, acetylene black, and channel black, metals such as copper, iron (C.I. Pigment Black 11), metal oxides such as titanium oxides, and organic pigments such as aniline black (C.I. Pigment Black 1).

It is suitable to use carbon black manufactured by a furnace method or channel method, which has a primary particle diameter of from 15 to 40 nm, a specific surface area of from 50 to 300 $m^2/g$ according to BET absorption method, a DPB absorption oil amount of from 40 to 150 ml/100 g, a volatile content of from 0.5 to 10%, and a pH of from 2 to 9.

Specific examples of carbon black available on market include, but are not limited to, No. 2300, No. 900, MCF-88, No. 33, No. 40, No. 45, No. 52, MA7, MA8, MA100, No. 2200B (all manufactured by Mitsubishi Chemical Corporation); Raven 700, Raven 5750, Raven 5250, Raven 5000, Raven 3500, and Raven 1255 (all manufactured by Colombia Co., Ltd.), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all manufactured by Cabot Corporation); and Color Black FW1, Color Black FW2, Color Black FW2V, Color Black FW18, Color Black 200, Color Black S150, Color Black S160, Color Black S170, Printex 35, Printex U, Printex V, Printex 140U, Printex 140V, and Special Black 6, Special Black 5, Special Black 4A, and Special Black 4 (all manufactured by Degussa AG).

There is no specific limit to the color pigment for use in yellow ink, which can be selected to a particular application. Specific examples thereof include, but are not limited to, C. I. Pigment Yellow 1, C. I. Pigment Yellow 2, C. I. Pigment Yellow 3, C. I. Pigment Yellow 12, C. I. Pigment Yellow 13, C. I. Pigment Yellow 14, C. I. Pigment Yellow 16, C. I. Pigment Yellow 17, C. I. Pigment Yellow 73, C. I. Pigment Yellow 74, C. I. Pigment Yellow 75, C. I. Pigment Yellow 83, C. I. Pigment Yellow 93, C. I. Pigment Yellow 95, C. I. Pigment Yellow 97, C. I. Pigment Yellow 98, C. I. Pigment Yellow 114, C.I. Pigment Yellow 120, C. I. Pigment Yellow 128, C. I. Pigment Yellow 129, C. I. Pigment Yellow 138, C. I. Pigment Yellow 150, C. I. Pigment Yellow 151, C. I. Pigment Yellow 154, C. I. Pigment Yellow 155, C. I. Pigment Yellow 174, C. I. Pigment Yellow, and C. I. Pigment Yellow 180.

There is no specific limit to the color pigment for use in magenta ink, which can be selected to a particular application. Specific examples thereof include, but are not limited to, C. I. Pigment Red 5, C. I. Pigment Red 7, C. I. Pigment Red 12, C. I. Pigment Red 48 (Ca), C. I. Pigment Red 48 (Mn), C. I. Pigment Red 57 (Ca), C. I. Pigment Red 57:1, C. I. Pigment Red 112, C. I. Pigment Red 122, C. I. Pigment Red 123, C. I. Pigment Red 146, C. I. Pigment Red 168, C. I. Pigment Red 176, C. I. Pigment Red 184, C. I. Pigment Red 185, C. I. Pigment Red 202 and Pigment Violet 19.

There is no specific limit to the color pigment for use in cyan ink, which can be selected to a particular application. Specific examples thereof include, but are not limited to, C. I. Pigment Blue 1, C. I. Pigment Blue 2, C. I. Pigment Blue 3, C. I. Pigment Blue 15, C. I. Pigment Blue 15:3, C. I. Pigment Blue 15:4, C. I. Pigment Blue 15:34, C. I. Pigment Blue 16, C.

I. Pigment Blue 22, C. I. Pigment Blue 60, C. I. Pigment Blue 63, C. I. Pigment Blue 66, Bat Blue 4 and Bat Blue 60.

New pigments may be used in the present invention.

When Pigment Yellow 74 as a yellow pigment, Pigment Red 122 or a Pigment Violet 19 as a magenta pigment and a Pigment Blue 15:3 as a cyan pigment are used, a well-balanced ink having good color tone and light resistance can be obtained.

Further, in the present invention, a surfactant such as a dispersant and a pigment coated with a resin, which is subjected to graft process or a capsule process can be used. The copolymer is preferably used as the dispersant. The above pigments may be used together therewith as long as the effect is not impaired.

<Other Components>

The ink of the present invention can include other components when necessary. Specific examples thereof include a dispersant, a penetrant, a pH adjuster, a hydrodispersible resin, an antiseptic and antifungal agent, a chelate reagent, an antirust agent, an antioxidant, an UV absorber, an oxygen absorber, a light stabilizer, etc.

(Dispersant)

The copolymer having a phosphonic acid group of the present invention is preferably used as the dispersant. Specific examples of other dispersants include, but are not limited to, surfactants such as anionic surfactants, cationic surfactant, ampholytic surfactants and nonionic surfactants; sodium naphthalenesulfonate formalin condensates; and polymeric dispersants. These can be used alone or in combination.

Specific examples of the anionic surfactant include, but are not limited to, alkylsulfocarboxylic acid salts, α-olefinsulfonic acid salts, polyoxyethylene alkyl ether acetic acid salts, N-acylamino acids or salts thereof, N-acylmethyltaurine salts, alkylsulfuric acid salts, polyoxyalkyl ether sulfuric acid salts, alkylsulfuric acid salts, polyoxyethylene alkyl ether phosphoric acid salts, rosin acid soap, castor oil sulfate ester salts, lauryl alcohol sulfate ester salts, alkylphenolic phosphate esters, alkylated phosphate esters, alkylarylsulfonic acid salts, diethyl sulfosuccinic acid salts, diethylhexyl sulfosuccinic acid salts, and dioctyl sulfosuccinic acid salts.

Specific examples of the cationic surfactant include, but are not limited to, 2-vinylpyridine derivatives and poly4-vinylpyridine derivatives.

Specific examples of the amphoteric surfactant include, but are not limited to, betaine lauryldimethylamino acetate, 2-alkyl-N-carboxymethyl-N-hydroxyethylimidazolinium betaine, betaine coconut oil fatty acid amidopropyldimethylamino acetate, polyoctylpolyaminoethylglycine, and imidazoline derivatives.

Specific examples of the nonionic surfactant include, but are not limited to, ether based surfactants such as polyoxyethylene nonylphenyl ether, polyoxyethylene octylphenyl ether, polyoxyethylene dodecyl phenyl ether, polyoxyethylene octylphenyl ether, polyoxyethylene oleyl ether, polyoxyethylene lauryl ether and polyoxyethylene alkyl ether; ester based surfactants such as polyoxyethylene oleate esters, polyoxyethylene distearate esters, sorbitan laurate, sorbitan monostearate, sorbitan monooleate, sorbitan sesquioleate, polyoxyethylene monooleate and polyoxyethylene stearate; acetylene glycol (alcohol) based surfactants such as 2,4,7,9-tetramethyl-5-decyne-4,7-diol, 3,6-dimethyl-4-octyne-3,6-diol and 3,5-dimethyl-1-hexine-3-ol.

(pH Adjuster)

The pH adjuster is not particularly limited as long as it may adjust a pH of the aqueous ink being prepared to 8.5 to 11, and preferably from 9 to 11 without adversely affecting the ink. When less than 8.5 or greater than 11, inkjet head or ink feed unit may be melted out so much that the ink may be denatured, leak or poorly discharge. Further, when less than 8.5, the ink lowers in pH when stored and polymeric particles may increase in diameter and agglomerate. Specific examples of the pH adjuster include alcohol amines, hydroxides of an alkali metal element, hydroxides of ammonium, hydroxides of phosphonium, and carbonates of an alkali metal.

The pH of the ink is measured by a pH meter HM-30R from TOA-DKK CORPORATION.

Specific examples the alcohol amines include diethanolamine, triethanolamine, and 2-amino-2-ethyl-1,3-propanediol. Specific examples the hydroxides of an alkali metal element include lithium hydroxide, sodium hydroxide and potassium hydroxide. Specific examples of the hydroxides of ammonium include ammonium hydroxide and quaternary ammonium hydroxide. Specific examples of the hydroxides of phosphonium include quaternary phosphonium hydroxide. Specific examples of the carbonates of an alkali metal include lithium carbonate, sodium carbonate and potassium carbonate.

(Hydrodispersible Resin)

The hydrodispersible resin preferably has good film formability (image formability), high repellency and high weatherablity to form an image having high repellency and high image density (high colorability).

Specific examples of the hydrodispersible resin include condensed synthetic resins such as polyester resins, polyurethane resins, epoxy resins, polyamide resins, polyether resins, (meth)acrylic resins, acrylic-silicone resins and fluorine-containing resins; additional synthetic resins such as polyolefin, polystyrene resins, polyvinylalcohol resins, polyvinyl ester resins, polyacrylic resins and unsaturated carboxylic resins; and natural polymers such as celluloses, rosins and natural rubbers, which may be used in combination.

Among these, polyurethane resin fine particles, acrylic-silicone resin fine particles and fluorine-containing resin fine particles are preferably used.

A volume-average particle diameter (D50) of the hydrodispersible resin is related with a viscosity of a dispersion liquid. The smaller the particle diameter, the larger the viscosity when the composition is the same. The volume-average particle diameter (D50) of the hydrodispersible resin is preferably not less than 50 nm so that the ink may not have too high a viscosity. When the particle diameter is some ten μm, the resin cannot be used because of being larger than the nozzle of inkjet head. Even when smaller than the nozzle, the large-size particles in the ink deteriorates discharge stability thereof. Therefore, the volume-average particle diameter (D50) of the hydrodispersible resin is more preferably not greater than 200 nm so as not to impair discharge stability of the ink. The volume-average particle diameter (D50) of the pigment us measured a dynamic light scattering method using Microtrac UPA from NIKKISO CO., LTD. in an environment of 23° C. and 55% RH.

The hydrodispersible resin preferably fixes a pigment dispersion on a paper and films it at normal temperature to improve fixability of the pigment. Therefore, the hydrodispersible resin preferably has a minimum filming temperature (MFT) not greater than 30° C.

The hydrodispersible resin preferably has a glass transition temperature not less than −40° C. because the resin film has higher viscosity, which causes tack of the printed matter.

The ink preferably includes the hydrodispersible resin in an amount of from 1 to 15% by weight, and more preferably from 2 to 7% by weight.

(Antiseptic and Antifungal Agent)

Specific examples the antiseptic and antifungal agent include sodium dehydroacetate, sodium sorbate, 2-pyridinethiol 1-oxide sodium, sodium benzoate, sodium pentachlorophenol, etc.

(Chelate Reagent)

Specific examples of the chelate reagent include sodium ethylenediaminetetraacetate, sodium nitrilotriacetate, sodium hydroxyethylethylenediamine triacetate, sodium diethylenetriamine pentaacetate, sodium uramildiacetate, etc.

(Antirust Agent)

Specific examples the antirust agent include acid sulfite, sodium thiosulfate, ammonium thiodiglycolate, diisopropyl ammonium nitrite, pentaerythritol tetranitrate, dicyclohexylammonium nitrite, etc.

(Antioxidant)

Specific examples of the antioxidant include a phenol-based antioxidant (including a hindered phenol-based antioxidant), an amine-based antioxidant, a sulfur-based antioxidant, a phosphorus-based antioxidant, etc.

(UV Absorber)

Specific examples of the UV absorber include a benzophenone-based UV absorber, a benzotriazole UV absorber, a salicylate-based UV absorber, a cyanoacrylate-based UV absorber, a nickel complex salt-based UV absorber etc.

<Method of Preparing Ink for Inkjet Recording>

The ink of the present invention is manufactured by dispersing or dissolving water, the hydrosoluble organic solvent, the pigment, the copolymer including a phosphonic acid group, and the other components when necessary, in an aqueous medium, and further by stirring and mixing according to necessity. The dispersion can be made by using a sand mill, a homogenizer, a ball mill, a paint shaker, an ultrasonic disperser, and the stirring and mixing can be made by using ordinary stirring blades, a magnetic stirrer, and a high-speed disperser, for example.

Physical properties of the ink of the present invention are not particularly limited and may be appropriately selected according to purpose.

A viscosity of the aqueous ink at 25° C. is preferably 3 to 20 mPa·s. An effect of improved print density and letter quality may be obtained with the viscosity being 3 mPa·s or greater. At the same time, discharge property may be ensured with the viscosity suppressed to 20 mPa·s or less. Here, the viscosity may be measured at 25° C., for example, using a viscometer (RL-550 manufactured by Toki Sangyo Co., Ltd.).

Also, static surface tension of the aqueous ink at 25° C. is preferably not greater than 40 mN/m. When greater than 40 mN/m, leveling of the ink on a recording medium is less likely to occur, and drying time may be longer.

<<Ink Cartridge>>

The ink cartridge of the present invention contains the inkjet ink of the present invention and may include any other suitable members in combination. There is no specific limit to the container. Any form, any structure, any size, and any material can be suitably selected. For example, an ink bag formed of aluminum laminate film, a resin film, etc. can be suitably used as a container.

Figure 2:
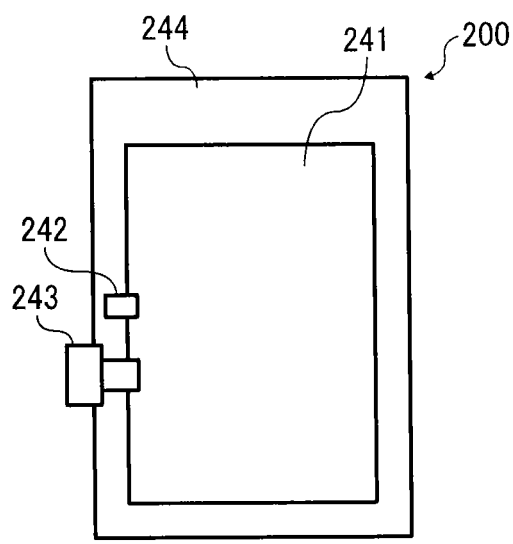
FIG. 2 is a schematic plain view illustrating the ink cartridge of the present invention including a case (outer package) in FIG. 1.

FIG. 1 is a schematic plain view illustrating an embodiment of the ink cartridge 200 of the present invention. FIG. 2 is a schematic plain view illustrating the embodiment of the ink cartridge 200 including a case (outer package) in FIG. 1.

As illustrated in FIG. 1, an ink bag 241 is filled with the ink from an ink inlet 242. Subsequent to evacuation of air, the ink inlet 242 is closed by fusion. When in use, the ink is supplied by piercing the needle attached to the inkjet recorder into an ink outlet 243 made of rubber. The ink bag 241 is formed of a packaging material such as aluminum laminate film having no air permeability. The ink bag 241 is accommodated in a cartridge case 244 made of plastic and detachably attached to various inkjet recorders.

<<Inkjet Recorder and Inkjet Recording Method>>

The inkjet recorder of the present invention includes the ink cartridge and records information or images on recording media with the ink of the present invention by using inkjet heads. The inkjet recorder includes at least an ink ejector to eject an ink and other suitably selected optional devices such as a stimulus generator and a controller.

The ink ejector ejects the ink of the present invention to form images by applying a stimulus thereto. There is no specific limit to the ink ejector. For example, nozzles for ejecting ink can be suitably used.

The stimulus is generated by, for example, a stimulus generator. There is no specific limit to the selection of the stimuli. Heat (temperature), pressure, vibration, and light can be suitably used. These may be used alone or in combination of two or more thereof. Of these, heat and pressure are preferable. Examples of the stimulus generator include a heater, a pressurization device, a piezoelectric element, a vibrator, an ultrasonic oscillator, light, etc. Specific examples thereof include, but are not limited to, a piezoelectric actuator of piezoelectric elements, etc., a thermal actuator that utilizes a phase change caused by film boiling of liquid using an electric heat conversion element such as a heat element, a shape-memory alloy actuator that uses the metal phase change due to temperature change, and an electrostatic actuator that uses an electrostatic force.

How the ink is ejected has no specific limit and can be determined depending on the kind of stimuli mentioned above.

For example, in a case in which "heat" is applied as a stimulus, a method can be used which includes applying thermal energy according to recording signals to ink in a recording head by, for example, a thermal head to generate air bubbles in the ink, thereby ejecting and spraying the ink as droplets from the nozzles of the recording head due to the pressure of the air bubbles. In addition, in a case in which the stimulus is "pressure", for example, a method can be used in which ink is ejected and sprayed from the nozzle holes of a recording head as droplets by applying a voltage to a piezoelectric element attached to the position of a pressure room located in the ink flow path in the recording head, thereby bending the piezoelectric element, resulting in a decrease in the volume of the pressure room.

There is no specific limit to a controlling device that is be able to control the behavior of each device and any controlling device can be suitably selected. For example, devices such as a sequencer and a computer can be used.

The inkjet recorder according to embodiments of the present invention, which were used in Examples and the inkjet recording method using the recorder, are described below.

Figure 3:
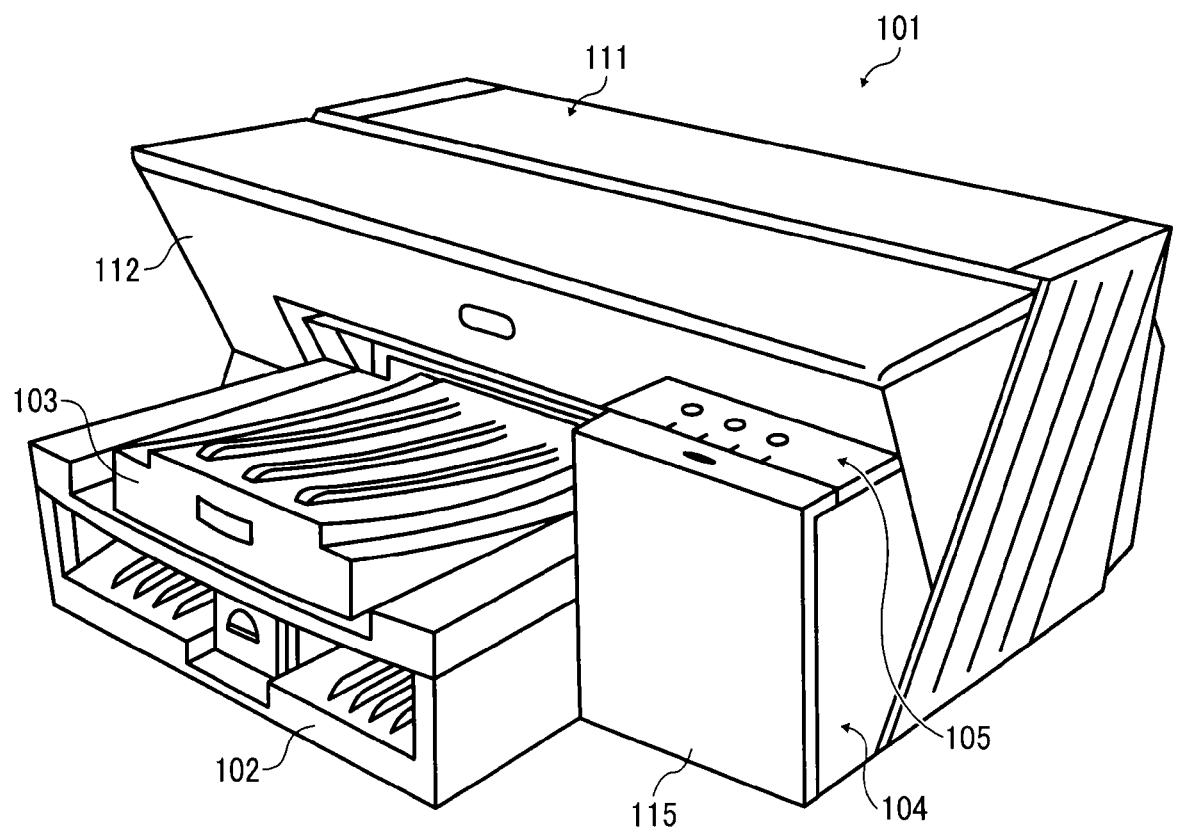
FIG. 3 is a perspective view illustrating an embodiment of the inkjet recorder of the present invention.

FIG. 3 is a perspective view illustrating an example of the serial type inkjet recorder according to an embodiment of the present invention. An inkjet recorder 101 illustrated in FIG. 3 has a sheet feeder tray 102 to feed recording media placed in the inkjet recorder 101, a discharging tray 103 installed in the inkjet recorder 101, which stores the recording media on which images are recorded (formed), and an ink cartridge installation unit 104. On the upper surface of the ink cartridge installation unit 104 is arranged an operating portion 105 including operation keyboard, a display, etc. The ink cartridge installation unit 104 has a front cover 115 that is openable and closable to detach and attach an ink cartridge 200. 111 represents the upper cover of the inkjet recorder 101 and 112 represents the front surface thereof.

Figure 4:
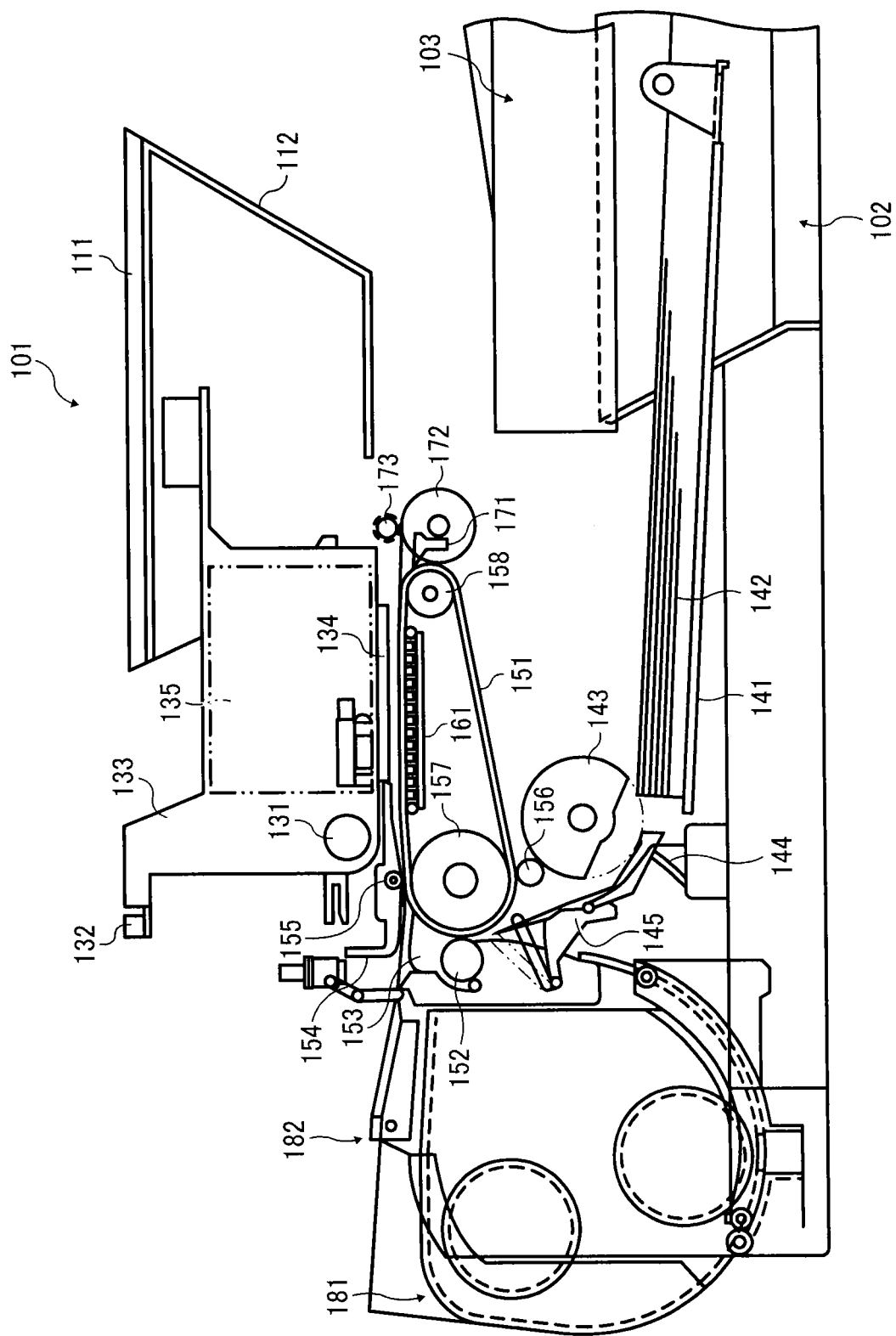
FIG. 4 is a schematic view illustrating an overall structure of the inkjet recorder in FIG. 3.
Figure 5:
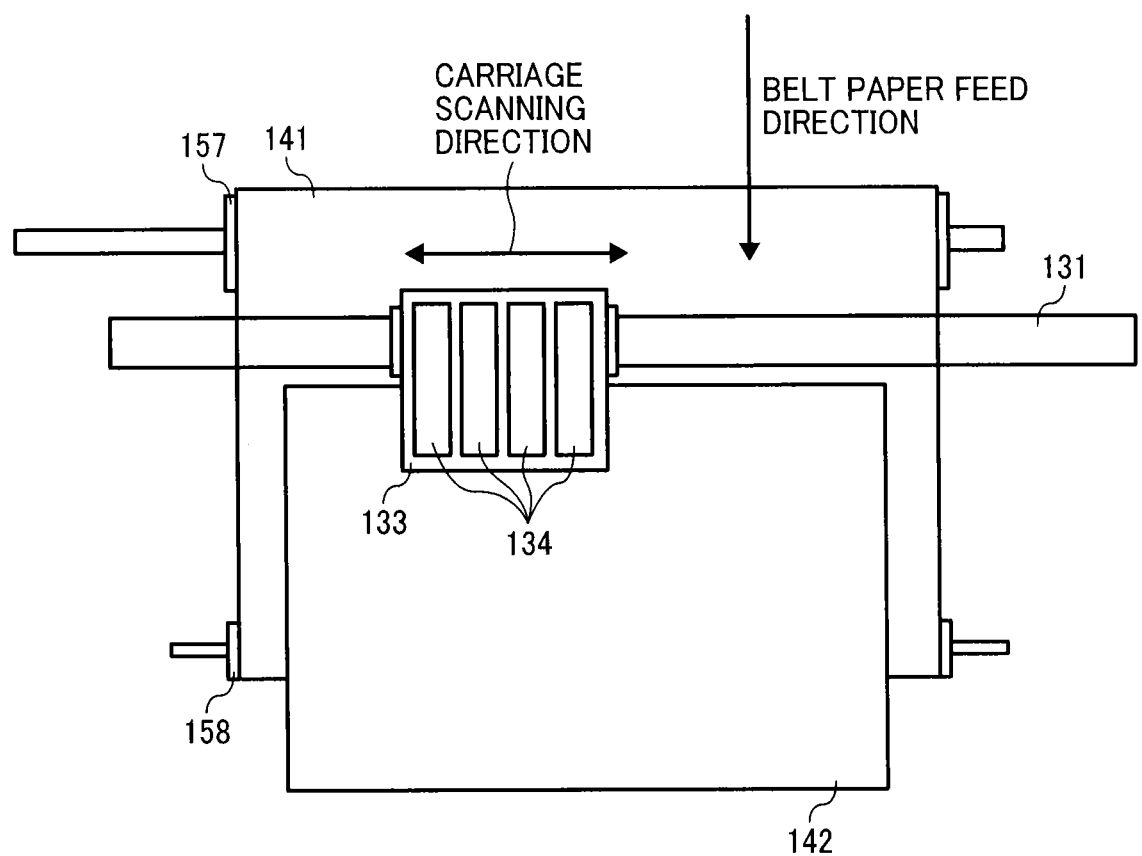
FIG. 5 is an enlarged partial view of the inkjet recorder in FIG. 3.

Inside the inkjet recorder 101, as illustrated in FIGS. 4 and 5, a guide rod 131 and a stay 132 serving as guiding members that laterally bridge side plates provided on the right side and left side hold a carriage 133 slidably movable in the main scanning direction. A main scanning motor moves the carriage 133 for scanning in an arrow direction in FIG. 5.

The carriage 133 has a recording head 134 having four inkjet recording heads that discharge ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having an energy-generating device to discharge ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force. The carriage 133 has a sub tank 135 for each color to supply each color ink to the recording head 134. The ink is supplied and replenished to the sub-tank 135 from the ink cartridge 200 mounted onto the ink cartridge inserting installation unit 104 via a tube for supplying ink.

A sheet feeding unit to feed a sheet 142 loaded on a sheet loader (pressure plate) 141 of the sheet feeder tray 103 includes a roller (sheet feeding roller 143) having a half-moon like form to separate and feed the sheet 142 one by one from the sheet loader 141 and a separation pad 144 that is made of a material having a large friction index and arranged facing the sheet feeding roller 143 while biased to the side of the sheet feeding roller 143.

A transfer unit to transfer the sheet 142 fed from the sheet feeding unit on the lower side of the recording head 134 includes a transfer belt 151 to electrostatically adsorb and transfer the sheet 142, a counter roller 152 to transfer the sheet 142 fed from the sheet feeding unit via a guide 145 while pinching the sheet 142 with the transfer belt 151, a transfer guide 153 to make the sheet 142 track on the transfer belt 151 by changing the transfer direction of the sheet 142 being sent substantially vertically upward by substantially 90°, a front head pressure roller 155 biased towards the transfer belt 151 by a pressure member 154, and a charging roller 156 to charge the surface of the transfer belt 151.

The transfer belt 151 is an endless form belt, stretched between a transfer roller 157 and a tension roller 158 and rotatable in the belt transfer direction. This transfer belt 151 include, for example, a top layer serving as a sheet adsorption surface made of a resin material such as a copolymer (ETFE) of tetrafluoroethylene and ethylene with no resistance control treatment while having a thickness about 40 µm, and a bottom layer (moderate resistance layer, earth layer) made of the same material as the top layer with resistance control treatment with carbon. On the rear side of the transfer belt 151, a guiding member 161 is arranged corresponding to the printing area by the recording head 134.

A discharging unit to discharge the sheet 142 on which images are recorded by the recording head 134 includes a separation claw 171 to separate the sheet 142 from the transfer belt 151, a discharging roller 172, and a discharging roller 173. A discharging tray 103 is arranged below the discharging roller 172.

A duplex printing sheet feeding unit 181 is detachably attached to the rear side of the inkjet recorder 101. The duplex printing sheet feeding unit 181 takes in and reverses the sheet 142 that is returned by the reverse rotation of the transfer belt 151 and feeds it again between the counter roller 152 and the transfer belt 151. A manual sheet feeding unit 182 is provided on the upper surface of the duplex printing sheet feeding unit 181.

In this inkjet recorder, the sheet 142 is separated and fed from the sheet feeding unit one by one substantially vertically upward, guided by the guide 145, and transferred while being pinched between the transfer belt 151 and the counter roller 152. Furthermore, the front end of the sheet 142 is guided by the transfer guide 153 and pressed against the transfer belt 151 by the front head pressure roller 155 to change the transfer direction by substantially 90°. Since the transfer belt 157 is charged by the charging roller 156 at this point in time, the sheet 142 is electrostatically adsorbed to the transfer belt 151 and transferred. By driving the recording head 134 according to the image signal while moving the carriage 133, the ink droplet is discharged to the sheet 142 not in motion to record an image for an amount corresponding to one line and thereafter the sheet 142 is transferred in a predetermined amount to conduct recording for the next line. On receiving a signal indicating that the recording has completed or the rear end of the sheet 142 has reached the image recording area, the recording operation stops and the sheet 142 is discharged to the discharging tray 103. When the amount of ink for inkjet recording remaining in the sub-tank 135 is detected as "approaching to empty", a predetermined amount of the ink is replenished to the sub tank 135 from the ink cartridge 200.

In this inkjet recorder, it is possible to dissemble the chassis of the ink cartridge 200 and replace the ink bags therein when the ink for inkjet is used up in the ink cartridge 200. In addition, the ink cartridge 200 stably supplies the ink even when the ink cartridge 200 is placed upright (on its side) and installed by front loading. Therefore, even when the upside of the main part 101 is blocked, for example, it is accommodated in a rack or something is placed on the upper surface of the main part 101, the ink cartridge 200 is easily exchanged.

A serial type (shuttle type) in which the carriage scans is used in this description but this is true in a line-type inkjet recorder having a line type head.

The inkjet recorder is applicable to various inkjet recordings such as inkjet recording printers, facsimiles, copiers and their combination machines.

<<Recorded Matter and Method of Producing Recorded Matter>>

On the recorded matter of the present invention, information or an image is recorded on a recording medium by using the ink of the present invention. The recorded matter of the present invention can be manufactured by a process of discharging an ink from an inkjet head to record on a recording medium.

There is no specific limit to the selection of the recording medium, which can be selected to a particular application. For examples, plain paper, coated paper for printing, gloss paper, special paper, cloth, film, and transparent sheets can be used. These may be used alone or in combination of two or more thereof. Of these, plain paper or coated paper for printing is preferable. Plain paper is advantageous because it is inexpensive. Moreover, coated paper for printing is relatively inexpensive to gloss paper and advantageous in that smooth images with gloss are printed. However, plain paper and coated paper for printing are not dried well. For this reason, in general, they are not practically suitable for inkjet printing.

However, according to the ink of the present invention, drying property is improved so that such recording media can be suitably used.

The recorded matter of the present invention is of high quality blur-free image and excellent in stability over time so that it can be suitably used for various purposes such as references, on which texts, images, etc. are recorded.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified. Abbreviations in Examples represent the following compounds.

MPEGA; methoxy polyethylene glycol acrylate; formula 4-1
(BLEMMER AME-400 from NOF Corp.)
MPEGMA 9; methoxy polyethylene glycol methacrylate; formula 4-2
(BLEMMER PME-400 from NOF Corp.)
EDEGA; ethoxy diethylene glycol acrylate; formula 4-3
(LIGHT ACRYLATE EC-A from Kyoeisha Chemical Co., Ltd.)
BDEGMA; butoxy diethylene glycol methacrylate; formula 4-4
(LIGHT ACRYLATE BC from Kyoeisha Chemical Co., Ltd.)
MTEGA; methoxy triethylene glycol acrylate; formula 4-5
(LIGHT ACRYLATE MTG-A from Kyoeisha Chemical Co., Ltd.)
MPEGMA 30; methoxy polyethylene glycol methacrylate; formula 4-6
(LIGHT ESTER 041MA from Kyoeisha Chemical Co., Ltd.)
MDPGA; methoxy dipropylene glycol acrylate; formula 4-7
(LIGHT ACRYLATE DPM-A from Kyoeisha Chemical Co., Ltd.)

(Measurement of Viscosity of Copolymer)

The viscosities of aqueous solutions or aqueous dispersions including the copolymers in an amount of 10% by weight were measured by a cone plate type rotation viscometer RE80L from TOKI SANGYO CO., LTD. at 25° C. Specifically, 1.1 mL of the aqueous solution or the aqueous dispersion was placed in a sample cup of the viscometer, the cup was installed therein and left still for 1 min, and a value after a rotor thereof was rotated for 1 min. The number of rotations were adjusted to be constant in a torque range of from 40 to 80%.

<Measurement of Weight-Average Molecular Weight of Copolymer>

GPC method was used with a column constant temperature reservoir CTO-20A from Shimadzu Corp., a detector RID-10A from Shimadzu Corp., an eluent duct pump LC-20AD from Shimadzu Corp., a degasser DGU-20A from Shimadzu Corp., and an auto-sampler SIL-20A from Shimadzu Corp.

Aqueous SEC columns TSKgel3000PWXL (elimination limit molecular weight $2 \times 10^5$), TSKgel5000PWXL (elimination limit molecular weight $2.5 \times 10^6$) and TSKgel6000PWXL (elimination limit molecular weight $5 \times 10^7$) from Tosoh Corp. were connected with each other to form the column. A sample was placed in an eluent to have a concentration of 2 g/100 mL. An aqueous solution including an acetic acid and sodium acetate having 0.5 mol/litter respectively was used as the eluent. The column had a temperature of 40° C. and a flow velocity was 1.0 mL/min.

As standard samples, 9 polyethylene glycols having molecular weights of 1065, 5050, 24000, 50000, 107000, 140000, 250000, 540000 and 920000 respectively were used to determine a calibration curve. Based on the calibration curve, a weight-average molecular weight of the copolymer was measured.

Synthesis of Copolymer

Synthesis Example 1

A flask equipped with a stirrer, a thermometer and a nitrogen gas introduction pipe was charged with 500.0 parts of a solvent (ethanol), 40.0 parts of 1-methacryloxyethane-1,1-diphosphonic acid (MEDP) [monomer having the formula (I)], 60.0 parts of MPEGMA 9 [monomer having the formula (4-2)] and 4.0 parts of a polymerization initiator (azobisisobutylonitrile), and the mixture was heated to have a temperature of 65° C. Next, after the mixture was polymerized for 10 hrs under a nitrogen stream, about a half of the solvent in the reactant was removed. The reactant was injected in acetone to extract a copolymer, and the copolymer is further dried to prepare a copolymer. Potassium hydroxide was added to the copolymer while diluted to include a solid content in an amount of 10% with water such that the phosphonic acid group were neutralized by 100% to prepare a copolymer 1.

An aqueous solution including the copolymer 1 in an amount of 10% by weight had a viscosity of 3.4 mPa·s at 25° C.

Synthesis Examples 2 to 22

The procedure for preparation of the copolymer 1 in Synthesis Example 1 was repeated except for replacing MEDP or MPEGMA 9 with monomers having the structure 1 or 2 shown in Table 1 and the contents thereof with those shown therein to prepare copolymers 2 to 22.

An aqueous solution including each of the copolymers 2 to 22 in an amount of 10% by weight had a viscosity shown in Table 1 at 25° C.

Synthesis Examples 23 to 25

The procedure for preparation of the copolymer 1 in Synthesis Example 1 was repeated except for replacing potassium hydroxide for neutralizing the copolymer with sodium hydroxide (Synthesis Example 23), lithium hydroxide (Synthesis Example 24) and dimethyl ethanol amine (Synthesis Example 25) to prepare copolymers 23 to 25.

An aqueous solution including each of the copolymers 23 to 25 in an amount of 10% by weight had a viscosity of 2.8, 3.3 and 4.2 mPa·s respectively.

Synthesis Examples 26 and 27

The procedure for preparation of the copolymer 1 in Synthesis Example 1 was repeated except for neutralizing the phosphonic acid group by 70% (Synthesis Example 26) and 50% (Synthesis Example 27) to prepare copolymers 26 and 27.

An aqueous solution including each of the copolymers 26 and 27 in an amount of 10% by weight had a viscosity of 3.5 and 4.2 mPa·s respectively.

Synthesis Example 28

The procedure for preparation of the copolymer 1 in Synthesis Example 1 was repeated except for changing the quantity of MEDP into 100.0 parts, not using MPEGMA 9, and changing the polymerization time into 15 hrs to prepare a copolymers 28.

An aqueous solution including the copolymer 28 had a viscosity of 4.0 mPa·s.

Synthesis Example 29

The procedure for preparation of the copolymer 1 in Synthesis Example 1 was repeated except for replacing MEDP with methacrylate, changing the quantities of methacrylate and MPEGMA 9 into 50 parts respectively, and changing the polymerization time into 15 hrs to prepare a copolymers 29.

An aqueous solution including the copolymer 28 had a viscosity of 10.7 mPa·s.

Synthesis Example 30

A flask equipped with a stirrer, a thermometer and a nitrogen gas introduction pipe was charged with 500.0 parts of a solvent (1-methoxy-2-propanol), 18.0 parts Phosmer M (2-methacryloxyethyl acid phosphate from Uni-Chemical Co., Ltd.), 30.0 parts of styrene (St), 20.0 parts of MMA (methylmethacrylate), 18.0 parts of BMA (butylmethacrylate), 10.0 parts of MAA (methacrylate) and 4.0 parts of a polymerization initiator (azobisisobutylonitrile), and the mixture was heated to have a temperature of 110° C. Next, after the mixture was polymerized for 4 hrs under a nitrogen stream, about a half of the solvent in the reactant was removed. The reactant was injected in methanol to extract a copolymer, and the copolymer is further dried to prepare a copolymer. Potassium hydroxide was added to the copolymer while diluted to include a solid content in an amount of 10% with water such that the phosphonic acid group were neutralized by 100% to prepare a copolymer 30.

An aqueous solution including the copolymer 30 in an amount of 10% by weight had a viscosity of 11.5 mPa·s at 25° C.

Properties of the copolymers 1 to 30 are shown in Table 1.

The structure 1 monomer in the copolymer 29 does not have the formula (I) and the structures 1 and 2 monomers in the copolymer 30 do not have the formulae (I) and (2) respectively.

TABLE 1

(1)

| | | | Structure2 | | | |
|---|---|---|---|---|---|---|
| | Structure1 | Formula | R2 | R3 | n | m |
| Copolymer 1 | MEDP | 4-2 | $CH_3$ | $CH_3$ | 9 | 0 |
| Copolymer 2 | AEDP | 4-2 | $CH_3$ | $CH_3$ | 9 | 0 |
| Copolymer 3 | MEDP | 4-1 | H | $CH_3$ | 9 | 0 |
| Copolymer 4 | MEDP | 4-3 | H | $C_2H_5$ | 2 | 0 |
| Copolymer 5 | MEDP | 4-4 | $CH_3$ | $C_4H_9$ | 2 | 0 |
| Copolymer 6 | MEDP | 4-5 | H | $CH_3$ | 3 | 0 |
| Copolymer 7 | MEDP | 4-6 | $CH_3$ | $CH_3$ | 30 | 0 |
| Copolymer 8 | MEDP | 4-7 | H | $CH_3$ | 0 | 2 |
| Copolymer 9 | MEDP | 4-2 | $CH_3$ | $CH_3$ | 9 | 0 |
| Copolymer 10 | MEDP | 4-2 | $CH_3$ | $CH_3$ | 9 | 0 |
| Copolymer 11 | MEDP | 4-2 | $CH_3$ | $CH_3$ | 9 | 0 |
| Copolymer 12 | MEDP | 4-2 | $CH_3$ | $CH_3$ | 9 | 0 |
| Copolymer 13 | MEDP | 4-2 | $CH_3$ | $CH_3$ | 9 | 0 |
| Copolymer 14 | MEDP | 4-2 | $CH_3$ | $CH_3$ | 9 | 0 |
| Copolymer 15 | MEDP | 4-2 | $CH_3$ | $CH_3$ | 9 | 0 |
| Copolymer 16 | MEDP | 4-2 | $CH_3$ | $CH_3$ | 9 | 0 |
| Copolymer 17 | MEDP | 4-2 | $CH_3$ | $CH_3$ | 9 | 0 |
| Copolymer 18 | MEDP | 4-2 | $CH_3$ | $CH_3$ | 9 | 0 |
| Copolymer 19 | MEDP | 4-2 | $CH_3$ | $CH_3$ | 9 | 0 |
| Copolymer 20 | MEDP | 4-2 | $CH_3$ | $CH_3$ | 9 | 0 |
| Copolymer 21 | MEDP | 4-2 | $CH_3$ | $CH_3$ | 9 | 0 |
| Copolymer 22 | MEDP | 4-2 | $CH_3$ | $CH_3$ | 9 | 0 |
| Copolymer 23 | MEDP | 4-2 | $CH_3$ | $CH_3$ | 9 | 0 |
| Copolymer 24 | MEDP | 4-2 | $CH_3$ | $CH_3$ | 9 | 0 |
| Copolymer 25 | MEDP | 4-2 | $CH_3$ | $CH_3$ | 9 | 0 |
| Copolymer 26 | MEDP | 4-2 | $CH_3$ | $CH_3$ | 9 | 0 |
| Copolymer 27 | MEDP | 4-2 | $CH_3$ | $CH_3$ | 9 | 0 |
| Copolymer 28 | MEDP | — | — | — | — | — |
| Copolymer 29 | MAA | 4-2 | $CH_3$ | $CH_3$ | 9 | 0 |
| Copolymer 30 | Phosmer M | St, MMA, BMA, MAA | — | — | — | — |

(2)

| | Structure 1 [% by wt] | Structure 2 [% by wt] | Viscosity [mPa · s] | Counter Ion | Neutralization of Copolymer |
|---|---|---|---|---|---|
| Copolymer 1 | 40.0 | 60.0 | 3.4 | K | 100% |
| Copolymer 2 | 40.0 | 60.0 | 3.0 | K | 100% |
| Copolymer 3 | 40.0 | 60.0 | 2.6 | K | 100% |
| Copolymer 4 | 40.0 | 60.0 | 2.7 | K | 100% |
| Copolymer 5 | 40.0 | 60.0 | 2.7 | K | 100% |
| Copolymer 6 | 40.0 | 60.0 | 2.9 | K | 100% |
| Copolymer 7 | 40.0 | 60.0 | 2.9 | K | 100% |
| Copolymer 8 | 40.0 | 60.0 | 2.5 | K | 100% |
| Copolymer 9 | 15.0 | 85.0 | 1.2 | K | 100% |
| Copolymer 10 | 5.0 | 95.0 | 1.9 | K | 100% |
| Copolymer 11 | 15.0 | 85.0 | 1.8 | K | 100% |
| Copolymer 12 | 55.0 | 45. | 1.1 | K | 100% |
| Copolymer 13 | 65.0 | 35.0 | 1.8 | K | 100% |
| Copolymer 14 | 55.0 | 45.0 | 1.9 | K | 100% |
| Copolymer 15 | 55. | 45.0 | 34.1 | K | 100% |
| Copolymer 16 | 65.0 | 35.0 | 28.9 | K | 100% |
| Copolymer 17 | 55.0 | 45.0 | 29.5 | K | 100% |
| Copolymer 18 | 15.0 | 85.0 | 32.0 | K | 100% |
| Copolymer 19 | 5.0 | 95.0 | 29.1 | K | 100% |
| Copolymer 20 | 15.0 | 85.0 | 29. | K | 100% |
| Copolymer 21 | 5.0 | 95.0 | 1.0 | K | 100% |
| Copolymer 22 | 65.0 | 35.0 | 32. | K | 100% |
| Copolymer 23 | 40.0 | 60.0 | 2.8 | Na | 100% |
| Copolymer 24 | 40.0 | 60.0 | 2.9 | Li | 100% |
| Copolymer 25 | 40.0 | 60.0 | 3.3 | DMEA | 100% |
| Copolymer 26 | 40.0 | 60.0 | 3.5 | K/H | 70% |
| Copolymer 27 | 40.0 | 60.0 | 4.2 | K/H | 50% |
| Copolymer 28 | 100.0 | 0. | 4. | K | 100% |
| Copolymer 29 | 50.0 | 50.0 | 10.7 | K | 100% |
| Copolymer 30 | 18.8 | 81.2 | 11.5 | K | 100% |

MEDP: 1-methacryloxyethane-1, 1-diphosphonic acid: formula (I)
AEDP: 1-acryloxyethane-1, 1-diphosphonic acid: formula (II)
St: styrene
MAA: methacrylate
MMA: methylmethacrylate
BMA: butylmethacrylate
DMEA: dimethylethanolamine Pigment Dispersion Preparation Examples 1 to 41

Each of the pigment dispersions was prepared as follows.

Preparation Example 1

Pigment Dispersion 1

The following materials were premixed to prepare a mixed slurry. This was subjected to a circulation dispersion by a disc type media mill (DMR from Ashizawa Finetech Ltd.) with 0.05 mm zirconia beads at a filling rate of 55%, a peripheral speed of 10 m/s, a liquid temperature of 10° C. for 3 min. Then, the resultant dispersion was subjected to centrifugal separation by a centrifugal separator Model 7700 from KUBOTA Corporation to separate coarse particles to prepare a pigment dispersion 1 having a pigment concentration of 16% by weight.

| | |
|---|---|
| Carbon black (NIPEX160 from Degussa AG having a BET specific surface area of 150 m²/g, an average primary particle diameter of 20 nm a pH of 4.0 and a DBP oil absorption of 620 g/100 g | 160 |
| Copolymer 1 | 40 |
| Distilled water | 800 |

Preparation Examples 2 to 5 and 7 to 41

Pigment Dispersions 2 to 5 and 7 to 41

The procedure for preparation of the pigment dispersion 1 in Preparation Example 1 was repeated except for changing the copolymer, the parts thereof, the pigment or the parts of distilled water such that the total is 1000 parts as shown in Table 2 to prepare pigment dispersions 2 to 5 and 7 to 41 each having a pigment concentration of 16% by weight.

Preparation Example 6

Pigment Dispersion 6

The procedure for preparation of the pigment dispersion 1 in Preparation Example 1 was repeated except for replacing the copolymer 1 with an aqueous solution including polyoxyethylene (POE) (m=40)-β-naphthyl ether from Takemoto Oil & Fat Co., Ltd. in an amount of 10% by weight to a pigment dispersion 6 having a pigment concentration of 16% by weight.

The compositions of the pigment dispersions 1 to 41 are shown in Table 2.

TABLE 2

(1)

| | Pigment Dispersion | | | | |
|---|---|---|---|---|---|
| | 1 | 2 | 3 | 4 | 5 |
| Copolymer 1 | 40 | 10 | 20 | 160 | 200 |
| Copolymer 2 | | | | | |
| Copolymer 3 | | | | | |
| Copolymer 4 | | | | | |
| Copolymer 5 | | | | | |
| Copolymer 6 | | | | | |
| Copolymer 7 | | | | | |
| Copolymer 8 | | | | | |
| Copolymer 9 | | | | | |
| Copolymer 10 | | | | | |
| Copolymer 11 | | | | | |
| Copolymer 12 | | | | | |
| Copolymer 13 | | | | | |
| Copolymer 14 | | | | | |
| Copolymer 15 | | | | | |
| Copolymer 16 | | | | | |
| Copolymer 17 | | | | | |
| Copolymer 18 | | | | | |
| Copolymer 19 | | | | | |
| Copolymer 20 | | | | | |
| Copolymer 21 | | | | | |
| Copolymer 22 | | | | | |
| Copolymer 23 | | | | | |
| Copolymer 24 | | | | | |
| Copolymer 25 | | | | | |
| Copolymer 26 | | | | | |
| Copolymer 27 | | | | | |
| Copolymer 28 | | | | | |
| Copolymer 29 | | | | | |
| Copolymer 30 [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

(2)

| | Pigment Dispersion | | | | |
|---|---|---|---|---|---|
| | 6 | 7 | 8 | 9 | 10 |
| Copolymer 1 | | 40 | 40 | 40 | |
| Copolymer 2 | | | | | 40 |
| Copolymer 3 | | | | | |
| Copolymer 4 | | | | | |

TABLE 2-continued

| | | | | | |
|---|---|---|---|---|---|
| Copolymer 5 | | | | | |
| Copolymer 6 | | | | | |
| Copolymer 7 | | | | | |
| Copolymer 8 | | | | | |
| Copolymer 9 | | | | | |
| Copolymer 10 | | | | | |
| Copolymer 11 | | | | | |
| Copolymer 12 | | | | | |
| Copolymer 13 | | | | | |
| Copolymer 14 | | | | | |
| Copolymer 15 | | | | | |
| Copolymer 16 | | | | | |
| Copolymer 17 | | | | | |
| Copolymer 18 | | | | | |
| Copolymer 19 | | | | | |
| Copolymer 20 | | | | | |
| Copolymer 21 | | | | | |
| Copolymer 22 | | | | | |
| Copolymer 23 | | | | | |
| Copolymer 24 | | | | | |
| Copolymer 25 | | | | | |
| Copolymer 26 | | | | | |
| Copolymer 27 | | | | | |
| Copolymer 28 | | | | | |
| Copolymer 29 | | | | | |
| Copolymer 30 | | | | | |
| [*] | 40 | | | | |
| Carbon Black | 160 | | | | 160 |
| Pigment Blue 15:3 | | 160 | | | |
| Pigment Red 122 | | | 160 | | |
| Pigment Yellow 74 | | | | 160 | |
| Distilled Water | Balance | Balance | Balance | Balance | Balance |
| Total | 1000 | 1000 | 1000 | 1000 | 1000 |

(3)

| | Pigment Dispersion | | | | |
|---|---|---|---|---|---|
| | 11 | 12 | 13 | 14 | 15 |
| Copolymer 1 | | | | | |
| Copolymer 2 | | | | | |
| Copolymer 3 | 40 | | | | |
| Copolymer 4 | | 40 | | | |
| Copolymer 5 | | | 40 | | |
| Copolymer 6 | | | | 40 | |
| Copolymer 7 | | | | | 40 |
| Copolymer 8 | | | | | |
| Copolymer 9 | | | | | |
| Copolymer 10 | | | | | |
| Copolymer 11 | | | | | |
| Copolymer 12 | | | | | |
| Copolymer 13 | | | | | |
| Copolymer 14 | | | | | |
| Copolymer 15 | | | | | |
| Copolymer 16 | | | | | |
| Copolymer 17 | | | | | |
| Copolymer 18 | | | | | |
| Copolymer 19 | | | | | |
| Copolymer 20 | | | | | |
| Copolymer 21 | | | | | |
| Copolymer 22 | | | | | |
| Copolymer 23 | | | | | |
| Copolymer 24 | | | | | |
| Copolymer 25 | | | | | |
| Copolymer 26 | | | | | |
| Copolymer 27 | | | | | |
| Copolymer 28 | | | | | |
| Copolymer 29 | | | | | |
| Copolymer 30 | | | | | |
| [*] | | | | | |
| Carbon Black | 160 | 160 | 160 | 160 | 160 |
| Pigment Blue 15:3 | | | | | |
| Pigment Red 122 | | | | | |

TABLE 2-continued

| | | | | | |
|---|---|---|---|---|---|
| Pigment Yellow 74 | | | | | |
| Distilled Water | Balance | Balance | Balance | Balance | Balance |
| Total | 1000 | 1000 | 1000 | 1000 | 1000 |

(4)

| | Pigment Dispersion | | | | |
|---|---|---|---|---|---|
| | 16 | 17 | 18 | 19 | 20 |
| Copolymer 1 | | | | | |
| Copolymer 2 | | | | | |
| Copolymer 3 | | | | | |
| Copolymer 4 | | | | | |
| Copolymer 5 | | | | | |
| Copolymer 6 | | | | | |
| Copolymer 7 | | | | | |
| Copolymer 8 | 40 | | | | |
| Copolymer 9 | | 40 | | | |
| Copolymer 10 | | | 40 | | |
| Copolymer 11 | | | | 40 | |
| Copolymer 12 | | | | | 40 |
| Copolymer 13 | | | | | |
| Copolymer 14 | | | | | |
| Copolymer 15 | | | | | |
| Copolymer 16 | | | | | |
| Copolymer 17 | | | | | |
| Copolymer 18 | | | | | |
| Copolymer 19 | | | | | |
| Copolymer 20 | | | | | |
| Copolymer 21 | | | | | |
| Copolymer 22 | | | | | |
| Copolymer 23 | | | | | |
| Copolymer 24 | | | | | |
| Copolymer 25 | | | | | |
| Copolymer 26 | | | | | |
| Copolymer 27 | | | | | |
| Copolymer 28 | | | | | |
| Copolymer 29 | | | | | |
| Copolymer 30 | | | | | |
| [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

(5)

| | Pigment Dispersion | | | | |
|---|---|---|---|---|---|
| | 21 | 22 | 23 | 24 | 25 |
| Copolymer 1 | | | | | |
| Copolymer 2 | | | | | |
| Copolymer 3 | | | | | |
| Copolymer 4 | | | | | |
| Copolymer 5 | | | | | |
| Copolymer 6 | | | | | |
| Copolymer 7 | | | | | |
| Copolymer 8 | | | | | |
| Copolymer 9 | | | | | |
| Copolymer 10 | | | | | |
| Copolymer 11 | | | | | |
| Copolymer 12 | | | | | |
| Copolymer 13 | 40 | | | | |
| Copolymer 14 | | 40 | | | |
| Copolymer 15 | | | 40 | | |
| Copolymer 16 | | | | 40 | |
| Copolymer 17 | | | | | 40 |
| Copolymer 18 | | | | | |
| Copolymer 19 | | | | | |
| Copolymer 20 | | | | | |

TABLE 2-continued

| | | | | | |
|---|---|---|---|---|---|
| Copolymer 21 | | | | | |
| Copolymer 22 | | | | | |
| Copolymer 23 | | | | | |
| Copolymer 24 | | | | | |
| Copolymer 25 | | | | | |
| Copolymer 26 | | | | | |
| Copolymer 27 | | | | | |
| Copolymer 28 | | | | | |
| Copolymer 29 | | | | | |
| Copolymer 30 [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

(6)

| | Pigment Dispersion | | | | |
|---|---|---|---|---|---|
| | 26 | 26 | 28 | 29 | 30 |
| Copolymer 1 | | | | | |
| Copolymer 2 | | | | | |
| Copolymer 3 | | | | | |
| Copolymer 4 | | | | | |
| Copolymer 5 | | | | | |
| Copolymer 6 | | | | | |
| Copolymer 7 | | | | | |
| Copolymer 8 | | | | | |
| Copolymer 9 | | | | | |
| Copolymer 10 | | | | | |
| Copolymer 11 | | | | | |
| Copolymer 12 | | | | | |
| Copolymer 13 | | | | | |
| Copolymer 14 | | | | | |
| Copolymer 15 | | | | | |
| Copolymer 16 | | | | | |
| Copolymer 17 | | | | | |
| Copolymer 18 | 40 | | | | |
| Copolymer 19 | | 40 | | | |
| Copolymer 20 | | | 40 | | |
| Copolymer 21 | | | | 40 | |
| Copolymer 22 | | | | | 40 |
| Copolymer 23 | | | | | |
| Copolymer 24 | | | | | |
| Copolymer 25 | | | | | |
| Copolymer 26 | | | | | |
| Copolymer 27 | | | | | |
| Copolymer 28 | | | | | |
| Copolymer 29 | | | | | |
| Copolymer 30 [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

(7)

| | Pigment Dispersion | | | | |
|---|---|---|---|---|---|
| | 31 | 32 | 33 | 34 | 35 |
| Copolymer 1 | | | | | |
| Copolymer 2 | | | | | |
| Copolymer 3 | | | | | |
| Copolymer 4 | | | | | |

TABLE 2-continued

|  |  |  |  |  |  |
|---|---|---|---|---|---|
| Copolymer 5 |  |  |  |  |  |
| Copolymer 6 |  |  |  |  |  |
| Copolymer 7 |  |  |  |  |  |
| Copolymer 8 |  |  |  |  |  |
| Copolymer 9 |  |  |  |  |  |
| Copolymer 10 |  |  |  |  |  |
| Copolymer 11 |  |  |  |  |  |
| Copolymer 12 |  |  |  |  |  |
| Copolymer 13 |  |  |  |  |  |
| Copolymer 14 |  |  |  |  |  |
| Copolymer 15 |  |  |  |  |  |
| Copolymer 16 |  |  |  |  |  |
| Copolymer 17 |  |  |  |  |  |
| Copolymer 18 |  |  |  |  |  |
| Copolymer 19 |  |  |  |  |  |
| Copolymer 20 |  |  |  |  |  |
| Copolymer 21 |  |  |  |  |  |
| Copolymer 22 |  |  |  |  |  |
| Copolymer 23 | 40 |  |  |  |  |
| Copolymer 24 |  | 40 |  |  |  |
| Copolymer 25 |  |  | 40 |  |  |
| Copolymer 26 |  |  |  | 40 |  |
| Copolymer 27 |  |  |  |  | 40 |
| Copolymer 28 |  |  |  |  |  |
| Copolymer 29 |  |  |  |  |  |
| Copolymer 30 [*] |  |  |  |  |  |
| Carbon Black | 160 | 160 | 160 | 160 | 160 |
| Pigment Blue 15:3 |  |  |  |  |  |
| Pigment Red 122 |  |  |  |  |  |
| Pigment Yellow 74 |  |  |  |  |  |
| Distilled Water | Balance | Balance | Balance | Balance | Balance |
| Total | 1000 | 1000 | 1000 | 1000 | 1000 |

(8)

| | Pigment Dispersion | | | | | |
|---|---|---|---|---|---|---|
|  | 36 | 37 | 38 | 39 | 40 | 41 |
| Copolymer 1 |  |  |  |  |  |  |
| Copolymer 2 |  |  |  |  |  |  |
| Copolymer 3 |  |  |  |  |  |  |
| Copolymer 4 |  |  |  |  |  |  |
| Copolymer 5 |  |  |  |  |  |  |
| Copolymer 6 |  |  |  |  |  |  |
| Copolymer 7 |  |  |  |  |  |  |
| Copolymer 8 |  |  |  |  |  |  |
| Copolymer 9 |  |  |  |  |  |  |
| Copolymer 10 |  |  |  |  |  |  |
| Copolymer 11 |  |  |  |  |  |  |
| Copolymer 12 |  |  |  |  |  |  |
| Copolymer 13 |  |  |  |  |  |  |
| Copolymer 14 |  |  |  |  |  |  |
| Copolymer 15 |  |  |  |  |  |  |
| Copolymer 16 |  |  |  |  |  |  |
| Copolymer 17 |  |  |  |  |  |  |
| Copolymer 18 |  |  |  |  |  |  |
| Copolymer 19 |  |  |  |  |  |  |
| Copolymer 20 |  |  |  |  |  |  |
| Copolymer 21 |  |  |  |  |  |  |
| Copolymer 22 |  |  |  |  |  |  |
| Copolymer 23 |  |  |  |  |  |  |
| Copolymer 24 |  |  |  |  |  |  |
| Copolymer 25 |  |  |  |  |  |  |
| Copolymer 26 |  |  |  |  |  |  |
| Copolymer 27 |  |  |  |  |  |  |
| Copolymer 28 | 40 |  |  |  |  |  |
| Copolymer 29 |  | 40 |  | 40 | 40 | 40 |
| Copolymer 30 [*] |  |  | 40 |  |  |  |
| Carbon Black | 160 | 160 | 160 |  |  |  |
| Pigment Blue 15:3 |  |  |  | 160 |  |  |
| Pigment Red 122 |  |  |  |  | 160 |  |

TABLE 2-continued

| Pigment Yellow 74 | | | | | | 160 |
| --- | --- | --- | --- | --- | --- | --- |
| Distilled Water | Balance | Balance | Balance | Balance | Balance | Balance |
| Total | 1000 | 1000 | 1000 | 1000 | 1000 | 1000 |

[*]: aqueous solution including polyoxyethylene (POE) (m = 40)-β-naphthyl ether in an amount of 10% by weight Preparation of Ink for Inkjet Recording Example 1

The following materials were mixed and stirred for 1 hr. The resultant dispersion was subjected to pressure filtration by a polyvinylidenefluoride membrane filter having an average pore diameter of 5.0 μm to remove coarse particles and dusts. Thus, an ink was prepared.

| | |
| --- | --- |
| Pigment dispersion 1 (pigment concentration 16%) | 50 |
| Glycerin | 10 |

| | |
| --- | --- |
| 1,3-butanediol | 20 |
| Distilled water | 20 |

Examples 2 to 37 and Comparative Examples 1 to 6

The procedure for preparation of the ink in Example 1 was repeated except for using materials shown in Table 3 to prepare inks of Examples 2 to 37 and Comparative Examples 1 to 6.

TABLE 3

(1)

| | | Example | | | | |
| --- | --- | --- | --- | --- | --- | --- |
| | | 1 | 2 | 3 | 4 | 5 |
| Pigment Dispersion | Pigment dispersion 1 | 50 | | | | |
| | Pigment dispersion 2 | | 50 | | | |
| | Pigment dispersion 3 | | | 50 | | |
| | Pigment dispersion 4 | | | | 50 | |
| | Pigment dispersion 5 | | | | | 50 |
| | Pigment dispersion 6 | | | | | |
| | Pigment dispersion 7 | | | | | |
| | Pigment dispersion 8 | | | | | |
| | Pigment dispersion 9 | | | | | |
| | Pigment dispersion 10 | | | | | |
| | Pigment dispersion 11 | | | | | |
| | Pigment dispersion 12 | | | | | |
| | Pigment dispersion 13 | | | | | |
| | Pigment dispersion 14 | | | | | |
| | Pigment dispersion 15 | | | | | |
| | Pigment dispersion 16 | | | | | |
| | Pigment dispersion 17 | | | | | |
| | Pigment dispersion 18 | | | | | |
| | Pigment dispersion 19 | | | | | |
| | Pigment dispersion 20 | | | | | |
| | Pigment dispersion 21 | | | | | |
| | Pigment dispersion 22 | | | | | |
| | Pigment dispersion 23 | | | | | |
| | Pigment dispersion 24 | | | | | |
| | Pigment dispersion 25 | | | | | |
| | Pigment dispersion 26 | | | | | |
| | Pigment dispersion 27 | | | | | |
| | Pigment dispersion 28 | | | | | |
| | Pigment dispersion 29 | | | | | |
| | Pigment dispersion 30 | | | | | |
| | Pigment dispersion 31 | | | | | |
| | Pigment dispersion 32 | | | | | |
| | Pigment dispersion 33 | | | | | |
| | Pigment dispersion 34 | | | | | |
| | Pigment dispersion 35 | | | | | |
| | Pigment dispersion 36 | | | | | |
| | Pigment dispersion 37 | | | | | |
| | Pigment dispersion 38 | | | | | |
| | Pigment dispersion 39 | | | | | |
| | Pigment dispersion 40 | | | | | |
| | Pigment dispersion 41 | | | | | |

TABLE 3-continued

| | | | | | | |
|---|---|---|---|---|---|---|
| Additive | Copolymer 1 | | | | | |
| Hydro-soluble solvent | Glycerin | 10 | 10 | 10 | 10 | 10 |
| | 1,3-butanediol | 20 | 20 | 20 | 20 | 20 |
| | Trimethylol Propane | | | | | |
| | 2-pyrrolidone | | | | | |
| Solvent | Distilled Water | Balance | Balance | Balance | Balance | Balance |
| | Total | 100 | 100 | 100 | 100 | 100 |

(2)

| | | Example | | | | |
|---|---|---|---|---|---|---|
| | | 6 | 7 | 8 | 9 | 10 |
| Pigment Dispersion | Pigment dispersion 1 | | 50 | 50 | | |
| | Pigment dispersion 2 | | | | | |
| | Pigment dispersion 3 | | | | | |
| | Pigment dispersion 4 | | | | | |
| | Pigment dispersion 5 | | | | | |
| | Pigment dispersion 6 | 50 | | | | |
| | Pigment dispersion 7 | | | | 30 | |
| | Pigment dispersion 8 | | | | | 50 |
| | Pigment dispersion 9 | | | | | |
| | Pigment dispersion 10 | | | | | |
| | Pigment dispersion 11 | | | | | |
| | Pigment dispersion 12 | | | | | |
| | Pigment dispersion 13 | | | | | |
| | Pigment dispersion 14 | | | | | |
| | Pigment dispersion 15 | | | | | |
| | Pigment dispersion 16 | | | | | |
| | Pigment dispersion 17 | | | | | |
| | Pigment dispersion 18 | | | | | |
| | Pigment dispersion 19 | | | | | |
| | Pigment dispersion 20 | | | | | |
| | Pigment dispersion 21 | | | | | |
| | Pigment dispersion 22 | | | | | |
| | Pigment dispersion 23 | | | | | |
| | Pigment dispersion 24 | | | | | |
| | Pigment dispersion 25 | | | | | |
| | Pigment dispersion 26 | | | | | |
| | Pigment dispersion 27 | | | | | |
| | Pigment dispersion 28 | | | | | |
| | Pigment dispersion 29 | | | | | |
| | Pigment dispersion 30 | | | | | |
| | Pigment dispersion 31 | | | | | |
| | Pigment dispersion 32 | | | | | |
| | Pigment dispersion 33 | | | | | |
| | Pigment dispersion 34 | | | | | |
| | Pigment dispersion 35 | | | | | |
| | Pigment dispersion 36 | | | | | |
| | Pigment dispersion 37 | | | | | |
| | Pigment dispersion 38 | | | | | |
| | Pigment dispersion 39 | | | | | |
| | Pigment dispersion 40 | | | | | |
| | Pigment dispersion 41 | | | | | |
| Additive | Copolymer 1 | 4 | | | | |
| Hydro-soluble solvent | Glycerin | 10 | | 20 | 10 | 10 |
| | 1,3-butanediol | 20 | 30 | | 20 | 20 |
| | Trimethylol Propane | | | 5 | | |
| | 2-pyrrolidone | | | 5 | | |
| Solvent | Distilled Water | Balance | Balance | Balance | Balance | Balance |
| | Total | 100 | 100 | 100 | 100 | 100 |

(3)

| | | Example | | | | |
|---|---|---|---|---|---|---|
| | | 11 | 12 | 13 | 14 | 15 |
| Pigment Dispersion | Pigment dispersion 1 | | | | | |
| | Pigment dispersion 2 | | | | | |
| | Pigment dispersion 3 | | | | | |
| | Pigment dispersion 4 | | | | | |
| | Pigment dispersion 5 | | | | | |
| | Pigment dispersion 6 | | | | | |
| | Pigment dispersion 7 | | | | | |
| | Pigment dispersion 8 | | | | | |
| | Pigment dispersion 9 | 30 | | | | |

TABLE 3-continued

|  |  | | | | | |
|---|---|---|---|---|---|---|
| | Pigment dispersion 10 | 50 | | | | |
| | Pigment dispersion 11 | | 50 | | | |
| | Pigment dispersion 12 | | | 50 | | |
| | Pigment dispersion 13 | | | | 50 | |
| | Pigment dispersion 14 | | | | | |
| | Pigment dispersion 15 | | | | | |
| | Pigment dispersion 16 | | | | | |
| | Pigment dispersion 17 | | | | | |
| | Pigment dispersion 18 | | | | | |
| | Pigment dispersion 19 | | | | | |
| | Pigment dispersion 20 | | | | | |
| | Pigment dispersion 21 | | | | | |
| | Pigment dispersion 22 | | | | | |
| | Pigment dispersion 23 | | | | | |
| | Pigment dispersion 24 | | | | | |
| | Pigment dispersion 25 | | | | | |
| | Pigment dispersion 26 | | | | | |
| | Pigment dispersion 27 | | | | | |
| | Pigment dispersion 28 | | | | | |
| | Pigment dispersion 29 | | | | | |
| | Pigment dispersion 30 | | | | | |
| | Pigment dispersion 31 | | | | | |
| | Pigment dispersion 32 | | | | | |
| | Pigment dispersion 33 | | | | | |
| | Pigment dispersion 34 | | | | | |
| | Pigment dispersion 35 | | | | | |
| | Pigment dispersion 36 | | | | | |
| | Pigment dispersion 37 | | | | | |
| | Pigment dispersion 38 | | | | | |
| | Pigment dispersion 39 | | | | | |
| | Pigment dispersion 40 | | | | | |
| | Pigment dispersion 41 | | | | | |
| Additive | Copolymer 1 | | | | | |
| Hydro- | Glycerin | 10 | 10 | 10 | 10 | 10 |
| soluble | 1,3-butanediol | 20 | 20 | 20 | 20 | 20 |
| solvent | Trimethylol Propane | | | | | |
| | 2-pyrrolidone | | | | | |
| Solvent | Distilled Water | Balance | Balance | Balance | Balance | Balance |
| | Total | 100 | 100 | 100 | 100 | 100 |

(4)

| | | Example | | | | |
|---|---|---|---|---|---|---|
| | | 16 | 17 | 18 | 19 | 20 |
| Pigment Dispersion | Pigment dispersion 1 | | | | | |
| | Pigment dispersion 2 | | | | | |
| | Pigment dispersion 3 | | | | | |
| | Pigment dispersion 4 | | | | | |
| | Pigment dispersion 5 | | | | | |
| | Pigment dispersion 6 | | | | | |
| | Pigment dispersion 7 | | | | | |
| | Pigment dispersion 8 | | | | | |
| | Pigment dispersion 9 | | | | | |
| | Pigment dispersion 10 | | | | | |
| | Pigment dispersion 11 | | | | | |
| | Pigment dispersion 12 | | | | | |
| | Pigment dispersion 13 | | | | | |
| | Pigment dispersion 14 | 50 | | | | |
| | Pigment dispersion 15 | | 50 | | | |
| | Pigment dispersion 16 | | | 50 | | |
| | Pigment dispersion 17 | | | | 50 | |
| | Pigment dispersion 18 | | | | | 50 |
| | Pigment dispersion 19 | | | | | |
| | Pigment dispersion 20 | | | | | |
| | Pigment dispersion 21 | | | | | |
| | Pigment dispersion 22 | | | | | |
| | Pigment dispersion 23 | | | | | |
| | Pigment dispersion 24 | | | | | |
| | Pigment dispersion 25 | | | | | |
| | Pigment dispersion 26 | | | | | |
| | Pigment dispersion 27 | | | | | |
| | Pigment dispersion 28 | | | | | |
| | Pigment dispersion 29 | | | | | |
| | Pigment dispersion 30 | | | | | |
| | Pigment dispersion 31 | | | | | |
| | Pigment dispersion 32 | | | | | |
| | Pigment dispersion 33 | | | | | |

TABLE 3-continued (5)

|  |  | Example | | | | |
|---|---|---|---|---|---|---|
|  |  | 21 | 22 | 23 | 24 | 25 |
| Pigment Dispersion | Pigment dispersion 1 | | | | | |
|  | Pigment dispersion 2 | | | | | |
|  | Pigment dispersion 3 | | | | | |
|  | Pigment dispersion 4 | | | | | |
|  | Pigment dispersion 5 | | | | | |
|  | Pigment dispersion 6 | | | | | |
|  | Pigment dispersion 7 | | | | | |
|  | Pigment dispersion 8 | | | | | |
|  | Pigment dispersion 9 | | | | | |
|  | Pigment dispersion 10 | | | | | |
|  | Pigment dispersion 11 | | | | | |
|  | Pigment dispersion 12 | | | | | |
|  | Pigment dispersion 13 | | | | | |
|  | Pigment dispersion 14 | | | | | |
|  | Pigment dispersion 15 | | | | | |
|  | Pigment dispersion 16 | | | | | |
|  | Pigment dispersion 17 | | | | | |
|  | Pigment dispersion 18 | | | | | |
|  | Pigment dispersion 19 | 50 | | | | |
|  | Pigment dispersion 20 | | 50 | | | |
|  | Pigment dispersion 21 | | | 50 | | |
|  | Pigment dispersion 22 | | | | 50 | |
|  | Pigment dispersion 23 | | | | | 50 |
|  | Pigment dispersion 24 | | | | | |
|  | Pigment dispersion 25 | | | | | |
|  | Pigment dispersion 26 | | | | | |
|  | Pigment dispersion 27 | | | | | |
|  | Pigment dispersion 28 | | | | | |
|  | Pigment dispersion 29 | | | | | |
|  | Pigment dispersion 30 | | | | | |
|  | Pigment dispersion 31 | | | | | |
|  | Pigment dispersion 32 | | | | | |
|  | Pigment dispersion 33 | | | | | |
|  | Pigment dispersion 34 | | | | | |
|  | Pigment dispersion 35 | | | | | |
|  | Pigment dispersion 36 | | | | | |
|  | Pigment dispersion 37 | | | | | |
|  | Pigment dispersion 38 | | | | | |
|  | Pigment dispersion 39 | | | | | |
|  | Pigment dispersion 40 | | | | | |
|  | Pigment dispersion 41 | | | | | |
| Additive | Copolymer 1 | | | | | |
| Hydro-soluble solvent | Glycerin | 10 | 10 | 10 | 10 | 10 |
|  | 1,3-butanediol | 20 | 20 | 20 | 20 | 20 |
|  | Trimethylol Propane | | | | | |
|  | 2-pyrrolidone | | | | | |
| Solvent | Distilled Water | Balance | Balance | Balance | Balance | Balance |
|  | Total | 100 | 100 | 100 | 100 | 100 |

(6)

|  |  | Example | | | | |
|---|---|---|---|---|---|---|
|  |  | 26 | 27 | 28 | 29 | 30 |
| Pigment Dispersion | Pigment dispersion 1 | | | | | |
|  | Pigment dispersion 2 | | | | | |

TABLE 3-continued

|  |  | 26 | 27 | 28 | 29 | 30 |
|---|---|---|---|---|---|---|
|  | Pigment dispersion 3 |  |  |  |  |  |
|  | Pigment dispersion 4 |  |  |  |  |  |
|  | Pigment dispersion 5 |  |  |  |  |  |
|  | Pigment dispersion 6 |  |  |  |  |  |
|  | Pigment dispersion 7 |  |  |  |  |  |
|  | Pigment dispersion 8 |  |  |  |  |  |
|  | Pigment dispersion 9 |  |  |  |  |  |
|  | Pigment dispersion 10 |  |  |  |  |  |
|  | Pigment dispersion 11 |  |  |  |  |  |
|  | Pigment dispersion 12 |  |  |  |  |  |
|  | Pigment dispersion 13 |  |  |  |  |  |
|  | Pigment dispersion 14 |  |  |  |  |  |
|  | Pigment dispersion 15 |  |  |  |  |  |
|  | Pigment dispersion 16 |  |  |  |  |  |
|  | Pigment dispersion 17 |  |  |  |  |  |
|  | Pigment dispersion 18 |  |  |  |  |  |
|  | Pigment dispersion 19 |  |  |  |  |  |
|  | Pigment dispersion 20 |  |  |  |  |  |
|  | Pigment dispersion 21 |  |  |  |  |  |
|  | Pigment dispersion 22 |  |  |  |  |  |
|  | Pigment dispersion 23 |  |  |  |  |  |
|  | Pigment dispersion 24 | 50 |  |  |  |  |
|  | Pigment dispersion 25 |  | 50 |  |  |  |
|  | Pigment dispersion 26 |  |  | 50 |  |  |
|  | Pigment dispersion 27 |  |  |  | 50 |  |
|  | Pigment dispersion 28 |  |  |  |  | 50 |
|  | Pigment dispersion 29 |  |  |  |  |  |
|  | Pigment dispersion 30 |  |  |  |  |  |
|  | Pigment dispersion 31 |  |  |  |  |  |
|  | Pigment dispersion 32 |  |  |  |  |  |
|  | Pigment dispersion 33 |  |  |  |  |  |
|  | Pigment dispersion 34 |  |  |  |  |  |
|  | Pigment dispersion 35 |  |  |  |  |  |
|  | Pigment dispersion 36 |  |  |  |  |  |
|  | Pigment dispersion 37 |  |  |  |  |  |
|  | Pigment dispersion 38 |  |  |  |  |  |
|  | Pigment dispersion 39 |  |  |  |  |  |
|  | Pigment dispersion 40 |  |  |  |  |  |
|  | Pigment dispersion 41 |  |  |  |  |  |
| Additive | Copolymer 1 |  |  |  |  |  |
| Hydro-soluble solvent | Glycerin | 10 | 10 | 10 | 10 | 10 |
|  | 1,3-butanediol | 20 | 20 | 20 | 20 | 20 |
|  | Trimethylol Propane |  |  |  |  |  |
|  | 2-pyrrolidone |  |  |  |  |  |
| Solvent | Distilled Water | Balance | Balance | Balance | Balance | Balance |
|  | Total | 100 | 100 | 100 | 100 | 100 |

(7)

|  |  | Example | | | | |
|---|---|---|---|---|---|---|
|  |  | 31 | 32 | 33 | 34 | 35 |
| Pigment Dispersion | Pigment dispersion 1 |  |  |  |  |  |
|  | Pigment dispersion 2 |  |  |  |  |  |
|  | Pigment dispersion 3 |  |  |  |  |  |
|  | Pigment dispersion 4 |  |  |  |  |  |
|  | Pigment dispersion 5 |  |  |  |  |  |
|  | Pigment dispersion 6 |  |  |  |  |  |
|  | Pigment dispersion 7 |  |  |  |  |  |
|  | Pigment dispersion 8 |  |  |  |  |  |
|  | Pigment dispersion 9 |  |  |  |  |  |
|  | Pigment dispersion 10 |  |  |  |  |  |
|  | Pigment dispersion 11 |  |  |  |  |  |
|  | Pigment dispersion 12 |  |  |  |  |  |
|  | Pigment dispersion 13 |  |  |  |  |  |
|  | Pigment dispersion 14 |  |  |  |  |  |
|  | Pigment dispersion 15 |  |  |  |  |  |
|  | Pigment dispersion 16 |  |  |  |  |  |
|  | Pigment dispersion 17 |  |  |  |  |  |
|  | Pigment dispersion 18 |  |  |  |  |  |
|  | Pigment dispersion 19 |  |  |  |  |  |
|  | Pigment dispersion 20 |  |  |  |  |  |
|  | Pigment dispersion 21 |  |  |  |  |  |
|  | Pigment dispersion 22 |  |  |  |  |  |
|  | Pigment dispersion 23 |  |  |  |  |  |
|  | Pigment dispersion 24 |  |  |  |  |  |
|  | Pigment dispersion 25 |  |  |  |  |  |
|  | Pigment dispersion 26 |  |  |  |  |  |

TABLE 3-continued

|  |  |  |  |  |  |  |
|---|---|---|---|---|---|---|
|  | Pigment dispersion 27 |  |  |  |  |  |
|  | Pigment dispersion 28 |  |  |  |  |  |
|  | Pigment dispersion 29 | 50 |  |  |  |  |
|  | Pigment dispersion 30 |  | 50 |  |  |  |
|  | Pigment dispersion 31 |  |  | 50 |  |  |
|  | Pigment dispersion 32 |  |  |  | 50 |  |
|  | Pigment dispersion 33 |  |  |  |  | 50 |
|  | Pigment dispersion 34 |  |  |  |  |  |
|  | Pigment dispersion 35 |  |  |  |  |  |
|  | Pigment dispersion 36 |  |  |  |  |  |
|  | Pigment dispersion 37 |  |  |  |  |  |
|  | Pigment dispersion 38 |  |  |  |  |  |
|  | Pigment dispersion 39 |  |  |  |  |  |
|  | Pigment dispersion 40 |  |  |  |  |  |
|  | Pigment dispersion 41 |  |  |  |  |  |
| Additive | Copolymer 1 |  |  |  |  |  |
| Hydro-soluble solvent | Glycerin | 10 | 10 | 10 | 10 | 10 |
|  | 1,3-butanediol | 20 | 20 | 20 | 20 | 20 |
|  | Trimethylol Propane |  |  |  |  |  |
|  | 2-pyrrolidone |  |  |  |  |  |
| Solvent | Distilled Water | Balance | Balance | Balance | Balance | Balance |
|  | Total | 100 | 100 | 100 | 100 | 100 |

(8)

|  |  | Example | | Com. Example | | |
|---|---|---|---|---|---|---|
|  |  | 36 | 37 | 1 | 2 | 3 |
| Pigment Dispersion | Pigment dispersion 1 |  |  |  |  |  |
|  | Pigment dispersion 2 |  |  |  |  |  |
|  | Pigment dispersion 3 |  |  |  |  |  |
|  | Pigment dispersion 4 |  |  |  |  |  |
|  | Pigment dispersion 5 |  |  |  |  |  |
|  | Pigment dispersion 6 |  |  |  |  |  |
|  | Pigment dispersion 7 |  |  |  |  |  |
|  | Pigment dispersion 8 |  |  |  |  |  |
|  | Pigment dispersion 9 |  |  |  |  |  |
|  | Pigment dispersion 10 |  |  |  |  |  |
|  | Pigment dispersion 11 |  |  |  |  |  |
|  | Pigment dispersion 12 |  |  |  |  |  |
|  | Pigment dispersion 13 |  |  |  |  |  |
|  | Pigment dispersion 14 |  |  |  |  |  |
|  | Pigment dispersion 15 |  |  |  |  |  |
|  | Pigment dispersion 16 |  |  |  |  |  |
|  | Pigment dispersion 17 |  |  |  |  |  |
|  | Pigment dispersion 18 |  |  |  |  |  |
|  | Pigment dispersion 19 |  |  |  |  |  |
|  | Pigment dispersion 20 |  |  |  |  |  |
|  | Pigment dispersion 21 |  |  |  |  |  |
|  | Pigment dispersion 22 |  |  |  |  |  |
|  | Pigment dispersion 23 |  |  |  |  |  |
|  | Pigment dispersion 24 |  |  |  |  |  |
|  | Pigment dispersion 25 |  |  |  |  |  |
|  | Pigment dispersion 26 |  |  |  |  |  |
|  | Pigment dispersion 27 |  |  |  |  |  |
|  | Pigment dispersion 28 |  |  |  |  |  |
|  | Pigment dispersion 29 |  |  |  |  |  |
|  | Pigment dispersion 30 |  |  |  |  |  |
|  | Pigment dispersion 31 |  |  |  |  |  |
|  | Pigment dispersion 32 |  |  |  |  |  |
|  | Pigment dispersion 33 |  |  |  |  |  |
|  | Pigment dispersion 34 | 50 |  |  |  |  |
|  | Pigment dispersion 35 |  | 50 |  |  |  |
|  | Pigment dispersion 36 |  |  | 50 |  |  |
|  | Pigment dispersion 37 |  |  |  | 50 |  |
|  | Pigment dispersion 38 |  |  |  |  | 50 |
|  | Pigment dispersion 39 |  |  |  |  |  |
|  | Pigment dispersion 40 |  |  |  |  |  |
|  | Pigment dispersion 41 |  |  |  |  |  |
| Additive | Copolymer 1 |  |  |  |  |  |
| Hydro-soluble solvent | Glycerin | 10 | 10 | 10 | 10 | 10 |
|  | 1,3-butanediol | 20 | 20 | 20 | 20 | 20 |
|  | Trimethylol Propane |  |  |  |  |  |
|  | 2-pyrrolidone |  |  |  |  |  |
| Solvent | Distilled Water | Balance | Balance | Balance | Balance | Balance |
|  | Total | 100 | 100 | 100 | 100 | 100 |

TABLE 3-continued

| | (9) | | | |
|---|---|---|---|---|
| | | \multicolumn{3}{c}{Com. Example} |
| | | 4 | 5 | 6 |
| Pigment Dispersion | Pigment dispersion 1 | | | |
| | Pigment dispersion 2 | | | |
| | Pigment dispersion 3 | | | |
| | Pigment dispersion 4 | | | |
| | Pigment dispersion 5 | | | |
| | Pigment dispersion 6 | | | |
| | Pigment dispersion 7 | | | |
| | Pigment dispersion 8 | | | |
| | Pigment dispersion 9 | | | |
| | Pigment dispersion 10 | | | |
| | Pigment dispersion 11 | | | |
| | Pigment dispersion 12 | | | |
| | Pigment dispersion 13 | | | |
| | Pigment dispersion 14 | | | |
| | Pigment dispersion 15 | | | |
| | Pigment dispersion 16 | | | |
| | Pigment dispersion 17 | | | |
| | Pigment dispersion 18 | | | |
| | Pigment dispersion 19 | | | |
| | Pigment dispersion 20 | | | |
| | Pigment dispersion 21 | | | |
| | Pigment dispersion 22 | | | |
| | Pigment dispersion 23 | | | |
| | Pigment dispersion 24 | | | |
| | Pigment dispersion 25 | | | |
| | Pigment dispersion 26 | | | |
| | Pigment dispersion 27 | | | |
| | Pigment dispersion 28 | | | |
| | Pigment dispersion 29 | | | |
| | Pigment dispersion 30 | | | |
| | Pigment dispersion 31 | | | |
| | Pigment dispersion 32 | | | |
| | Pigment dispersion 33 | | | |
| | Pigment dispersion 34 | | | |
| | Pigment dispersion 35 | | | |
| | Pigment dispersion 36 | | | |
| | Pigment dispersion 37 | | | |
| | Pigment dispersion 38 | | | |
| | Pigment dispersion 39 | 50 | | |
| | Pigment dispersion 40 | | 50 | |
| | Pigment dispersion 41 | | | 50 |
| Additive | Copolymer 1 | | | |
| Hydro-soluble solvent | Glycerin | 10 | 10 | 10 |
| | 1,3-butanediol | 20 | 20 | 20 |
| | Trimethylol Propane | | | |
| | 2-pyrrolidone | | | |
| Solvent | Distilled Water | Balance | Balance | Balance |
| | Total | 100 | 100 | 100 |

Various properties of the pigment dispersions and the ink were measured and evaluated as follows. The results are shown in Table 4.

<Evaluation of Storage Stability of Pigment Dispersion and Ink>

The viscosities of the pigment dispersions 1 to 41, and the inks of Examples 1 to 37 and Comparative Examples 1 to 6 were measured by, e.g., a viscometer RE80L from TOKI SANGYO CO., LTD. at 25° C., adjusting the rotational number such that a torque was from 40 to 80%.

As an index of dispersion stability of the pigment dispersion and the pigment in the ink, the initial viscosities of the pigment dispersions and the inks were measured to evaluate under the following standard.

As for the preservability, after the initial viscosities thereof were measured, each of them were placed in a polyethylene container and sealed. The viscosity after stored at 70° C. for 1 week was measured to evaluate under the following standard, compared with the initial viscosity.

Viscosity variation(%)=[(viscosity after preserved−initial viscosity)/initial viscosity]×100

[Pigment Dispersion Evaluation Standard]
Initial Viscosity
  Excellent: less than 3 mPa·s
  Good: not less than 3 mPa·s and less than 10 mPa·s
  Poor: not less than 10 mPa·s
Storage Stability
  Excellent: less than 5%
  Good: not less than 5% less than 50%
  Poor: not less than 50%
[Ink Evaluation Standard]
Initial Viscosity
  Excellent: less than 10 mPa·s
  Good: not less than 10 mPa·s and less than 20 mPa·s
  Poor: not less than 20 mPa·s Storage Stability
- Excellent: less than 5%
- Good: not less than 5% less than 50%
- Poor: not less than 50%

<Evaluation of Images Printed by Ink>

An inkjet printer (IPSIO GXe 5500, manufactured by Ricoh Company LTD.) was used to eject ink in such a manner that the same amount of the ink was ejected and attached to a recording medium by fluctuating the drive voltage of piezoelectric elements to conduct the following printing evaluation.

<<Image Density and Strike-Through>>

A chart having general symbols of 64 point JIS X 0208 (1997), 2223 formed by Microsoft Word 2003 was printed on My Paper (manufactured by Ricoh Company Ltd.) by using each ink and thereafter the colors of the symbol portions were measured for evaluating the image density. The printing mode was: "Plain Paper—Clean" by a driver installed in the printer. The image density of each color was evaluated according to the following criteria. For evaluation, the four measuring points per color per chart were measured once and the average of the four points were determined as the measuring results. Incidentally, the symbols of JIS X 0208 (1997), 2223 had squares for the exterior and the inside thereof was entirely painted by ink.

In addition, the image density (Optical Density (OD) value) of the symbol portion and the OD value of the non-image portion of the paper were measured by using X-Rite 938.

The OD value obtained by subtracting the OD value of the non-image portion from the OD value of the symbol portion was defined as the strike-through density, which was evaluated according to the same criteria.

[Image Density (OD value) Evaluation Criteria]

| | |
|---|---|
| Excellent: OD value | Black: 1.30 or higher |
| | Yellow: 0.80 or higher |
| | Magenta: 0.95 or higher |
| | Cyan: 1.05 or higher |
| Good: OD value | Black: 1.20 to less than 1.30 |
| | Yellow: 0.75 to less than 0.80 |
| | Magenta: 0.85 to less than 0.95 |
| | Cyan: 0.95 to less than 1.05 |
| Fair: OD value | Black: 1.10 to less than 1.20 |
| | Yellow: 0.70 to less than 0.75 |
| | Magenta: 0.75 to less than 0.85 |
| | Cyan: 0.85 to less than 0.95 |
| Poor: OD value | Black: less than 1.10 |
| | Yellow: less than 0.70 |
| | Magenta: less than 0.75 |
| | Cyan: less than 0.85 |

[Strike-Through (OD value) Evaluation Criteria]

| | |
|---|---|
| Excellent: OD value | Black: less than 0.10 |
| | Yellow: less than 0.08 |
| | Magenta: less than 0.09 |
| | Cyan: less than 0.10 |
| Good: OD value | Black: 0.10 to less than 0.20 |
| | Yellow: 0.08 to less than 0.16 |
| | Magenta: 0.09 to less than 0.18 |
| | Cyan: 0.10 to less than 0.20 |
| Fair: OD value | Black: 0.20 to less than 0.50 |
| | Yellow: 0.16 to less than 0.40 |
| | Magenta: 0.18 to less than 0.40 |
| | Cyan: 0.20 to less than 0.50 |
| Poor: OD value | Black 0.50 or higher |
| | Yellow: 0.40 or higher |
| | Magenta: 0.40 or higher |
| | Cyan: 0.50 or higher |

TABLE 4

| | Pigment Dispersion | Image Density OD Value | Image Density Rank | Strike-Through Density OD Value | Strike-Through Density Rank |
|---|---|---|---|---|---|
| Example 1 | 1 | 1.34 | Excellent | 0.08 | Excellent |
| Example 2 | 2 | 1.30 | Excellent | 0.11 | Good |
| Example 3 | 3 | 1.32 | Excellent | 0.09 | Excellent |
| Example 4 | 4 | 1.36 | Excellent | 0.06 | Excellent |
| Example 5 | 5 | 1.39 | Excellent | 0.07 | Excellent |
| Example 6 | 6 | 1.27 | Good | 0.09 | Excellent |
| Example 7 | 1 | 1.31 | Excellent | 0.08 | Excellent |
| Example 8 | 1 | 1.32 | Excellent | 0.09 | Excellent |
| Example 9 | 7 | 1.06 | Excellent | 0.09 | Excellent |
| Example 10 | 8 | 0.97 | Excellent | 0.07 | Excellent |
| Example 11 | 9 | 0.80 | Excellent | 0.07 | Excellent |
| Example 12 | 10 | 1.33 | Excellent | 0.09 | Excellent |
| Example 13 | 11 | 1.31 | Excellent | 0.10 | Good |
| Example 14 | 12 | 1.31 | Excellent | 0.11 | Good |
| Example 15 | 13 | 1.32 | Excellent | 0.12 | Good |
| Example 16 | 14 | 1.31 | Excellent | 0.11 | Good |
| Example 17 | 15 | 1.32 | Excellent | 0.12 | Good |
| Example 18 | 16 | 1.32 | Excellent | 0.13 | Good |
| Example 19 | 17 | 1.25 | Excellent | 0.14 | Good |
| Example 20 | 18 | 1.23 | Excellent | 0.17 | Good |
| Example 21 | 19 | 1.33 | Good | 0.09 | Excellent |
| Example 22 | 20 | 1.31 | Good | 0.10 | Good |
| Example 23 | 21 | 1.34 | Excellent | 0.08 | Excellent |
| Example 24 | 22 | 1.31 | Excellent | 0.07 | Excellent |
| Example 25 | 23 | 1.35 | Excellent | 0.12 | Good |
| Example 26 | 24 | 1.34 | Excellent | 0.08 | Excellent |
| Example 27 | 25 | 1.33 | Excellent | 0.09 | Excellent |
| Example 28 | 26 | 1.32 | Excellent | 0.06 | Excellent |
| Example 29 | 27 | 1.36 | Excellent | 0.15 | Good |
| Example 30 | 28 | 1.35 | Excellent | 0.07 | Excellent |
| Example 31 | 29 | 1.26 | Good | 0.13 | Good |
| Example 32 | 30 | 1.30 | Excellent | 0.14 | Good |
| Example 33 | 31 | 1.30 | Excellent | 0.08 | Excellent |
| Example 34 | 32 | 1.26 | Good | 0.15 | Good |
| Example 35 | 33 | 1.24 | Good | 0.12 | Good |
| Example 36 | 34 | 1.32 | Excellent | 0.11 | Good |
| Example 37 | 35 | 1.26 | Good | 0.08 | Excellent |
| Comparative Example 1 | 36 | 1.29 | Good | 0.11 | Good |
| Comparative Example 2 | 37 | 1.09 | Poor | 0.22 | Fair |
| Comparative Example 3 | 38 | 1.19 | Fair | 0.10 | Good |
| Comparative Example 4 | 39 | 0.81 | Poor | 0.19 | Good |
| Comparative Example 5 | 40 | 0.80 | Fair | 0.10 | Good |
| Comparative Example 6 | 41 | 0.68 | Poor | 0.28 | Fair |

| | Pigment Dispersion | Pigment Dispersion Initial Viscosity | Pigment Dispersion Storage Stability | Ink Initial Viscosity | Ink Storage Stability |
|---|---|---|---|---|---|
| Example 1 | 1 | Excellent | Excellent | Excellent | Excellent |
| Example 2 | 2 | Excellent | Excellent | Excellent | Excellent |
| Example 3 | 3 | Excellent | Excellent | Excellent | Excellent |
| Example 4 | 4 | Excellent | Excellent | Excellent | Excellent |
| Example 5 | 5 | Good | Excellent | Excellent | Excellent |
| Example 6 | 6 | Good | Excellent | Excellent | Excellent |
| Example 7 | 1 | Excellent | Excellent | Excellent | Good |
| Example 8 | 1 | Excellent | Excellent | Excellent | Excellent |
| Example 9 | 7 | Excellent | Excellent | Excellent | Excellent |
| Example 10 | 8 | Excellent | Excellent | Excellent | Excellent |
| Example 11 | 9 | Excellent | Excellent | Excellent | Excellent |
| Example 12 | 10 | Excellent | Excellent | Excellent | Excellent |
| Example 13 | 11 | Excellent | Excellent | Excellent | Excellent |
| Example 14 | 12 | Excellent | Excellent | Excellent | Excellent |
| Example 15 | 13 | Excellent | Excellent | Excellent | Excellent |
| Example 16 | 14 | Excellent | Excellent | Excellent | Excellent |
| Example 17 | 15 | Excellent | Excellent | Excellent | Excellent |

TABLE 4-continued

| | | | | | |
|---|---|---|---|---|---|
| Example 18 | 16 | Excellent | Excellent | Excellent | Excellent |
| Example 19 | 17 | Excellent | Excellent | Good | Excellent |
| Example 20 | 18 | Excellent | Excellent | Good | Good |
| Example 21 | 19 | Excellent | Excellent | Excellent | Excellent |
| Example 22 | 20 | Excellent | Good | Good | Good |
| Example 23 | 21 | Good | Good | Good | Good |
| Example 24 | 22 | Excellent | Excellent | Excellent | Excellent |
| Example 25 | 23 | Excellent | Good | Excellent | Good |
| Example 26 | 24 | Good | Good | Good | Good |
| Example 27 | 25 | Excellent | Excellent | Excellent | Excellent |
| Example 28 | 26 | Good | Good | Good | Good |
| Example 29 | 27 | Excellent | Good | Good | Good |
| Example 30 | 28 | Excellent | Excellent | Excellent | Excellent |
| Example 31 | 29 | Excellent | Good | Good | Good |
| Example 32 | 30 | Good | Good | Good | Good |
| Example 33 | 31 | Excellent | Excellent | Excellent | Excellent |
| Example 34 | 32 | Excellent | Excellent | Excellent | Excellent |
| Example 35 | 33 | Excellent | Excellent | Excellent | Excellent |
| Example 36 | 34 | Excellent | Excellent | Excellent | Excellent |
| Example 37 | 35 | Excellent | Good | Excellent | Excellent |
| Comparative Example 1 | 36 | Fair | Fair | Fair | Fair |
| Comparative Example 2 | 37 | Fair | Fair | Fair | Fair |
| Comparative Example 3 | 38 | Fair | Fair | Fair | Fair |
| Comparative Example 4 | 39 | Good | Good | Fair | Fair |
| Comparative Example 5 | 40 | Good | Good | Fair | Fair |
| Comparative Example 6 | 41 | Good | Good | Good | Fair |

Synthesis of Copolymer

Synthesis Example 1°

A flask equipped with a stirrer, a thermometer and a nitrogen gas introduction pipe was charged with 500.0 parts of a solvent (ethanol), 30.0 parts of 1-methacryloxyethane-1,1-diphosphonic acid (MEDP) [monomer having the formula (I)], 10.0 parts of MPEGMA 9 [monomer having the formula (4-2)], 60.0 parts of oleyl methacrylate [monomer having the formula (19)] and 4.0 parts of a polymerization initiator (azobisisobutylonitrile), and the mixture was heated to have a temperature of 65° C. Next, after the mixture was polymerized for 10 hrs under a nitrogen stream, about a half of the solvent in the reactant was removed. The reactant was injected in acetone to extract a copolymer, and the copolymer is further dried to prepare a copolymer. Potassium hydroxide was added to the copolymer while diluted to include a solid content in an amount of 10% with water such that the phosphonic acid group were neutralized by 100% to prepare a copolymer 1°.

The copolymer 1° had a weight-average molecular weight of 5000.

Synthesis Examples 2° to 25°

The procedure for preparation of the copolymer 1° in Synthesis Example 1° was repeated except for replacing MEDP or MPEGMA 9 with monomers having the structure 1 or 2 shown in Table 5 and the contents thereof with those shown therein to prepare copolymers 2° to 25°.

Weight-average molecular weights of these copolymers are shown in Table 5.

Synthesis Example 26°

The procedure for preparation of the copolymer 1° in Synthesis Example 1° was repeated except for using only MEDP to prepare a copolymers 26°.

The copolymer 26° had a weight-average molecular weight of 5000.

Properties of the copolymers 1° to 26° are shown in Table 5. The structure 1 includes monomers having the structural units represented by the formula (1), the structure 2 includes monomers having the structural units represented by the formula (2) and the structure 3 includes monomers having the structural units represented by the formula (5). The monomers in the copolymer 24° and 25° do not have the structural units represented by the formula (1).

TABLE 5

| | Structure 1 | Structure 2 | Structure 3 |
|---|---|---|---|
| Copolymer 1° | MEDP | MPEGMA9 | Olyel Methacrylate |
| Copolymer 2° | MEDP | MPEGMA9 | Olyel Methacrylate |
| Copolymer 3° | MEDP | MPEGA | Olyel Methacrylate |
| Copolymer 4° | MEDP | EDEGA | Olyel Methacrylate |
| Copolymer 5° | MEDP | BDEGMA | Olyel Methacrylate |
| Copolymer 6° | MEDP | MTEGA | Olyel Methacrylate |
| Copolymer 7° | MEDP | MPEGMA30 | Olyel Methacrylate |
| Copolymer 8° | MEDP | MDPGMA | Olyel Methacrylate |
| Copolymer 9° | MEDP | MPEGMA9 | Olyel Methacrylate |
| Copolymer 10° | MEDP | MPEGMA9 | Olyel Methacrylate |
| Copolymer 11° | MEDP | MPEGMA9 | Olyel Methacrylate |
| Copolymer 12° | MEDP | MPEGMA9 | Olyel Methacrylate |
| Copolymer 13° | MEDP | MPEGMA9 | Olyel Methacrylate |
| Copolymer 14° | MEDP | MPEGMA9 | Olyel Methacrylate |
| Copolymer 15° | MEDP | MPEGMA9 | Olyel Methacrylate |
| Copolymer 16° | MEDP | MPEGMA9 | Olyel Methacrylate |
| Copolymer 17° | MEDP | MPEGMA9 | Olyel Methacrylate |
| Copolymer 18° | MEDP | MPEGMA9 | Olyel Methacrylate |
| Copolymer 19° | MEDP | MPEGMA9 | Olyel Methacrylate |
| Copolymer 20° | MEDP | MPEGMA9 | Olyel Methacrylate |
| Copolymer 21° | MEDP | MPEGMA9 | Olyel Methacrylate |
| Copolymer 22° | MEDP | MPEGMA9 | Olyel Methacrylate |
| Copolymer 23° | MEDP | MPEGMA9 | Olyel Methacrylate |
| Copolymer 24° | Methacrylate | MPEGMA9 | Olyel Methacrylate |
| Copolymer 25° | Acrylate | MPEGMA9 | Olyel Methacrylate |
| Copolymer 26° | MEDP | — | — |

| | Structure 1 [% by Weight] | Structure 2 [% by Weight] | Structure 3 [% by Weight] | Weight-Average Molecular Weight |
|---|---|---|---|---|
| Copolymer 1° | 30.0 | 10.0 | 60.0 | 5000 |
| Copolymer 2° | 30.0 | 10.0 | 60.0 | 5000 |
| Copolymer 3° | 30.0 | 10.0 | 60.0 | 5000 |
| Copolymer 4° | 30.0 | 10.0 | 60.0 | 5000 |
| Copolymer 5° | 30.0 | 10.0 | 60.0 | 5000 |
| Copolymer 6° | 30.0 | 10.0 | 60.0 | 5000 |
| Copolymer 7° | 30.0 | 10.0 | 60.0 | 5000 |
| Copolymer 8° | 30.0 | 10.0 | 60.0 | 5000 |
| Copolymer 9° | 30.0 | 10.0 | 60.0 | 5000 |
| Copolymer 10° | 15.0 | 35.0 | 50.0 | 1500 |
| Copolymer 11° | 5.0 | 35.0 | 60.0 | 3000 |
| Copolymer 12° | 15.0 | 35.0 | 50.0 | 3000 |
| Copolymer 13° | 55.0 | 35.0 | 10.0 | 1500 |
| Copolymer 14° | 65.0 | 20.0 | 15.0 | 3000 |
| Copolymer 15° | 55.0 | 35.0 | 10.0 | 3000 |
| Copolymer 16° | 55.0 | 35.0 | 10.0 | 6000 |
| Copolymer 17° | 65.0 | 20.0 | 15.0 | 4500 |
| Copolymer 18° | 55.0 | 35.0 | 10.0 | 4500 |
| Copolymer 19° | 15.0 | 35.0 | 50.0 | 6000 |
| Copolymer 20° | 5.0 | 35.0 | 60.0 | 4500 |
| Copolymer 21° | 15.0 | 35.0 | 50.0 | 4500 |
| Copolymer 22° | 5.0 | 35.0 | 60.0 | 1500 |
| Copolymer 23° | 65.0 | 20.0 | 15.0 | 60000 |
| Copolymer 24° | 30.0 | 10.0 | 60.0 | 10000 |
| Copolymer 25° | 30.0 | 10.0 | 60.0 | 2000 |
| Copolymer 26° | 100.0 | — | — | 5000 |

Pigment Dispersion Preparation Examples 1° to 30°

Each of the pigment dispersions was prepared as follows.

Preparation Example 1°

Pigment Dispersion 1°

The following materials were premixed to prepare a mixed slurry. This was subjected to a circulation dispersion by a disc type media mill (DMR from Ashizawa Finetech Ltd.) with 0.05 mm zirconia beads at a filling rate of 55%, a peripheral speed of 10 m/s, a liquid temperature of 10° C. for 3 min. Then, the resultant dispersion was subjected to centrifugal separation by a centrifugal separator Model 7700 from KUBOTA Corporation to separate coarse particles to prepare a pigment dispersion 1° having a pigment concentration of 16% by weight.

| | |
|---|---|
| Carbon black (NIPEX160 from Degussa AG having a BET specific surface area of 150 $m^2/g$, an average primary particle diameter of 20 nm a pH of 4.0 and a DBP oil absorption of 620 g/100 g | 160 |
| Copolymer 1° | 40 |
| Distilled water | 800 |

Preparation Example 2°

Pigment Dispersion 2°

The procedure for preparation of the pigment dispersion 1° in Preparation Example 1° was repeated except for replacing the copolymer 1 with an aqueous solution including polyoxyethylene (POE) (m=40)-β-naphthyl ether from Takemoto Oil & Fat Co., Ltd. in an amount of 10% by weight to a pigment dispersion 2° having a pigment concentration of 16% by weight.

Preparation Examples 3° to 30°

Pigment Dispersions 3° to 30°

The procedure for preparation of the pigment dispersion 1° in Preparation Example 1° was repeated except for changing the copolymer, the parts thereof, the pigment or the parts of distilled water such that the total is 1000 parts as shown in Table 6 to prepare pigment dispersions 3° to 30° each having a pigment concentration of 16% by weight.

The compositions of the pigment dispersions 1° to 30° are shown in Table 6. [*] represents an aqueous solution including polyoxyethylene (POE) (m=40)-β-naphthyl ether in an amount of 10% by weight

TABLE 6

| | Pigment Dispersion | | | | |
|---|---|---|---|---|---|
| | 1° | 2° | 3° | 4° | 5° |
| Copolymer 1° | 40 | | 40 | 40 | 40 |
| Copolymer 2° | | | | | |
| Copolymer 3° | | | | | |
| Copolymer 4° | | | | | |
| Copolymer 5° | | | | | |
| Copolymer 6° | | | | | |
| Copolymer 7° | | | | | |
| Copolymer 8° | | | | | |
| Copolymer 9° | | | | | |
| Copolymer 10° | | | | | |
| Copolymer 11° | | | | | |
| Copolymer 12° | | | | | |
| Copolymer 13° | | | | | |
| Copolymer 14° | | | | | |
| Copolymer 15° | | | | | |
| Copolymer 16° | | | | | |
| Copolymer 17° | | | | | |
| Copolymer 18° | | | | | |
| Copolymer 19° | | | | | |
| Copolymer 20° | | | | | |
| Copolymer 21° | | | | | |
| Copolymer 22° | | | | | |
| Copolymer 23° | | | | | |
| Copolymer 24° | | | | | |
| Copolymer 25° | | | | | |
| Copolymer 26° | | | | | |
| [*] | | 40 | | | |
| Carbon Black | 160 | 160 | | | |
| Pigment Blue 15:3 | | | 160 | | |
| Pigment Red 122 | | | | 160 | |
| Pigment Yellow 74 | | | | | 160 |
| Distilled Water | Balance | Balance | Balance | Balance | Balance |
| Total | 1000 | 1000 | 1000 | 1000 | 1000 |

| | Pigment Dispersion | | | | |
|---|---|---|---|---|---|
| | 6° | 7° | 8° | 9° | 10° |
| Copolymer 1° | | | | | |
| Copolymer 2° | 40 | | | | |
| Copolymer 3° | | 40 | | | |
| Copolymer 4° | | | 40 | | |
| Copolymer 5° | | | | 40 | |
| Copolymer 6° | | | | | 40 |
| Copolymer 7° | | | | | |
| Copolymer 8° | | | | | |
| Copolymer 9° | | | | | |
| Copolymer 10° | | | | | |
| Copolymer 11° | | | | | |
| Copolymer 12° | | | | | |
| Copolymer 13° | | | | | |
| Copolymer 14° | | | | | |
| Copolymer 15° | | | | | |
| Copolymer 16° | | | | | |
| Copolymer 17° | | | | | |
| Copolymer 18° | | | | | |
| Copolymer 19° | | | | | |
| Copolymer 20° | | | | | |
| Copolymer 21° | | | | | |
| Copolymer 22° | | | | | |
| Copolymer 23° | | | | | |
| Copolymer 24° | | | | | |
| Copolymer 25° | | | | | |
| Copolymer 26° | | | | | |
| [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

| | Pigment Dispersion | | | | |
|---|---|---|---|---|---|
| | 11° | 12° | 13° | 14° | 15° |
| Copolymer 1° | | | | | |
| Copolymer 2° | | | | | |
| Copolymer 3° | | | | | |
| Copolymer 4° | | | | | |

TABLE 6-continued

| | | | | | |
|---|---|---|---|---|---|
| Copolymer 5° | | | | | |
| Copolymer 6° | | | | | |
| Copolymer 7° | 40 | | | | |
| Copolymer 8° | | 40 | | | |
| Copolymer 9° | | | 40 | | |
| Copolymer 10° | | | | 40 | |
| Copolymer 11° | | | | | 40 |
| Copolymer 12° | | | | | |
| Copolymer 13° | | | | | |
| Copolymer 14° | | | | | |
| Copolymer 15° | | | | | |
| Copolymer 16° | | | | | |
| Copolymer 17° | | | | | |
| Copolymer 18° | | | | | |
| Copolymer 19° | | | | | |
| Copolymer 20° | | | | | |
| Copolymer 21° | | | | | |
| Copolymer 22° | | | | | |
| Copolymer 23° | | | | | |
| Copolymer 24° | | | | | |
| Copolymer 25° | | | | | |
| Copolymer 26° [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

| | Pigment Dispersion | | | | |
|---|---|---|---|---|---|
| | 16° | 17° | 18° | 19° | 20° |
| Copolymer 1° | | | | | |
| Copolymer 2° | | | | | |
| Copolymer 3° | | | | | |
| Copolymer 4° | | | | | |
| Copolymer 5° | | | | | |
| Copolymer 6° | | | | | |
| Copolymer 7° | | | | | |
| Copolymer 8° | | | | | |
| Copolymer 9° | | | | | |
| Copolymer 10° | | | | | |
| Copolymer 11° | | | | | |
| Copolymer 12° | 40 | | | | |
| Copolymer 13° | | 40 | | | |
| Copolymer 14° | | | 40 | | |
| Copolymer 15° | | | | 40 | |
| Copolymer 16° | | | | | 40 |
| Copolymer 17° | | | | | |
| Copolymer 18° | | | | | |
| Copolymer 19° | | | | | |
| Copolymer 20° | | | | | |
| Copolymer 21° | | | | | |
| Copolymer 22° | | | | | |
| Copolymer 23° | | | | | |
| Copolymer 24° | | | | | |
| Copolymer 25° | | | | | |
| Copolymer 26° [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

| | Pigment Dispersion | | | | |
|---|---|---|---|---|---|
| | 21° | 22° | 23° | 24° | 25° |
| Copolymer 1° | | | | | |
| Copolymer 2° | | | | | |
| Copolymer 3° | | | | | |
| Copolymer 4° | | | | | |
| Copolymer 5° | | | | | |
| Copolymer 6° | | | | | |
| Copolymer 7° | | | | | |
| Copolymer 8° | | | | | |
| Copolymer 9° | | | | | |
| Copolymer 10° | | | | | |
| Copolymer 11° | | | | | |
| Copolymer 12° | | | | | |
| Copolymer 13° | | | | | |
| Copolymer 14° | | | | | |
| Copolymer 15° | | | | | |
| Copolymer 16° | | | | | |
| Copolymer 17° | 40 | | | | |
| Copolymer 18° | | 40 | | | |
| Copolymer 19° | | | 40 | | |
| Copolymer 20° | | | | 40 | |
| Copolymer 21° | | | | | 40 |
| Copolymer 22° | | | | | |
| Copolymer 23° | | | | | |
| Copolymer 24° | | | | | |
| Copolymer 25° | | | | | |
| Copolymer 26° [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

| | Pigment Dispersion | | | | |
|---|---|---|---|---|---|
| | 26° | 27° | 28° | 29° | 30° |
| Copolymer 1° | | | | | |
| Copolymer 2° | | | | | |
| Copolymer 3° | | | | | |
| Copolymer 4° | | | | | |
| Copolymer 5° | | | | | |
| Copolymer 6° | | | | | |
| Copolymer 7° | | | | | |
| Copolymer 8° | | | | | |
| Copolymer 9° | | | | | |
| Copolymer 10° | | | | | |
| Copolymer 11° | | | | | |
| Copolymer 12° | | | | | |
| Copolymer 13° | | | | | |
| Copolymer 14° | | | | | |
| Copolymer 15° | | | | | |
| Copolymer 16° | | | | | |
| Copolymer 17° | | | | | |
| Copolymer 18° | | | | | |
| Copolymer 19° | | | | | |
| Copolymer 20° | | | | | |
| Copolymer 21° | | | | | |
| Copolymer 22° | 40 | | | | |
| Copolymer 23° | | 40 | | | |
| Copolymer 24° | | | 40 | | |
| Copolymer 25° | | | | 40 | |
| Copolymer 26° [*] | | | | | 40 |
| Carbon Black | 160 | 160 | 160 | 160 | 160 |
| Pigment Blue 15:3 | | | | | |

TABLE 6-continued

| | | | | | |
|---|---|---|---|---|---|
| Pigment Red 122 Pigment Yellow 74 | | | | | |
| Distilled Water | Balance | Balance | Balance | Balance | Balance |
| Total | 1000 | 1000 | 1000 | 1000 | 1000 |

Preparation of Ink for Inkjet Recording

Example 1°

The following materials were mixed and stirred for 1 hr. The resultant dispersion was subjected to pressure filtration by a polyvinylidenefluoride membrane filter having an average pore diameter of 5.0 μm to remove coarse particles and dusts. Thus, an ink was prepared.

| | |
|---|---|
| Pigment dispersion 1° (pigment concentration 16%) | 50 |
| Glycerin | 10 |
| 1,3-butanediol | 20 |
| Distilled water | 20 |

Examples 2° to 29° and Comparative Examples 1° to 3°

The procedure for preparation of the ink in Example 1 was repeated except for using materials shown in Table 7 to prepare inks of (Examples 2° to 29° and Comparative Examples 1° to 3°. [*] represents an aqueous solution including polyoxyethylene (POE) (m=40)-β-naphthyl ether in an amount of 10% by weight

TABLE 7

(1)

| | | Example | | | |
|---|---|---|---|---|---|
| | | 1° | 2° | 3° | 4° |
| Pigment Dispersion 1° | Copolymer 1° | 50 | 50 | 50 | |
| Pigment Dispersion 2° | [*] | | | | 50 |
| Pigment Dispersion 3° | Copolymer 1° | | | | |
| Pigment Dispersion 4° | Copolymer 1° | | | | |
| Pigment Dispersion 5° | Copolymer 1° | | | | |
| Pigment Dispersion 6° | Copolymer 2° | | | | |
| Pigment Dispersion 7° | Copolymer 3° | | | | |
| Pigment Dispersion 8° | Copolymer 4° | | | | |
| Pigment Dispersion 9° | Copolymer 5° | | | | |
| Pigment Dispersion 10° | Copolymer 6° | | | | |
| Pigment Dispersion 11° | Copolymer 7° | | | | |
| Pigment Dispersion 12° | Copolymer 8° | | | | |
| Pigment Dispersion 13° | Copolymer 9° | | | | |
| Pigment Dispersion 14° | Copolymer 10° | | | | |
| Pigment Dispersion 15° | Copolymer 11° | | | | |
| Pigment Dispersion 16° | Copolymer 12° | | | | |
| Pigment Dispersion 17° | Copolymer 13° | | | | |
| Pigment Dispersion 18° | Copolymer 14° | | | | |
| Pigment Dispersion 19° | Copolymer 15° | | | | |
| Pigment Dispersion 20° | Copolymer 16° | | | | |
| Pigment Dispersion 21° | Copolymer 17° | | | | |
| Pigment Dispersion 22° | Copolymer 18° | | | | |
| Pigment Dispersion 23° | Copolymer 19° | | | | |
| Pigment Dispersion 24° | Copolymer 20° | | | | |
| Pigment Dispersion 25° | Copolymer 21° | | | | |
| Pigment Dispersion 26° | Copolymer 22° | | | | |
| Pigment Dispersion 27° | Copolymer 23° | | | | |
| Pigment Dispersion 28° | Copolymer 24° | | | | |
| Pigment Dispersion 29° | Copolymer 25° | | | | |
| Pigment Dispersion 30° | Copolymer 26° | | | | |
| Hydro-soluble solvent | Glycerin | 10 | | 20 | 10 |
| | 1,3-butanediol | 20 | 30 | | 20 |
| | Trimethylol Propane | | | 5 | |
| | 2-pyrrolidone | | | 5 | |
| Distilled Water | | Balance | Balance | Balance | Balance |
| Total | | 100 | 100 | 100 | 100 |

(2)

| | | Example | | | |
|---|---|---|---|---|---|
| | | 5° | 6° | 7° | 8° |
| Pigment Dispersion 1° | Copolymer 1° | | | | |
| Pigment Dispersion 2° | [*] | | | | |
| Pigment Dispersion 3° | Copolymer 1° | 30 | | | |
| Pigment Dispersion 4° | Copolymer 1° | | 50 | | |
| Pigment Dispersion 5° | Copolymer 1° | | | 30 | |
| Pigment Dispersion 6° | Copolymer 2° | | | | 50 |
| Pigment Dispersion 7° | Copolymer 3° | | | | |
| Pigment Dispersion 8° | Copolymer 4° | | | | |
| Pigment Dispersion 9° | Copolymer 5° | | | | |
| Pigment Dispersion 10° | Copolymer 6° | | | | |
| Pigment Dispersion 11° | Copolymer 7° | | | | |
| Pigment Dispersion 12° | Copolymer 8° | | | | |
| Pigment Dispersion 13° | Copolymer 9° | | | | |
| Pigment Dispersion 14° | Copolymer 10° | | | | |
| Pigment Dispersion 15° | Copolymer 11° | | | | |
| Pigment Dispersion 16° | Copolymer 12° | | | | |
| Pigment Dispersion 17° | Copolymer 13° | | | | |
| Pigment Dispersion 18° | Copolymer 14° | | | | |
| Pigment Dispersion 19° | Copolymer 15° | | | | |
| Pigment Dispersion 20° | Copolymer 16° | | | | |
| Pigment Dispersion 21° | Copolymer 17° | | | | |
| Pigment Dispersion 22° | Copolymer 18° | | | | |
| Pigment Dispersion 23° | Copolymer 19° | | | | |
| Pigment Dispersion 24° | Copolymer 20° | | | | |
| Pigment Dispersion 25° | Copolymer 21° | | | | |
| Pigment Dispersion 26° | Copolymer 22° | | | | |
| Pigment Dispersion 27° | Copolymer 23° | | | | |
| Pigment Dispersion 28° | Copolymer 24° | | | | |
| Pigment Dispersion 29° | Copolymer 25° | | | | |
| Pigment Dispersion 30° | Copolymer 26° | | | | |
| Hydro-soluble solvent | Glycerin | 10 | 10 | 10 | 10 |
| | 1,3-butanediol | 20 | 20 | 20 | 20 |
| | Trimethylol Propane | | | | |
| | 2-pyrrolidone | | | | |
| Distilled Water | | Balance | Balance | Balance | Balance |
| Total | | 100 | 100 | 100 | 100 |

(3)

| | | Example | | | |
|---|---|---|---|---|---|
| | | 9° | 10° | 11° | 12° |
| Pigment Dispersion 1° | Copolymer 1° | | | | |
| Pigment Dispersion 2° | [*] | | | | |
| Pigment Dispersion 3° | Copolymer 1° | | | | |
| Pigment Dispersion 4° | Copolymer 1° | | | | |
| Pigment Dispersion 5° | Copolymer 1° | | | | |
| Pigment Dispersion 6° | Copolymer 2° | | | | |
| Pigment Dispersion 7° | Copolymer 3° | 50 | | | |
| Pigment Dispersion 8° | Copolymer 4° | | 50 | | |
| Pigment Dispersion 9° | Copolymer 5° | | | 50 | |
| Pigment Dispersion 10° | Copolymer 6° | | | | 50 |
| Pigment Dispersion 11° | Copolymer 7° | | | | |
| Pigment Dispersion 12° | Copolymer 8° | | | | |
| Pigment Dispersion 13° | Copolymer 9° | | | | |
| Pigment Dispersion 14° | Copolymer 10° | | | | |
| Pigment Dispersion 15° | Copolymer 11° | | | | |
| Pigment Dispersion 16° | Copolymer 12° | | | | |

TABLE 7-continued

(4)

|  |  | Example | | | |
|---|---|---|---|---|---|
|  |  | 13° | 14° | 15° | 16° |
| Pigment Dispersion 1° | Copolymer 1° | | | | |
| Pigment Dispersion 2° | [*] | | | | |
| Pigment Dispersion 3° | Copolymer 1° | | | | |
| Pigment Dispersion 4° | Copolymer 1° | | | | |
| Pigment Dispersion 5° | Copolymer 1° | | | | |
| Pigment Dispersion 6° | Copolymer 2° | | | | |
| Pigment Dispersion 7° | Copolymer 3° | | | | |
| Pigment Dispersion 8° | Copolymer 4° | | | | |
| Pigment Dispersion 9° | Copolymer 5° | | | | |
| Pigment Dispersion 10° | Copolymer 6° | | | | |
| Pigment Dispersion 11° | Copolymer 7° | 50 | | | |
| Pigment Dispersion 12° | Copolymer 8° | | 50 | | |
| Pigment Dispersion 13° | Copolymer 9° | | | 50 | |
| Pigment Dispersion 14° | Copolymer 10° | | | | 50 |
| Pigment Dispersion 15° | Copolymer 11° | | | | |
| Pigment Dispersion 16° | Copolymer 12° | | | | |
| Pigment Dispersion 17° | Copolymer 13° | | | | |
| Pigment Dispersion 18° | Copolymer 14° | | | | |
| Pigment Dispersion 19° | Copolymer 15° | | | | |
| Pigment Dispersion 20° | Copolymer 16° | | | | |
| Pigment Dispersion 21° | Copolymer 17° | | | | |
| Pigment Dispersion 22° | Copolymer 18° | | | | |
| Pigment Dispersion 23° | Copolymer 19° | | | | |
| Pigment Dispersion 24° | Copolymer 20° | | | | |
| Pigment Dispersion 25° | Copolymer 21° | | | | |
| Pigment Dispersion 26° | Copolymer 22° | | | | |
| Pigment Dispersion 27° | Copolymer 23° | | | | |
| Pigment Dispersion 28° | Copolymer 24° | | | | |
| Pigment Dispersion 29° | Copolymer 25° | | | | |
| Pigment Dispersion 30° | Copolymer 26° | | | | |
| Hydro-soluble solvent | Glycerin | 10 | 10 | 10 | 10 |
| | 1,3-butanediol | 20 | 20 | 20 | 20 |
| | Trimethylol Propane | | | | |
| | 2-pyrrolidone | | | | |
| Distilled Water | | Balance | Balance | Balance | Balance |
| Total | | 100 | 100 | 100 | 100 |

(5)

|  |  | Example | | | |
|---|---|---|---|---|---|
|  |  | 17° | 18° | 19° | 20° |
| Pigment Dispersion 1° | Copolymer 1° | | | | |
| Pigment Dispersion 2° | [*] | | | | |
| Pigment Dispersion 3° | Copolymer 1° | | | | |
| Pigment Dispersion 4° | Copolymer 1° | | | | |
| Pigment Dispersion 5° | Copolymer 1° | | | | |
| Pigment Dispersion 6° | Copolymer 2° | | | | |
| Pigment Dispersion 7° | Copolymer 3° | | | | |
| Pigment Dispersion 8° | Copolymer 4° | | | | |
| Pigment Dispersion 9° | Copolymer 5° | | | | |
| Pigment Dispersion 10° | Copolymer 6° | | | | |
| Pigment Dispersion 11° | Copolymer 7° | | | | |
| Pigment Dispersion 12° | Copolymer 8° | | | | |
| Pigment Dispersion 13° | Copolymer 9° | | | | |
| Pigment Dispersion 14° | Copolymer 10° | | | | |
| Pigment Dispersion 15° | Copolymer 11° | 50 | | | |
| Pigment Dispersion 16° | Copolymer 12° | | 50 | | |
| Pigment Dispersion 17° | Copolymer 13° | | | 50 | |
| Pigment Dispersion 18° | Copolymer 14° | | | | 50 |
| Pigment Dispersion 19° | Copolymer 15° | | | | |
| Pigment Dispersion 20° | Copolymer 16° | | | | |
| Pigment Dispersion 21° | Copolymer 17° | | | | |
| Pigment Dispersion 22° | Copolymer 18° | | | | |
| Pigment Dispersion 23° | Copolymer 19° | | | | |
| Pigment Dispersion 24° | Copolymer 20° | | | | |
| Pigment Dispersion 25° | Copolymer 21° | | | | |
| Pigment Dispersion 26° | Copolymer 22° | | | | |
| Pigment Dispersion 27° | Copolymer 23° | | | | |
| Pigment Dispersion 28° | Copolymer 24° | | | | |
| Pigment Dispersion 29° | Copolymer 25° | | | | |
| Pigment Dispersion 30° | Copolymer 26° | | | | |
| Hydro-soluble solvent | Glycerin | 10 | 10 | 10 | 10 |
| | 1,3-butanediol | 20 | 20 | 20 | 20 |
| | Trimethylol Propane | | | | |
| | 2-pyrrolidone | | | | |
| Distilled Water | | Balance | Balance | Balance | Balance |
| Total | | 100 | 100 | 100 | 100 |

TABLE 7-continued

|  |  | 10 | 10 | 10 | 10 |
|---|---|---|---|---|---|
| Hydro-soluble solvent | Glycerin 1,3-butanediol Trimethylol Propane 2-pyrrolidone |  20 | 20 | 20 | 20 |
| Distilled Water |  | Balance | Balance | Balance | Balance |
| Total |  | 100 | 100 | 100 | 100 |

(6)

|  |  | Example | | | |
|---|---|---|---|---|---|
|  |  | 21° | 22° | 23° | 24° |
| Pigment Dispersion 1° | Copolymer 1° | | | | |
| Pigment Dispersion 2° | [*] | | | | |
| Pigment Dispersion 3° | Copolymer 1° | | | | |
| Pigment Dispersion 4° | Copolymer 1° | | | | |
| Pigment Dispersion 5° | Copolymer 1° | | | | |
| Pigment Dispersion 6° | Copolymer 2° | | | | |
| Pigment Dispersion 7° | Copolymer 3° | | | | |
| Pigment Dispersion 8° | Copolymer 4° | | | | |
| Pigment Dispersion 9° | Copolymer 5° | | | | |
| Pigment Dispersion 10° | Copolymer 6° | | | | |
| Pigment Dispersion 11° | Copolymer 7° | | | | |
| Pigment Dispersion 12° | Copolymer 8° | | | | |
| Pigment Dispersion 13° | Copolymer 9° | | | | |
| Pigment Dispersion 14° | Copolymer 10° | | | | |
| Pigment Dispersion 15° | Copolymer 11° | | | | |
| Pigment Dispersion 16° | Copolymer 12° | | | | |
| Pigment Dispersion 17° | Copolymer 13° | | | | |
| Pigment Dispersion 18° | Copolymer 14° | | | | |
| Pigment Dispersion 19° | Copolymer 15° | 50 | | | |
| Pigment Dispersion 20° | Copolymer 16° | | 50 | | |
| Pigment Dispersion 21° | Copolymer 17° | | | 50 | |
| Pigment Dispersion 22° | Copolymer 18° | | | | 50 |
| Pigment Dispersion 23° | Copolymer 19° | | | | |
| Pigment Dispersion 24° | Copolymer 20° | | | | |
| Pigment Dispersion 25° | Copolymer 21° | | | | |
| Pigment Dispersion 26° | Copolymer 22° | | | | |
| Pigment Dispersion 27° | Copolymer 23° | | | | |
| Pigment Dispersion 28° | Copolymer 24° | | | | |
| Pigment Dispersion 29° | Copolymer 25° | | | | |
| Pigment Dispersion 30° | Copolymer 26° | | | | |
| Hydro-soluble solvent | Glycerin 1,3-butanediol Trimethylol Propane 2-pyrrolidone | 10 20 | 10 20 | 10 20 | 10 20 |
| Distilled Water | | Balance | Balance | Balance | Balance |
| Total | | 100 | 100 | 100 | 100 |

(7)

|  |  | Example | | | |
|---|---|---|---|---|---|
|  |  | 25° | 26° | 27° | 28° |
| Pigment Dispersion 1° | Copolymer 1° | | | | |
| Pigment Dispersion 2° | [*] | | | | |
| Pigment Dispersion 3° | Copolymer 1° | | | | |
| Pigment Dispersion 4° | Copolymer 1° | | | | |
| Pigment Dispersion 5° | Copolymer 1° | | | | |
| Pigment Dispersion 6° | Copolymer 2° | | | | |
| Pigment Dispersion 7° | Copolymer 3° | | | | |
| Pigment Dispersion 8° | Copolymer 4° | | | | |
| Pigment Dispersion 9° | Copolymer 5° | | | | |
| Pigment Dispersion 10° | Copolymer 6° | | | | |
| Pigment Dispersion 11° | Copolymer 7° | | | | |
| Pigment Dispersion 12° | Copolymer 8° | | | | |
| Pigment Dispersion 13° | Copolymer 9° | | | | |
| Pigment Dispersion 14° | Copolymer 10° | | | | |
| Pigment Dispersion 15° | Copolymer 11° | | | | |
| Pigment Dispersion 16° | Copolymer 12° | | | | |
| Pigment Dispersion 17° | Copolymer 13° | | | | |
| Pigment Dispersion 18° | Copolymer 14° | | | | |
| Pigment Dispersion 19° | Copolymer 15° | | | | |
| Pigment Dispersion 20° | Copolymer 16° | | | | |
| Pigment Dispersion 21° | Copolymer 17° | | | | |
| Pigment Dispersion 22° | Copolymer 18° | | | | |
| Pigment Dispersion 23° | Copolymer 19° | 50 | | | |
| Pigment Dispersion 24° | Copolymer 20° | | 50 | | |
| Pigment Dispersion 25° | Copolymer 21° | | | 50 | |
| Pigment Dispersion 26° | Copolymer 22° | | | | 50 |
| Pigment Dispersion 27° | Copolymer 23° | | | | |
| Pigment Dispersion 28° | Copolymer 24° | | | | |
| Pigment Dispersion 29° | Copolymer 25° | | | | |
| Pigment Dispersion 30° | Copolymer 26° | | | | |
| Hydro-soluble solvent | Glycerin 1,3-butanediol Trimethylol Propane 2-pyrrolidone | 10 20 | 10 20 | 10 20 | 10 20 |
| Distilled Water | | Balance | Balance | Balance | Balance |
| Total | | 100 | 100 | 100 | 100 |

(8)

|  |  | Example | Com. Example | | |
|---|---|---|---|---|---|
|  |  | 29° | 1° | 2° | 3° |
| Pigment Dispersion 1° | Copolymer 1° | | | | |
| Pigment Dispersion 2° | [*] | | | | |
| Pigment Dispersion 3° | Copolymer 1° | | | | |
| Pigment Dispersion 4° | Copolymer 1° | | | | |
| Pigment Dispersion 5° | Copolymer 1° | | | | |
| Pigment Dispersion 6° | Copolymer 2° | | | | |
| Pigment Dispersion 7° | Copolymer 3° | | | | |
| Pigment Dispersion 8° | Copolymer 4° | | | | |
| Pigment Dispersion 9° | Copolymer 5° | | | | |
| Pigment Dispersion 10° | Copolymer 6° | | | | |
| Pigment Dispersion 11° | Copolymer 7° | | | | |
| Pigment Dispersion 12° | Copolymer 8° | | | | |
| Pigment Dispersion 13° | Copolymer 9° | | | | |
| Pigment Dispersion 14° | Copolymer 10° | | | | |
| Pigment Dispersion 15° | Copolymer 11° | | | | |
| Pigment Dispersion 16° | Copolymer 12° | | | | |
| Pigment Dispersion 17° | Copolymer 13° | | | | |
| Pigment Dispersion 18° | Copolymer 14° | | | | |
| Pigment Dispersion 19° | Copolymer 15° | | | | |
| Pigment Dispersion 20° | Copolymer 16° | | | | |
| Pigment Dispersion 21° | Copolymer 17° | | | | |
| Pigment Dispersion 22° | Copolymer 18° | | | | |
| Pigment Dispersion 23° | Copolymer 19° | | | | |
| Pigment Dispersion 24° | Copolymer 20° | | | | |
| Pigment Dispersion 25° | Copolymer 21° | | | | |
| Pigment Dispersion 26° | Copolymer 22° | | | | |
| Pigment Dispersion 27° | Copolymer 23° | 50 | | | |
| Pigment Dispersion 28° | Copolymer 24° | | 50 | | |
| Pigment Dispersion 29° | Copolymer 25° | | | 50 | |
| Pigment Dispersion 30° | Copolymer 26° | | | | 50 |
| Hydro-soluble solvent | Glycerin 1,3-butanediol Trimethylol Propane 2-pyrrolidone | 10 20 | 10 20 | 10 20 | 10 20 |
| Distilled Water | | Balance | Balance | Balance | Balance |
| Total | | 100 | 100 | 100 | 100 |

Properties of the pigment dispersions 1° to 30° and the inks of Examples 1° to 29° and Comparative Examples 1° to 3° were measured and evaluated as they were in Table 4. The results are shown in Table 8.

TABLE 8

(1)

| Pigment Dispersion | Evaluation Result | | | |
|---|---|---|---|---|
| | Image Density | | Strike-Through Density | |
| | OD Value | Rank | OD Value | Rank |
| Example 1° | 1° | 1.37 | Excellent | 0.07 | Excellent |
| Example 2° | 1° | 1.34 | Excellent | 0.08 | Excellent |
| Example 3° | 1° | 1.36 | Excellent | 0.07 | Excellent |
| Example 4° | 2° | 1.28 | Good | 0.08 | Excellent |
| Example 5° | 3° | 1.09 | Excellent | 0.07 | Excellent |
| Example 6° | 4° | 0.98 | Excellent | 0.07 | Excellent |
| Example 7° | 5° | 0.86 | Excellent | 0.06 | Excellent |
| Example 8° | 6° | 1.30 | Excellent | 0.10 | Good |
| Example 9° | 7° | 1.35 | Excellent | 0.06 | Excellent |
| Example 10° | 8° | 1.37 | Excellent | 0.07 | Excellent |
| Example 11° | 9° | 1.36 | Excellent | 0.08 | Excellent |
| Example 12° | 10° | 1.37 | Excellent | 0.07 | Excellent |
| Example 13° | 11° | 1.37 | Excellent | 0.07 | Excellent |
| Example 14° | 12° | 1.38 | Excellent | 0.06 | Excellent |
| Example 15° | 13° | 1.37 | Excellent | 0.08 | Excellent |
| Example 16° | 14° | 1.28 | Good | 0.09 | Excellent |
| Example 17° | 15° | 1.23 | Good | 0.10 | Good |
| Example 18° | 16° | 1.33 | Excellent | 0.08 | Excellent |
| Example 19° | 17° | 1.38 | Excellent | 0.09 | Excellent |
| Example 20° | 18° | 1.39 | Excellent | 0.08 | Excellent |
| Example 21° | 19° | 1.39 | Excellent | 0.07 | Excellent |
| Example 22° | 20° | 1.40 | Excellent | 0.06 | Excellent |
| Example 23° | 21° | 1.39 | Excellent | 0.06 | Excellent |
| Example 24° | 22° | 1.38 | Excellent | 0.06 | Excellent |
| Example 25° | 23° | 1.29 | Good | 0.08 | Excellent |
| Example 26° | 24° | 1.25 | Good | 0.10 | Good |
| Example 27° | 25° | 1.32 | Excellent | 0.08 | Excellent |
| Example 28° | 26° | 1.22 | Good | 0.11 | Good |
| Example 29° | 27° | 1.30 | Good | 0.07 | Excellent |
| Comparative Example 1° | 28° | 1.01 | Poor | 0.45 | Fair |
| Comparative Example 2° | 29° | 1.02 | Poor | 0.50 | Poor |
| Comparative Example 3° | 30° | 0.90 | Poor | 0.60 | Poor |

(2)

| Pigment Dispersion | Evaluation Result | | | |
|---|---|---|---|---|
| | Pigment Dispersion | | Ink | |
| | Initial Viscosity | Storage Stability | Initial Viscosity | Storage Stability |
| Example 1° | 1° | Excellent | Excellent | Excellent | Excellent |
| Example 2° | 1° | Excellent | Excellent | Excellent | Excellent |
| Example 3° | 1° | Excellent | Excellent | Excellent | Excellent |
| Example 4° | 2° | Excellent | Excellent | Excellent | Excellent |
| Example 5° | 3° | Excellent | Excellent | Excellent | Excellent |
| Example 6° | 4° | Excellent | Excellent | Excellent | Excellent |
| Example 7° | 5° | Excellent | Excellent | Excellent | Excellent |
| Example 8° | 6° | Good | Good | Good | Good |
| Example 9° | 7° | Excellent | Excellent | Excellent | Excellent |
| Example 10° | 8° | Excellent | Excellent | Excellent | Excellent |
| Example 11° | 9° | Excellent | Excellent | Excellent | Excellent |
| Example 12° | 10° | Excellent | Excellent | Excellent | Excellent |
| Example 13° | 11° | Excellent | Excellent | Excellent | Excellent |
| Example 14° | 12° | Excellent | Excellent | Excellent | Excellent |
| Example 15° | 13° | Excellent | Excellent | Excellent | Excellent |
| Example 16° | 14° | Excellent | Excellent | Excellent | Excellent |
| Example 17° | 15° | Good | Good | Good | Good |
| Example 18° | 16° | Excellent | Excellent | Excellent | Excellent |
| Example 19° | 17° | Excellent | Excellent | Excellent | Excellent |
| Example 20° | 18° | Excellent | Excellent | Excellent | Excellent |
| Example 21° | 19° | Excellent | Excellent | Excellent | Excellent |
| Example 22° | 20° | Excellent | Excellent | Excellent | Excellent |
| Example 23° | 21° | Excellent | Excellent | Excellent | Excellent |
| Example 24° | 22° | Excellent | Excellent | Excellent | Excellent |
| Example 25° | 23° | Excellent | Excellent | Excellent | Excellent |
| Example 26° | 24° | Good | Good | Good | Good |
| Example 27° | 25° | Excellent | Excellent | Excellent | Excellent |
| Example 28° | 26° | Good | Good | Good | Good |
| Example 29° | 27° | Excellent | Excellent | Excellent | Excellent |
| Comparative Example 1° | 28° | Fair | Fair | Fair | Fair |
| Comparative Example 2° | 29° | Poor | Poor | Poor | Poor |
| Comparative Example 3° | 30° | Poor | Poor | Poor | Poor |

Synthesis of Copolymer

Synthesis Example 1'

A flask equipped with a stirrer, a thermometer and a nitrogen gas introduction pipe was charged with 500.0 parts of a solvent (ethanol), 30.0 parts of 1-methacryloxyethane-1,1-diphosphonic acid (MEDP) [monomer having the formula (I)], 10.0 parts of MPEGMA 9 [monomer having the formula (4-2)], 60.0 parts of benzylacrylate [monomer having the formula (24)] and 4.0 parts of a polymerization initiator (azobisisobutylonitrile), and the mixture was heated to have a temperature of 65° C. Next, after the mixture was polymerized for 10 hrs under a nitrogen stream, about a half of the solvent in the reactant was removed. The reactant was injected in acetone to extract a copolymer, and the copolymer is further dried to prepare a copolymer. Potassium hydroxide was added to the copolymer while diluted to include a solid content in an amount of 10% with water such that the phosphonic acid group were neutralized by 100% to prepare a copolymer 1'.

The copolymer 1' had a weight-average molecular weight of 5,000.

Synthesis Examples 2' to 25'

The procedure for preparation of the copolymer 1' in Synthesis Example 1' was repeated except for replacing MEDP, MPEGMA 9 or benzyl acrylate with monomers having the structure 1, 2 or 3 shown in Table 9 and the contents thereof with those shown therein to prepare copolymers 2' to 25'.

Weight-average molecular weights of these copolymers are shown in Table 9.

Synthesis Examples 26' to 28'

The procedure for preparation of the copolymer 1' in Synthesis Example 1' was repeated except for replacing potassium hydroxide for neutralizing the copolymer with sodium hydroxide (Synthesis Example 26'), lithium hydroxide (Synthesis Example 27') and dimethyl ethanol amine (Synthesis Example 28') to prepare copolymers 26' to 28'.

Synthesis Examples 29' and 30'

The procedure for preparation of the copolymer 1' in Synthesis Example 1' was repeated except for neutralizing the phosphonic acid group by 70% (Synthesis Example 29') and 50% (Synthesis Example 30') to prepare copolymers 29' and 30'.

Synthesis Examples 31' and 32'

The procedure for preparation of the copolymer 1' in Synthesis Example 1' was repeated except for replacing MEDP with methacrylate (Synthesis Example 31') or acrylate (Synthesis Example 32') to prepare a copolymers 31' and 32'.

The copolymers 31' and 32' had weight-average molecular weights of 10000 and 2000 respectively.

Synthesis Examples 33' to 35'

The procedure for preparation of the copolymer 1' in Synthesis Example 1' was repeated except for using only MEDP (Synthesis Example 33'), only MPEGMA9 (Synthesis Example 34') or only stearylacrylate (Synthesis Example 35') as a monomer without neutralization to prepare a copolymers 33' to 35'.

The copolymers 33' to 35' had weight-average molecular weights of 5000 respectively.

Synthesis Example 36'

The procedure for preparation of the copolymer 1' in Synthesis Example 1' was repeated except for using only benzylacrylate as a monomer to prepare a copolymer 36'.

The copolymer 36' had a weight-average molecular weight of 5000.

Properties of the copolymers 1' to 36° are shown in Table 9. The structure 1 includes monomers having the structural units represented by the formula (1), the structure 2 includes monomers having the structural units represented by the formula (2) and the structure 3 includes monomers having the structural units represented by the formulae (6) and (7). The monomers in the copolymer 31' and 32' do not have the structural units represented by the formula (1).

Abbreviations in Table 9 represent the following compounds. Those already described are omitted.
StA: stearylacrylate
StMA: stearylmethacrylate
BzA: benzylacrylate
BzMA: benzylmethacrylate

TABLE 9

(1)

|  | Structure 1 | Structure 2 | Structure 3 |
|---|---|---|---|
| Copolymer 1' | MEDP | MPEGMA9 | BzA |
| Copolymer 2' | MEDP | MPEGMA9 | StA |
| Copolymer 3' | MEDP | MPEGMA9 | BzA |
| Copolymer 4' | MEDP | MPEGA | BzA |
| Copolymer 5' | MEDP | EDEGA | BzA |
| Copolymer 6' | MEDP | BDEGMA | BzA |
| Copolymer 7' | MEDP | MTEGA | BzA |
| Copolymer 8' | MEDP | MPEGMA30 | BzA |
| Copolymer 9' | MEDP | MDPGMA | BzA |
| Copolymer 10' | MEDP | MPEGMA9 | StMA |
| Copolymer 11' | MEDP | MPEGMA9 | BzMA |
| Copolymer 12' | MEDP | MPEGMA9 | BzA |
| Copolymer 13' | MEDP | MPEGMA9 | BzA |
| Copolymer 14' | MEDP | MPEGMA9 | BzA |
| Copolymer 15' | MEDP | MPEGMA9 | BzA |
| Copolymer 16' | MEDP | MPEGMA9 | BzA |
| Copolymer 17' | MEDP | MPEGMA9 | BzA |
| Copolymer 18' | MEDP | MPEGMA9 | BzA |
| Copolymer 19' | MEDP | MPEGMA9 | BzA |
| Copolymer 20' | MEDP | MPEGMA9 | BzA |
| Copolymer 21' | MEDP | MPEGMA9 | BzA |
| Copolymer 22' | MEDP | MPEGMA9 | BzA |
| Copolymer 23' | MEDP | MPEGMA9 | BzA |
| Copolymer 24' | MEDP | MPEGMA9 | BzA |
| Copolymer 25' | MEDP | MPEGMA9 | BzA |
| Copolymer 26' | MEDP | MPEGMA9 | BzA |
| Copolymer 27' | MEDP | MPEGMA9 | BzA |
| Copolymer 28' | MEDP | MPEGMA9 | BzA |
| Copolymer 29' | MEDP | MPEGMA9 | BzA |
| Copolymer 30' | MEDP | MPEGMA9 | BzA |
| Copolymer 31' | Methacrylate | MPEGMA9 | BzA |
| Copolymer 32' | Acrylate | MPEGMA9 | BzA |
| Copolymer 33' | MEDP | — | — |
| Copolymer 34' | — | MPEGMA9 | — |
| Copolymer 35' | — | — | StA |
| Copolymer 36' | — | — | BzA |

(2)

|  | Structure 1 [% by weight] | Structure 2 [% by weight] | Structure 3 [% by weight] |
|---|---|---|---|
| Copolymer 1' | 30.0 | 10.0 | 60.0 |
| Copolymer 2' | 30.0 | 10.0 | 60.0 |
| Copolymer 3' | 30.0 | 10.0 | 60.0 |
| Copolymer 4' | 30.0 | 10.0 | 60.0 |
| Copolymer 5' | 30.0 | 10.0 | 60.0 |
| Copolymer 6' | 30.0 | 10.0 | 60.0 |
| Copolymer 7' | 30.0 | 10.0 | 60.0 |
| Copolymer 8' | 30.0 | 10.0 | 60.0 |
| Copolymer 9' | 30.0 | 10.0 | 60.0 |
| Copolymer 10' | 30.0 | 10.0 | 60.0 |
| Copolymer 11' | 30.0 | 10.0 | 60.0 |
| Copolymer 12' | 15.0 | 35.0 | 50.0 |
| Copolymer 13' | 5.0 | 35.0 | 60.0 |
| Copolymer 14' | 15.0 | 35.0 | 50.0 |
| Copolymer 15' | 55.0 | 35.0 | 10.0 |
| Copolymer 16' | 65.0 | 20.0 | 15.0 |
| Copolymer 17' | 55. | 35.0 | 10.0 |
| Copolymer 18' | 55.0 | 35.0 | 10.0 |
| Copolymer 19' | 65.0 | 20.0 | 15.0 |
| Copolymer 20' | 55.0 | 35.0 | 10.0 |
| Copolymer 21' | 15.0 | 35.0 | 50.0 |
| Copolymer 22' | 5.0 | 35.0 | 60.0 |
| Copolymer 23' | 15.0 | 35.0 | 50.0 |
| Copolymer 24' | 5.0 | 35.0 | 60.0 |
| Copolymer 25' | 65.0 | 20.0 | 15.0 |
| Copolymer 26' | 30.0 | 10.0 | 60.0 |
| Copolymer 27' | 30.0 | 10.0 | 60.0 |
| Copolymer 28' | 30.0 | 10.0 | 60.0 |
| Copolymer 29' | 30.0 | 10.0 | 60.0 |
| Copolymer 30' | 30.0 | 10.0 | 60.0 |
| Copolymer 31' | 30.0 | 10.0 | 60.0 |
| Copolymer 32' | 30.0 | 10.0 | 60.0 |
| Copolymer 33' | 100.0 | — | — |
| Copolymer 34' | — | 100.0 | — |
| Copolymer 35' | — | — | 100.0 |
| Copolymer 36' | — | — | 100.0 |

(3)

|  | Weight-Average Molecular Weight | Counter Ion | Neutralization of Copolymer |
|---|---|---|---|
| Copolymer 1' | 5000 | K | 100 |
| Copolymer 2' | 5000 | K | 100 |
| Copolymer 3' | 5000 | K | 100 |
| Copolymer 4' | 5000 | K | 100 |
| Copolymer 5' | 5000 | K | 100 |
| Copolymer 6' | 5000 | K | 100 |
| Copolymer 7' | 5000 | K | 100 |
| Copolymer 8' | 5000 | K | 100 |
| Copolymer 9' | 5000 | K | 100 |
| Copolymer 10' | 5000 | K | 100 |
| Copolymer 11' | 5000 | K | 100 |
| Copolymer 12' | 1500 | K | 100 |
| Copolymer 13' | 3000 | K | 100 |
| Copolymer 14' | 3000 | K | 100 |
| Copolymer 15' | 1500 | K | 100 |
| Copolymer 16' | 3000 | K | 100 |
| Copolymer 17' | 3000 | K | 100 |
| Copolymer 18' | 60000 | K | 100 |
| Copolymer 19' | 45000 | K | 100 |
| Copolymer 20' | 45000 | K | 100 |
| Copolymer 21' | 60000 | K | 100 |
| Copolymer 22' | 45000 | K | 100 |
| Copolymer 23' | 45000 | K | 100 |
| Copolymer 24' | 1500 | K | 100 |
| Copolymer 25' | 60000 | K | 100 |

TABLE 9-continued

| Copolymer 26' | 5000 | Na | 100 |
| Copolymer 27' | 5000 | Li | 100 |
| Copolymer 28' | 5000 | DMEA | 100 |
| Copolymer 29' | 5000 | K/H | 70 |
| Copolymer 30' | 5000 | K/H | 50 |
| Copolymer 31' | 10000 | K | 100 |
| Copolymer 32' | 2000 | K | 100 |
| Copolymer 33' | 5000 | — | — |
| Copolymer 34' | 5000 | — | — |
| Copolymer 35' | 5000 | — | — |
| Copolymer 36' | 5000 | K | 100 |

Pigment Dispersion Preparation Examples 1' to 40'

Each of the pigment dispersions was prepared as follows.

Preparation Example 1'

Pigment Dispersion 1'

The following materials were premixed to prepare a mixed slurry. This was subjected to a circulation dispersion by a disc type media mill (DMR from Ashizawa Finetech Ltd.) with 0.05 mm zirconia beads at a filling rate of 55%, a peripheral speed of 10 m/s, a liquid temperature of 10° C. for 3 min. Then, the resultant dispersion was subjected to centrifugal separation by a centrifugal separator Model 7700 from KUBOTA Corporation to separate coarse particles to prepare a pigment dispersion 1' having a pigment concentration of 16% by weight.

| | |
|---|---|
| Carbon black (NIPEX160 from Degussa AG having a BET specific surface area of 150 m²/g, an average primary particle diameter of 20 nm a pH of 4.0 and a DBP oil absorption of 620 g/100 g | 160 |
| Copolymer 1' | 40 |
| Distilled water | 800 |

Preparation Example 2'

Pigment Dispersion 2'

The procedure for preparation of the pigment dispersion 1' in Preparation Example 1' was repeated except for replacing the copolymer 1 with an aqueous solution including polyoxyethylene (POE) (m=40)-β-naphthyl ether from Takemoto Oil & Fat Co., Ltd. in an amount of 10% by weight to a pigment dispersion 2' having a pigment concentration of 16% by weight.

Preparation Examples 3' to 40'

Pigment Dispersions 3' to 40'

The procedure for preparation of the pigment dispersion 1' in Preparation Example 1' was repeated except for changing the copolymer, the parts thereof, the pigment or the parts of distilled water such that the total is 1000 parts as shown in Table 10 to prepare pigment dispersions 3' to 40' each having a pigment concentration of 16% by weight.

The compositions of the pigment dispersions 1' to 40' are shown in Table 10. [*] represents an aqueous solution including polyoxyethylene (POE) (m=40)-β-naphthyl ether in an amount of 10% by weight

TABLE 10

(1)

| | Pigment Dispersion | | | | |
|---|---|---|---|---|---|
| | 1' | 2' | 3' | 4' | 5' |
| Copolymer 1' | 40 | | 40 | 40 | 40 |
| Copolymer 2' | | | | | |
| Copolymer 3' | | | | | |
| Copolymer 4' | | | | | |
| Copolymer 5' | | | | | |
| Copolymer 6' | | | | | |
| Copolymer 7' | | | | | |
| Copolymer 8' | | | | | |
| Copolymer 9' | | | | | |
| Copolymer 10' | | | | | |
| Copolymer 11' | | | | | |
| Copolymer 12' | | | | | |
| Copolymer 13' | | | | | |
| Copolymer 14' | | | | | |
| Copolymer 15' | | | | | |
| Copolymer 16' | | | | | |
| Copolymer 17' | | | | | |
| Copolymer 18' | | | | | |
| Copolymer 19' | | | | | |
| Copolymer 20' | | | | | |
| Copolymer 21' | | | | | |
| Copolymer 22' | | | | | |
| Copolymer 23' | | | | | |
| Copolymer 24' | | | | | |
| Copolymer 25' | | | | | |
| Copolymer 26' | | | | | |
| Copolymer 27' | | | | | |
| Copolymer 28' | | | | | |
| Copolymer 29' | | | | | |
| Copolymer 30' | | | | | |
| Copolymer 31' | | | | | |
| Copolymer 32' | | | | | |
| Copolymer 33' | | | | | |
| Copolymer 34' | | | | | |
| Copolymer 35' | | | | | |
| Copolymer 36' | | | | | |
| [*] | | 40 | | | |
| Carbon Black | 160 | 160 | | | |
| Pigment Blue 15:3 | | | 160 | | |
| Pigment Red 122 | | | | 160 | |
| Pigment Yellow 74 | | | | | 160 |
| Distilled Water | Balance | Balance | Balance | Balance | Balance |
| Total | 1000 | 1000 | 1000 | 1000 | 1000 |

(2)

| | Pigment Dispersion | | | | |
|---|---|---|---|---|---|
| | 6' | 7' | 8' | 9' | 10' |
| Copolymer 1' | | | | | |
| Copolymer 2' | 40 | | | | |
| Copolymer 3' | | 40 | | | |
| Copolymer 4' | | | 40 | | |
| Copolymer 5' | | | | 40 | |
| Copolymer 6' | | | | | 40 |
| Copolymer 7' | | | | | |
| Copolymer 8' | | | | | |
| Copolymer 9' | | | | | |
| Copolymer 10' | | | | | |
| Copolymer 11' | | | | | |
| Copolymer 12' | | | | | |
| Copolymer 13' | | | | | |
| Copolymer 14' | | | | | |
| Copolymer 15' | | | | | |
| Copolymer 16' | | | | | |
| Copolymer 17' | | | | | |
| Copolymer 18' | | | | | |
| Copolymer 19' | | | | | |
| Copolymer 20' | | | | | |

TABLE 10-continued (continued)

| | | | | | |
|---|---|---|---|---|---|
| Copolymer 21' | | | | | |
| Copolymer 22' | | | | | |
| Copolymer 23' | | | | | |
| Copolymer 24' | | | | | |
| Copolymer 25' | | | | | |
| Copolymer 26' | | | | | |
| Copolymer 27' | | | | | |
| Copolymer 28' | | | | | |
| Copolymer 29' | | | | | |
| Copolymer 30' | | | | | |
| Copolymer 31' | | | | | |
| Copolymer 32' | | | | | |
| Copolymer 33' | | | | | |
| Copolymer 34' | | | | | |
| Copolymer 35' | | | | | |
| Copolymer 36' | | | | | |
| [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

(3)

| | Pigment Dispersion | | | | |
|---|---|---|---|---|---|
| | 11' | 12' | 13' | 14' | 15' |
| Copolymer 1' | | | | | |
| Copolymer 2' | | | | | |
| Copolymer 3' | | | | | |
| Copolymer 4' | | | | | |
| Copolymer 5' | | | | | |
| Copolymer 6' | | | | | |
| Copolymer 7' | 40 | | | | |
| Copolymer 8' | | 40 | | | |
| Copolymer 9' | | | 40 | | |
| Copolymer 10' | | | | 40 | |
| Copolymer 11' | | | | | 40 |
| Copolymer 12' | | | | | |
| Copolymer 13' | | | | | |
| Copolymer 14' | | | | | |
| Copolymer 15' | | | | | |
| Copolymer 16' | | | | | |
| Copolymer 17' | | | | | |
| Copolymer 18' | | | | | |
| Copolymer 19' | | | | | |
| Copolymer 20' | | | | | |
| Copolymer 21' | | | | | |
| Copolymer 22' | | | | | |
| Copolymer 23' | | | | | |
| Copolymer 24' | | | | | |
| Copolymer 25' | | | | | |
| Copolymer 26' | | | | | |
| Copolymer 27' | | | | | |
| Copolymer 28' | | | | | |
| Copolymer 29' | | | | | |
| Copolymer 30' | | | | | |
| Copolymer 31' | | | | | |
| Copolymer 32' | | | | | |
| Copolymer 33' | | | | | |
| Copolymer 34' | | | | | |
| Copolymer 35' | | | | | |
| Copolymer 36' | | | | | |
| [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

(4)

| | Pigment Dispersion | | | | |
|---|---|---|---|---|---|
| | 16' | 17' | 18' | 19' | 20' |
| Copolymer 1' | | | | | |
| Copolymer 2' | | | | | |
| Copolymer 3' | | | | | |
| Copolymer 4' | | | | | |
| Copolymer 5' | | | | | |
| Copolymer 6' | | | | | |
| Copolymer 7' | | | | | |
| Copolymer 8' | | | | | |
| Copolymer 9' | | | | | |
| Copolymer 10' | | | | | |
| Copolymer 11' | | | | | |
| Copolymer 12' | 40 | | | | |
| Copolymer 13' | | 40 | | | |
| Copolymer 14' | | | 40 | | |
| Copolymer 15' | | | | 40 | |
| Copolymer 16' | | | | | 40 |
| Copolymer 17' | | | | | |
| Copolymer 18' | | | | | |
| Copolymer 19' | | | | | |
| Copolymer 20' | | | | | |
| Copolymer 21' | | | | | |
| Copolymer 22' | | | | | |
| Copolymer 23' | | | | | |
| Copolymer 24' | | | | | |
| Copolymer 25' | | | | | |
| Copolymer 26' | | | | | |
| Copolymer 27' | | | | | |
| Copolymer 28' | | | | | |
| Copolymer 29' | | | | | |
| Copolymer 30' | | | | | |
| Copolymer 31' | | | | | |
| Copolymer 32' | | | | | |
| Copolymer 33' | | | | | |
| Copolymer 34' | | | | | |
| Copolymer 35' | | | | | |
| Copolymer 36' | | | | | |
| [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

(5)

| | Pigment Dispersion | | | | |
|---|---|---|---|---|---|
| | 21' | 22' | 23' | 24' | 25' |
| Copolymer 1' | | | | | |
| Copolymer 2' | | | | | |
| Copolymer 3' | | | | | |
| Copolymer 4' | | | | | |
| Copolymer 5' | | | | | |
| Copolymer 6' | | | | | |
| Copolymer 7' | | | | | |
| Copolymer 8' | | | | | |
| Copolymer 9' | | | | | |
| Copolymer 10' | | | | | |
| Copolymer 11' | | | | | |
| Copolymer 12' | | | | | |

TABLE 10-continued

|  | | | | | |
|---|---|---|---|---|---|
| Copolymer 13' | | | | | |
| Copolymer 14' | | | | | |
| Copolymer 15' | | | | | |
| Copolymer 16' | | | | | |
| Copolymer 17' | 40 | | | | |
| Copolymer 18' | | 40 | | | |
| Copolymer 19' | | | 40 | | |
| Copolymer 20' | | | | 40 | |
| Copolymer 21' | | | | | 40 |
| Copolymer 22' | | | | | |
| Copolymer 23' | | | | | |
| Copolymer 24' | | | | | |
| Copolymer 25' | | | | | |
| Copolymer 26' | | | | | |
| Copolymer 27' | | | | | |
| Copolymer 28' | | | | | |
| Copolymer 29' | | | | | |
| Copolymer 30' | | | | | |
| Copolymer 31' | | | | | |
| Copolymer 32' | | | | | |
| Copolymer 33' | | | | | |
| Copolymer 34' | | | | | |
| Copolymer 35' | | | | | |
| Copolymer 36' | | | | | |
| [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

(6)

| Pigment Dispersion | | | | | |
|---|---|---|---|---|---|
|  | 26' | 27' | 28' | 29' | 30' |
| Copolymer 1' | | | | | |
| Copolymer 2' | | | | | |
| Copolymer 3' | | | | | |
| Copolymer 4' | | | | | |
| Copolymer 5' | | | | | |
| Copolymer 6' | | | | | |
| Copolymer 7' | | | | | |
| Copolymer 8' | | | | | |
| Copolymer 9' | | | | | |
| Copolymer 10' | | | | | |
| Copolymer 11' | | | | | |
| Copolymer 12' | | | | | |
| Copolymer 13' | | | | | |
| Copolymer 14' | | | | | |
| Copolymer 15' | | | | | |
| Copolymer 16' | | | | | |
| Copolymer 17' | | | | | |
| Copolymer 18' | | | | | |
| Copolymer 19' | | | | | |
| Copolymer 20' | | | | | |
| Copolymer 21' | | | | | |
| Copolymer 22' | 40 | | | | |
| Copolymer 23' | | 40 | | | |
| Copolymer 24' | | | 40 | | |
| Copolymer 25' | | | | 40 | |
| Copolymer 26' | | | | | 40 |
| Copolymer 27' | | | | | |
| Copolymer 28' | | | | | |
| Copolymer 29' | | | | | |
| Copolymer 30' | | | | | |
| Copolymer 31' | | | | | |
| Copolymer 32' | | | | | |
| Copolymer 33' | | | | | |
| Copolymer 34' | | | | | |
| Copolymer 35' | | | | | |
| Copolymer 36' | | | | | |
| [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

(7)

| Pigment Dispersion | | | | | |
|---|---|---|---|---|---|
|  | 31' | 32' | 33' | 34' | 35' |
| Copolymer 1' | | | | | |
| Copolymer 2' | | | | | |
| Copolymer 3' | | | | | |
| Copolymer 4' | | | | | |
| Copolymer 5' | | | | | |
| Copolymer 6' | | | | | |
| Copolymer 7' | | | | | |
| Copolymer 8' | | | | | |
| Copolymer 9' | | | | | |
| Copolymer 10' | | | | | |
| Copolymer 11' | | | | | |
| Copolymer 12' | | | | | |
| Copolymer 13' | | | | | |
| Copolymer 14' | | | | | |
| Copolymer 15' | | | | | |
| Copolymer 16' | | | | | |
| Copolymer 17' | | | | | |
| Copolymer 18' | | | | | |
| Copolymer 19' | | | | | |
| Copolymer 20' | | | | | |
| Copolymer 21' | | | | | |
| Copolymer 22' | | | | | |
| Copolymer 23' | | | | | |
| Copolymer 24' | | | | | |
| Copolymer 25' | | | | | |
| Copolymer 26' | | | | | |
| Copolymer 27' | 40 | | | | |
| Copolymer 28' | | 40 | | | |
| Copolymer 29' | | | 40 | | |
| Copolymer 30' | | | | 40 | |
| Copolymer 31' | | | | | 40 |
| Copolymer 32' | | | | | |
| Copolymer 33' | | | | | |
| Copolymer 34' | | | | | |
| Copolymer 35' | | | | | |
| Copolymer 36' | | | | | |
| [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

(8)

| Pigment Dispersion | | | | | |
|---|---|---|---|---|---|
|  | 36' | 37' | 38' | 39' | 40' |
| Copolymer 1' | | | | | |
| Copolymer 2' | | | | | |
| Copolymer 3' | | | | | |
| Copolymer 4' | | | | | |
| Copolymer 5' | | | | | |
| Copolymer 6' | | | | | |

TABLE 10-continued

| | | | | | |
|---|---|---|---|---|---|
| Copolymer 7' | | | | | |
| Copolymer 8' | | | | | |
| Copolymer 9' | | | | | |
| Copolymer 10' | | | | | |
| Copolymer 11' | | | | | |
| Copolymer 12' | | | | | |
| Copolymer 13' | | | | | |
| Copolymer 14' | | | | | |
| Copolymer 15' | | | | | |
| Copolymer 16' | | | | | |
| Copolymer 17' | | | | | |
| Copolymer 18' | | | | | |
| Copolymer 19' | | | | | |
| Copolymer 20' | | | | | |
| Copolymer 21' | | | | | |
| Copolymer 22' | | | | | |
| Copolymer 23' | | | | | |
| Copolymer 24' | | | | | |
| Copolymer 25' | | | | | |
| Copolymer 26' | | | | | |
| Copolymer 27' | | | | | |
| Copolymer 28' | | | | | |
| Copolymer 29' | | | | | |
| Copolymer 30' | | | | | |
| Copolymer 31' | | | | | |
| Copolymer 32' | 40 | | | | |
| Copolymer 33' | | 40 | | | |
| Copolymer 34' | | | 40 | | |
| Copolymer 35' | | | | 40 | |
| Copolymer 36' | | | | | 40 |
| [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

Preparation of Ink for Inkjet Recording

Example 1'

The following materials were mixed and stirred for 1 hr. The resultant dispersion was subjected to pressure filtration by a polyvinylidenefluoride membrane filter having an average pore diameter of 5.0 μm to remove coarse particles and dusts. Thus, an ink was prepared.

| | |
|---|---|
| Pigment dispersion 1' (pigment concentration 16%) | 50 |
| Glycerin | 10 |
| 1,3-butanediol | 20 |
| Distilled water | 20 |

Examples 2' to 36' and Comparative Examples 1' to 6'

The procedure for preparation of the ink in Example 1' was repeated except for using materials shown in Table 11 to prepare inks of Examples 2' to 36' and Comparative Examples 1' to 6'. [*] represents an aqueous solution including polyoxyethylene (POE) (m=40)-β-naphthyl ether in an amount of 10% by weight

TABLE 11

(1)

| | | Example | | | |
|---|---|---|---|---|---|
| | | 1' | 2' | 3' | 4' |
| Pigment Dispersion 1' | Copolymer 1' | 50 | 50 | 50 | |
| Pigment Dispersion 2' | [*] | | | | 50 |
| Pigment Dispersion 3' | Copolymer 1' | | | | |
| Pigment Dispersion 4' | Copolymer 1' | | | | |
| Pigment Dispersion 5' | Copolymer 1' | | | | |
| Pigment Dispersion 6' | Copolymer 2' | | | | |
| Pigment Dispersion 7' | Copolymer 3' | | | | |
| Pigment Dispersion 8' | Copolymer 4' | | | | |
| Pigment Dispersion 9' | Copolymer 5' | | | | |
| Pigment Dispersion 10' | Copolymer 6' | | | | |
| Pigment Dispersion 11' | Copolymer 7' | | | | |
| Pigment Dispersion 12' | Copolymer 8' | | | | |
| Pigment Dispersion 13' | Copolymer 9' | | | | |
| Pigment Dispersion 14' | Copolymer 10' | | | | |
| Pigment Dispersion 15' | Copolymer 11' | | | | |
| Pigment Dispersion 16' | Copolymer 12' | | | | |
| Pigment Dispersion 17' | Copolymer 13' | | | | |
| Pigment Dispersion 18' | Copolymer 14' | | | | |
| Pigment Dispersion 19' | Copolymer 15' | | | | |
| Pigment Dispersion 20' | Copolymer 16' | | | | |
| Pigment Dispersion 21' | Copolymer 17' | | | | |
| Pigment Dispersion 22' | Copolymer 18' | | | | |
| Pigment Dispersion 23' | Copolymer 19' | | | | |
| Pigment Dispersion 24' | Copolymer 20' | | | | |
| Pigment Dispersion 25' | Copolymer 21' | | | | |
| Pigment Dispersion 26' | Copolymer 22' | | | | |
| Pigment Dispersion 27' | Copolymer 23' | | | | |
| Pigment Dispersion 28' | Copolymer 24' | | | | |
| Pigment Dispersion 29' | Copolymer 25' | | | | |
| Pigment Dispersion 30' | Copolymer 26' | | | | |
| Pigment Dispersion 31' | Copolymer 27' | | | | |
| Pigment Dispersion 32' | Copolymer 28' | | | | |
| Pigment Dispersion 33' | Copolymer 29' | | | | |
| Pigment Dispersion 34' | Copolymer 30' | | | | |
| Pigment Dispersion 35' | Copolymer 31' | | | | |
| Pigment Dispersion 36' | Copolymer 32' | | | | |
| Pigment Dispersion 37' | Copolymer 33' | | | | |
| Pigment Dispersion 38' | Copolymer 34' | | | | |
| Pigment Dispersion 39' | Copolymer 35' | | | | |
| Pigment Dispersion 40' | Copolymer 36' | | | | |
| Copolymer 1' (Additive) | | | | | 4 |
| Hydro-soluble solvent | Glycerin | 10 | | 20 | 10 |
| | 1,3-butanediol | 20 | 30 | | 20 |
| | Trimethylol Propane | | | 5 | |
| | 2-pyrrolidone | | | 5 | |
| Distilled Water | | Balance | Balance | Balance | Balance |
| Total | | 100 | 100 | 100 | 100 |

(2)

| | | Example | | | |
|---|---|---|---|---|---|
| | | 5' | 6' | 7' | 8' |
| Pigment Dispersion 1' | Copolymer 1' | | | | |
| Pigment Dispersion 2' | [*] | | | | |
| Pigment Dispersion 3' | Copolymer 1' | 30 | | | |
| Pigment Dispersion 4' | Copolymer 1' | | 50 | | |
| Pigment Dispersion 5' | Copolymer 1' | | | 30 | |
| Pigment Dispersion 6' | Copolymer 2' | | | | 50 |
| Pigment Dispersion 7' | Copolymer 3' | | | | |
| Pigment Dispersion 8' | Copolymer 4' | | | | |
| Pigment Dispersion 9' | Copolymer 5' | | | | |
| Pigment Dispersion 10' | Copolymer 6' | | | | |
| Pigment Dispersion 11' | Copolymer 7' | | | | |
| Pigment Dispersion 12' | Copolymer 8' | | | | |
| Pigment Dispersion 13' | Copolymer 9' | | | | |
| Pigment Dispersion 14' | Copolymer 10' | | | | |
| Pigment Dispersion 15' | Copolymer 11' | | | | |
| Pigment Dispersion 16' | Copolymer 12' | | | | |
| Pigment Dispersion 17' | Copolymer 13' | | | | |

TABLE 11-continued

| | | | | | |
|---|---|---|---|---|---|
| Pigment Dispersion 18' | Copolymer 14' | | | | |
| Pigment Dispersion 19' | Copolymer 15' | | | | |
| Pigment Dispersion 20' | Copolymer 16' | | | | |
| Pigment Dispersion 21' | Copolymer 17' | | | | |
| Pigment Dispersion 22' | Copolymer 18' | | | | |
| Pigment Dispersion 23' | Copolymer 19' | | | | |
| Pigment Dispersion 24' | Copolymer 20' | | | | |
| Pigment Dispersion 25' | Copolymer 21' | | | | |
| Pigment Dispersion 26' | Copolymer 22' | | | | |
| Pigment Dispersion 27' | Copolymer 23' | | | | |
| Pigment Dispersion 28' | Copolymer 24' | | | | |
| Pigment Dispersion 29' | Copolymer 25' | | | | |
| Pigment Dispersion 30' | Copolymer 26' | | | | |
| Pigment Dispersion 31' | Copolymer 27' | | | | |
| Pigment Dispersion 32' | Copolymer 28' | | | | |
| Pigment Dispersion 33' | Copolymer 29' | | | | |
| Pigment Dispersion 34' | Copolymer 30' | | | | |
| Pigment Dispersion 35' | Copolymer 31' | | | | |
| Pigment Dispersion 36' | Copolymer 32' | | | | |
| Pigment Dispersion 37' | Copolymer 33' | | | | |
| Pigment Dispersion 38' | Copolymer 34' | | | | |
| Pigment Dispersion 39' | Copolymer 35' | | | | |
| Pigment Dispersion 40' | Copolymer 36' | | | | |
| Copolymer 1' (Additive) | | | | | |
| Hydro-soluble solvent | Glycerin | 10 | 10 | 10 | 10 |
| | 1,3-butanediol | 20 | 20 | 20 | 20 |
| | Trimethylol Propane 2-pyrrolidone | | | | |
| Distilled Water | | Balance | Balance | Balance | Balance |
| Total | | 100 | 100 | 100 | 100 |

(3)

| | | Example | | | |
|---|---|---|---|---|---|
| | | 9' | 10' | 11' | 12' |
| Pigment Dispersion 1' | Copolymer 1' | | | | |
| Pigment Dispersion 2' | [*] | | | | |
| Pigment Dispersion 3' | Copolymer 1' | | | | |
| Pigment Dispersion 4' | Copolymer 1' | | | | |
| Pigment Dispersion 5' | Copolymer 1' | | | | |
| Pigment Dispersion 6' | Copolymer 2' | | | | |
| Pigment Dispersion 7' | Copolymer 3' | 50 | | | |
| Pigment Dispersion 8' | Copolymer 4' | | 50 | | |
| Pigment Dispersion 9' | Copolymer 5' | | | 50 | |
| Pigment Dispersion 10' | Copolymer 6' | | | | 50 |
| Pigment Dispersion 11' | Copolymer 7' | | | | |
| Pigment Dispersion 12' | Copolymer 8' | | | | |
| Pigment Dispersion 13' | Copolymer 9' | | | | |
| Pigment Dispersion 14' | Copolymer 10' | | | | |
| Pigment Dispersion 15' | Copolymer 11' | | | | |
| Pigment Dispersion 16' | Copolymer 12' | | | | |
| Pigment Dispersion 17' | Copolymer 13' | | | | |
| Pigment Dispersion 18' | Copolymer 14' | | | | |
| Pigment Dispersion 19' | Copolymer 15' | | | | |
| Pigment Dispersion 20' | Copolymer 16' | | | | |
| Pigment Dispersion 21' | Copolymer 17' | | | | |
| Pigment Dispersion 22' | Copolymer 18' | | | | |
| Pigment Dispersion 23' | Copolymer 19' | | | | |
| Pigment Dispersion 24' | Copolymer 20' | | | | |
| Pigment Dispersion 25' | Copolymer 21' | | | | |
| Pigment Dispersion 26' | Copolymer 22' | | | | |
| Pigment Dispersion 27' | Copolymer 23' | | | | |
| Pigment Dispersion 28' | Copolymer 24' | | | | |
| Pigment Dispersion 29' | Copolymer 25' | | | | |
| Pigment Dispersion 30' | Copolymer 26' | | | | |
| Pigment Dispersion 31' | Copolymer 27' | | | | |
| Pigment Dispersion 32' | Copolymer 28' | | | | |
| Pigment Dispersion 33' | Copolymer 29' | | | | |
| Pigment Dispersion 34' | Copolymer 30' | | | | |
| Pigment Dispersion 35' | Copolymer 31' | | | | |
| Pigment Dispersion 36' | Copolymer 32' | | | | |
| Pigment Dispersion 37' | Copolymer 33' | | | | |
| Pigment Dispersion 38' | Copolymer 34' | | | | |
| Pigment Dispersion 39' | Copolymer 35' | | | | |
| Pigment Dispersion 40' | Copolymer 36' | | | | |
| Copolymer 1' (Additive) | | | | | |
| Hydro-soluble solvent | Glycerin | 10 | 10 | 10 | 10 |
| | 1,3-butanediol | 20 | 20 | 20 | 20 |
| | Trimethylol Propane 2-pyrrolidone | | | | |
| Distilled Water | | Balance | Balance | Balance | Balance |
| Total | | 100 | 100 | 100 | 100 |

(4)

| | | Example | | | |
|---|---|---|---|---|---|
| | | 13' | 14' | 15' | 16' |
| Pigment Dispersion 1' | Copolymer 1' | | | | |
| Pigment Dispersion 2' | [*] | | | | |
| Pigment Dispersion 3' | Copolymer 1' | | | | |
| Pigment Dispersion 4' | Copolymer 1' | | | | |
| Pigment Dispersion 5' | Copolymer 1' | | | | |
| Pigment Dispersion 6' | Copolymer 2' | | | | |
| Pigment Dispersion 7' | Copolymer 3' | | | | |
| Pigment Dispersion 8' | Copolymer 4' | | | | |
| Pigment Dispersion 9' | Copolymer 5' | | | | |
| Pigment Dispersion 10' | Copolymer 6' | | | | |
| Pigment Dispersion 11' | Copolymer 7' | 50 | | | |
| Pigment Dispersion 12' | Copolymer 8' | | 50 | | |
| Pigment Dispersion 13' | Copolymer 9' | | | 50 | |
| Pigment Dispersion 14' | Copolymer 10' | | | | 50 |
| Pigment Dispersion 15' | Copolymer 11' | | | | |
| Pigment Dispersion 16' | Copolymer 12' | | | | |
| Pigment Dispersion 17' | Copolymer 13' | | | | |
| Pigment Dispersion 18' | Copolymer 14' | | | | |
| Pigment Dispersion 19' | Copolymer 15' | | | | |
| Pigment Dispersion 20' | Copolymer 16' | | | | |
| Pigment Dispersion 21' | Copolymer 17' | | | | |
| Pigment Dispersion 22' | Copolymer 18' | | | | |
| Pigment Dispersion 23' | Copolymer 19' | | | | |
| Pigment Dispersion 24' | Copolymer 20' | | | | |
| Pigment Dispersion 25' | Copolymer 21' | | | | |
| Pigment Dispersion 26' | Copolymer 22' | | | | |
| Pigment Dispersion 27' | Copolymer 23' | | | | |
| Pigment Dispersion 28' | Copolymer 24' | | | | |
| Pigment Dispersion 29' | Copolymer 25' | | | | |
| Pigment Dispersion 30' | Copolymer 26' | | | | |
| Pigment Dispersion 31' | Copolymer 27' | | | | |
| Pigment Dispersion 32' | Copolymer 28' | | | | |
| Pigment Dispersion 33' | Copolymer 29' | | | | |
| Pigment Dispersion 34' | Copolymer 30' | | | | |
| Pigment Dispersion 35' | Copolymer 31' | | | | |
| Pigment Dispersion 36' | Copolymer 32' | | | | |
| Pigment Dispersion 37' | Copolymer 33' | | | | |
| Pigment Dispersion 38' | Copolymer 34' | | | | |
| Pigment Dispersion 39' | Copolymer 35' | | | | |
| Pigment Dispersion 40' | Copolymer 36' | | | | |
| Copolymer 1' (Additive) | | | | | |
| Hydro-soluble solvent | Glycerin | 10 | 10 | 10 | 10 |
| | 1,3-butanediol | 20 | 20 | 20 | 20 |
| | Trimethylol Propane 2-pyrrolidone | | | | |
| Distilled Water | | Balance | Balance | Balance | Balance |
| Total | | 100 | 100 | 100 | 100 |

(5)

| | | Example | | | |
|---|---|---|---|---|---|
| | | 17' | 18' | 19' | 20' |
| Pigment Dispersion 1' | Copolymer 1' | | | | |
| Pigment Dispersion 2' | [*] | | | | |
| Pigment Dispersion 3' | Copolymer 1' | | | | |
| Pigment Dispersion 4' | Copolymer 1' | | | | |

TABLE 11-continued

| | | | | | |
|---|---|---|---|---|---|
| Pigment Dispersion 5' | Copolymer 1' | | | | |
| Pigment Dispersion 6' | Copolymer 2' | | | | |
| Pigment Dispersion 7' | Copolymer 3' | | | | |
| Pigment Dispersion 8' | Copolymer 4' | | | | |
| Pigment Dispersion 9' | Copolymer 5' | | | | |
| Pigment Dispersion 10' | Copolymer 6' | | | | |
| Pigment Dispersion 11' | Copolymer 7' | | | | |
| Pigment Dispersion 12' | Copolymer 8' | | | | |
| Pigment Dispersion 13' | Copolymer 9' | | | | |
| Pigment Dispersion 14' | Copolymer 10' | | | | |
| Pigment Dispersion 15' | Copolymer 11' | 50 | | | |
| Pigment Dispersion 16' | Copolymer 12' | | 50 | | |
| Pigment Dispersion 17' | Copolymer 13' | | | 50 | |
| Pigment Dispersion 18' | Copolymer 14' | | | | 50 |
| Pigment Dispersion 19' | Copolymer 15' | | | | |
| Pigment Dispersion 20' | Copolymer 16' | | | | |
| Pigment Dispersion 21' | Copolymer 17' | | | | |
| Pigment Dispersion 22' | Copolymer 18' | | | | |
| Pigment Dispersion 23' | Copolymer 19' | | | | |
| Pigment Dispersion 24' | Copolymer 20' | | | | |
| Pigment Dispersion 25' | Copolymer 21' | | | | |
| Pigment Dispersion 26' | Copolymer 22' | | | | |
| Pigment Dispersion 27' | Copolymer 23' | | | | |
| Pigment Dispersion 28' | Copolymer 24' | | | | |
| Pigment Dispersion 29' | Copolymer 25' | | | | |
| Pigment Dispersion 30' | Copolymer 26' | | | | |
| Pigment Dispersion 31' | Copolymer 27' | | | | |
| Pigment Dispersion 32' | Copolymer 28' | | | | |
| Pigment Dispersion 33' | Copolymer 29' | | | | |
| Pigment Dispersion 34' | Copolymer 30' | | | | |
| Pigment Dispersion 35' | Copolymer 31' | | | | |
| Pigment Dispersion 36' | Copolymer 32' | | | | |
| Pigment Dispersion 37' | Copolymer 33' | | | | |
| Pigment Dispersion 38' | Copolymer 34' | | | | |
| Pigment Dispersion 39' | Copolymer 35' | | | | |
| Pigment Dispersion 40' | Copolymer 36' | | | | |
| Copolymer 1' (Additive) | | | | | |
| Hydro-soluble solvent | Glycerin | 10 | 10 | 10 | 10 |
| | 1,3-butanediol | 20 | 20 | 20 | 20 |
| | Trimethylol Propane | | | | |
| | 2-pyrrolidone | | | | |
| Distilled Water | | Balance | Balance | Balance | Balance |
| Total | | 100 | 100 | 100 | 100 |

(6)

| | | Example | | | |
|---|---|---|---|---|---|
| | | 21' | 22' | 23' | 24' |
| Pigment Dispersion 1' | Copolymer 1' | | | | |
| Pigment Dispersion 2' | [*] | | | | |
| Pigment Dispersion 3' | Copolymer 1' | | | | |
| Pigment Dispersion 4' | Copolymer 1' | | | | |
| Pigment Dispersion 5' | Copolymer 1' | | | | |
| Pigment Dispersion 6' | Copolymer 2' | | | | |
| Pigment Dispersion 7' | Copolymer 3' | | | | |
| Pigment Dispersion 8' | Copolymer 4' | | | | |
| Pigment Dispersion 9' | Copolymer 5' | | | | |
| Pigment Dispersion 10' | Copolymer 6' | | | | |
| Pigment Dispersion 11' | Copolymer 7' | | | | |
| Pigment Dispersion 12' | Copolymer 8' | | | | |
| Pigment Dispersion 13' | Copolymer 9' | | | | |
| Pigment Dispersion 14' | Copolymer 10' | | | | |
| Pigment Dispersion 15' | Copolymer 11' | | | | |
| Pigment Dispersion 16' | Copolymer 12' | | | | |
| Pigment Dispersion 17' | Copolymer 13' | | | | |
| Pigment Dispersion 18' | Copolymer 14' | | | | |
| Pigment Dispersion 19' | Copolymer 15' | 50 | | | |
| Pigment Dispersion 20' | Copolymer 16' | | 50 | | |
| Pigment Dispersion 21' | Copolymer 17' | | | 50 | |
| Pigment Dispersion 22' | Copolymer 18' | | | | 50 |
| Pigment Dispersion 23' | Copolymer 19' | | | | |
| Pigment Dispersion 24' | Copolymer 20' | | | | |
| Pigment Dispersion 25' | Copolymer 21' | | | | |
| Pigment Dispersion 26' | Copolymer 22' | | | | |
| Pigment Dispersion 27' | Copolymer 23' | | | | |
| Pigment Dispersion 28' | Copolymer 24' | | | | |
| Pigment Dispersion 29' | Copolymer 25' | | | | |
| Pigment Dispersion 30' | Copolymer 26' | | | | |
| Pigment Dispersion 31' | Copolymer 27' | | | | |
| Pigment Dispersion 32' | Copolymer 28' | | | | |
| Pigment Dispersion 33' | Copolymer 29' | | | | |
| Pigment Dispersion 34' | Copolymer 30' | | | | |
| Pigment Dispersion 35' | Copolymer 31' | | | | |
| Pigment Dispersion 36' | Copolymer 32' | | | | |
| Pigment Dispersion 37' | Copolymer 33' | | | | |
| Pigment Dispersion 38' | Copolymer 34' | | | | |
| Pigment Dispersion 39' | Copolymer 35' | | | | |
| Pigment Dispersion 40' | Copolymer 36' | | | | |
| Copolymer 1' (Additive) | | | | | |
| Hydro-soluble solvent | Glycerin | 10 | 10 | 10 | 10 |
| | 1,3-butanediol | 20 | 20 | 20 | 20 |
| | Trimethylol Propane | | | | |
| | 2-pyrrolidone | | | | |
| Distilled Water | | Balance | Balance | Balance | Balance |
| Total | | 100 | 100 | 100 | 100 |

(7)

| | | Example | | | |
|---|---|---|---|---|---|
| | | 25' | 26' | 27' | 28' |
| Pigment Dispersion 1' | Copolymer 1' | | | | |
| Pigment Dispersion 2' | [*] | | | | |
| Pigment Dispersion 3' | Copolymer 1' | | | | |
| Pigment Dispersion 4' | Copolymer 1' | | | | |
| Pigment Dispersion 5' | Copolymer 1' | | | | |
| Pigment Dispersion 6' | Copolymer 2' | | | | |
| Pigment Dispersion 7' | Copolymer 3' | | | | |
| Pigment Dispersion 8' | Copolymer 4' | | | | |
| Pigment Dispersion 9' | Copolymer 5' | | | | |
| Pigment Dispersion 10' | Copolymer 6' | | | | |
| Pigment Dispersion 11' | Copolymer 7' | | | | |
| Pigment Dispersion 12' | Copolymer 8' | | | | |
| Pigment Dispersion 13' | Copolymer 9' | | | | |
| Pigment Dispersion 14' | Copolymer 10' | | | | |
| Pigment Dispersion 15' | Copolymer 11' | | | | |
| Pigment Dispersion 16' | Copolymer 12' | | | | |
| Pigment Dispersion 17' | Copolymer 13' | | | | |
| Pigment Dispersion 18' | Copolymer 14' | | | | |
| Pigment Dispersion 19' | Copolymer 15' | | | | |
| Pigment Dispersion 20' | Copolymer 16' | | | | |
| Pigment Dispersion 21' | Copolymer 17' | | | | |
| Pigment Dispersion 22' | Copolymer 18' | | | | |
| Pigment Dispersion 23' | Copolymer 19' | 50 | | | |
| Pigment Dispersion 24' | Copolymer 20' | | 50 | | |
| Pigment Dispersion 25' | Copolymer 21' | | | 50 | |
| Pigment Dispersion 26' | Copolymer 22' | | | | 50 |
| Pigment Dispersion 27' | Copolymer 23' | | | | |
| Pigment Dispersion 28' | Copolymer 24' | | | | |
| Pigment Dispersion 29' | Copolymer 25' | | | | |
| Pigment Dispersion 30' | Copolymer 26' | | | | |
| Pigment Dispersion 31' | Copolymer 27' | | | | |
| Pigment Dispersion 32' | Copolymer 28' | | | | |
| Pigment Dispersion 33' | Copolymer 29' | | | | |
| Pigment Dispersion 34' | Copolymer 30' | | | | |
| Pigment Dispersion 35' | Copolymer 31' | | | | |
| Pigment Dispersion 36' | Copolymer 32' | | | | |
| Pigment Dispersion 37' | Copolymer 33' | | | | |
| Pigment Dispersion 38' | Copolymer 34' | | | | |
| Pigment Dispersion 39' | Copolymer 35' | | | | |
| Pigment Dispersion 40' | Copolymer 36' | | | | |
| Copolymer 1' (Additive) | | | | | |

TABLE 11-continued (7 continued)

| | | | | | |
|---|---|---|---|---|---|
| Hydro-soluble solvent | Glycerin | 10 | 10 | 10 | 10 |
| | 1,3-butanediol | 20 | 20 | 20 | 20 |
| | Trimethylol Propane | | | | |
| | 2-pyrrolidone | | | | |
| Distilled Water | | Balance | Balance | Balance | Balance |
| Total | | 100 | 100 | 100 | 100 |

(8)

| | | Example | | | |
|---|---|---|---|---|---|
| | | 29' | 30' | 31' | 32' |
| Pigment Dispersion 1' | Copolymer 1' | | | | |
| Pigment Dispersion 2' | [*] | | | | |
| Pigment Dispersion 3' | Copolymer 1' | | | | |
| Pigment Dispersion 4' | Copolymer 1' | | | | |
| Pigment Dispersion 5' | Copolymer 1' | | | | |
| Pigment Dispersion 6' | Copolymer 2' | | | | |
| Pigment Dispersion 7' | Copolymer 3' | | | | |
| Pigment Dispersion 8' | Copolymer 4' | | | | |
| Pigment Dispersion 9' | Copolymer 5' | | | | |
| Pigment Dispersion 10' | Copolymer 6' | | | | |
| Pigment Dispersion 11' | Copolymer 7' | | | | |
| Pigment Dispersion 12' | Copolymer 8' | | | | |
| Pigment Dispersion 13' | Copolymer 9' | | | | |
| Pigment Dispersion 14' | Copolymer 10' | | | | |
| Pigment Dispersion 15' | Copolymer 11' | | | | |
| Pigment Dispersion 16' | Copolymer 12' | | | | |
| Pigment Dispersion 17' | Copolymer 13' | | | | |
| Pigment Dispersion 18' | Copolymer 14' | | | | |
| Pigment Dispersion 19' | Copolymer 15' | | | | |
| Pigment Dispersion 20' | Copolymer 16' | | | | |
| Pigment Dispersion 21' | Copolymer 17' | | | | |
| Pigment Dispersion 22' | Copolymer 18' | | | | |
| Pigment Dispersion 23' | Copolymer 19' | | | | |
| Pigment Dispersion 24' | Copolymer 20' | | | | |
| Pigment Dispersion 25' | Copolymer 21' | | | | |
| Pigment Dispersion 26' | Copolymer 22' | | | | |
| Pigment Dispersion 27' | Copolymer 23' | 50 | | | |
| Pigment Dispersion 28' | Copolymer 24' | | 50 | | |
| Pigment Dispersion 29' | Copolymer 25' | | | 50 | |
| Pigment Dispersion 30' | Copolymer 26' | | | | 50 |
| Pigment Dispersion 31' | Copolymer 27' | | | | |
| Pigment Dispersion 32' | Copolymer 28' | | | | |
| Pigment Dispersion 33' | Copolymer 29' | | | | |
| Pigment Dispersion 34' | Copolymer 30' | | | | |
| Pigment Dispersion 35' | Copolymer 31' | | | | |
| Pigment Dispersion 36' | Copolymer 32' | | | | |
| Pigment Dispersion 37' | Copolymer 33' | | | | |
| Pigment Dispersion 38' | Copolymer 34' | | | | |
| Pigment Dispersion 39' | Copolymer 35' | | | | |
| Pigment Dispersion 40' | Copolymer 36' | | | | |
| Copolymer 1' (Additive) | | | | | |
| Hydro-soluble solvent | Glycerin | 10 | 10 | 10 | 10 |
| | 1,3-butanediol | 20 | 20 | 20 | 20 |
| | Trimethylol Propane | | | | |
| | 2-pyrrolidone | | | | |
| Distilled Water | | Balance | Balance | Balance | Balance |
| Total | | 100 | 100 | 100 | 100 |

(9)

| | | Example | | | |
|---|---|---|---|---|---|
| | | 33' | 34' | 35' | 36' |
| Pigment Dispersion 1' | Copolymer 1' | | | | |
| Pigment Dispersion 2' | [*] | | | | |
| Pigment Dispersion 3' | Copolymer 1' | | | | |
| Pigment Dispersion 4' | Copolymer 1' | | | | |
| Pigment Dispersion 5' | Copolymer 1' | | | | |
| Pigment Dispersion 6' | Copolymer 2' | | | | |
| Pigment Dispersion 7' | Copolymer 3' | | | | |
| Pigment Dispersion 8' | Copolymer 4' | | | | |
| Pigment Dispersion 9' | Copolymer 5' | | | | |
| Pigment Dispersion 10' | Copolymer 6' | | | | |
| Pigment Dispersion 11' | Copolymer 7' | | | | |
| Pigment Dispersion 12' | Copolymer 8' | | | | |
| Pigment Dispersion 13' | Copolymer 9' | | | | |
| Pigment Dispersion 14' | Copolymer 10' | | | | |
| Pigment Dispersion 15' | Copolymer 11' | | | | |
| Pigment Dispersion 16' | Copolymer 12' | | | | |
| Pigment Dispersion 17' | Copolymer 13' | | | | |
| Pigment Dispersion 18' | Copolymer 14' | | | | |
| Pigment Dispersion 19' | Copolymer 15' | | | | |
| Pigment Dispersion 20' | Copolymer 16' | | | | |
| Pigment Dispersion 21' | Copolymer 17' | | | | |
| Pigment Dispersion 22' | Copolymer 18' | | | | |
| Pigment Dispersion 23' | Copolymer 19' | | | | |
| Pigment Dispersion 24' | Copolymer 20' | | | | |
| Pigment Dispersion 25' | Copolymer 21' | | | | |
| Pigment Dispersion 26' | Copolymer 22' | | | | |
| Pigment Dispersion 27' | Copolymer 23' | | | | |
| Pigment Dispersion 28' | Copolymer 24' | | | | |
| Pigment Dispersion 29' | Copolymer 25' | | | | |
| Pigment Dispersion 30' | Copolymer 26' | | | | |
| Pigment Dispersion 31' | Copolymer 27' | 50 | | | |
| Pigment Dispersion 32' | Copolymer 28' | | 50 | | |
| Pigment Dispersion 33' | Copolymer 29' | | | 50 | |
| Pigment Dispersion 34' | Copolymer 30' | | | | 50 |
| Pigment Dispersion 35' | Copolymer 31' | | | | |
| Pigment Dispersion 36' | Copolymer 32' | | | | |
| Pigment Dispersion 37' | Copolymer 33' | | | | |
| Pigment Dispersion 38' | Copolymer 34' | | | | |
| Pigment Dispersion 39' | Copolymer 35' | | | | |
| Pigment Dispersion 40' | Copolymer 36' | | | | |
| Copolymer 1' (Additive) | | | | | |
| Hydro-soluble solvent | Glycerin | 10 | 10 | 10 | 10 |
| | 1,3-butanediol | 20 | 20 | 20 | 20 |
| | Trimethylol Propane | | | | |
| | 2-pyrrolidone | | | | |
| Distilled Water | | Balance | Balance | Balance | Balance |
| Total | | 100 | 100 | 100 | 100 |

(10)

| | | Com. Example | | | |
|---|---|---|---|---|---|
| | | 1' | 2' | 3' | 4' |
| Pigment Dispersion 1' | Copolymer 1' | | | | |
| Pigment Dispersion 2' | [*] | | | | |
| Pigment Dispersion 3' | Copolymer 1' | | | | |
| Pigment Dispersion 4' | Copolymer 1' | | | | |
| Pigment Dispersion 5' | Copolymer 1' | | | | |
| Pigment Dispersion 6' | Copolymer 2' | | | | |
| Pigment Dispersion 7' | Copolymer 3' | | | | |
| Pigment Dispersion 8' | Copolymer 4' | | | | |
| Pigment Dispersion 9' | Copolymer 5' | | | | |
| Pigment Dispersion 10' | Copolymer 6' | | | | |
| Pigment Dispersion 11' | Copolymer 7' | | | | |
| Pigment Dispersion 12' | Copolymer 8' | | | | |
| Pigment Dispersion 13' | Copolymer 9' | | | | |
| Pigment Dispersion 14' | Copolymer 10' | | | | |
| Pigment Dispersion 15' | Copolymer 11' | | | | |
| Pigment Dispersion 16' | Copolymer 12' | | | | |
| Pigment Dispersion 17' | Copolymer 13' | | | | |
| Pigment Dispersion 18' | Copolymer 14' | | | | |
| Pigment Dispersion 19' | Copolymer 15' | | | | |
| Pigment Dispersion 20' | Copolymer 16' | | | | |
| Pigment Dispersion 21' | Copolymer 17' | | | | |
| Pigment Dispersion 22' | Copolymer 18' | | | | |
| Pigment Dispersion 23' | Copolymer 19' | | | | |
| Pigment Dispersion 24' | Copolymer 20' | | | | |
| Pigment Dispersion 25' | Copolymer 21' | | | | |
| Pigment Dispersion 26' | Copolymer 22' | | | | |
| Pigment Dispersion 27' | Copolymer 23' | | | | |
| Pigment Dispersion 28' | Copolymer 24' | | | | |
| Pigment Dispersion 29' | Copolymer 25' | | | | |
| Pigment Dispersion 30' | Copolymer 26' | | | | |

TABLE 11-continued

| | | | | | |
|---|---|---|---|---|---|
| Pigment Dispersion 31' | Copolymer 27' | | | | |
| Pigment Dispersion 32' | Copolymer 28' | | | | |
| Pigment Dispersion 33' | Copolymer 29' | | | | |
| Pigment Dispersion 34' | Copolymer 30' | | | | |
| Pigment Dispersion 35' | Copolymer 31' | 50 | | | |
| Pigment Dispersion 36' | Copolymer 32' | | 50 | | |
| Pigment Dispersion 37' | Copolymer 33' | | | 50 | |
| Pigment Dispersion 38' | Copolymer 34' | | | | 50 |
| Pigment Dispersion 39' | Copolymer 35' | | | | |
| Pigment Dispersion 40' | Copolymer 36' | | | | |
| Copolymer 1' (Additive) | | | | | |
| Hydro-soluble solvent | Glycerin | 10 | 10 | 10 | 10 |
| | 1,3-butanediol | 20 | 20 | 20 | 20 |
| | Trimethylol Propane | | | | |
| | 2-pyrrolidone | | | | |
| Distilled Water | | Balance | Balance | Balance | Balance |
| Total | | 100 | 100 | 100 | 100 |

(11)

| | | Com. Example | |
|---|---|---|---|
| | | 5' | 6' |
| Pigment Dispersion 1' | Copolymer 1' | | |
| Pigment Dispersion 2' | [*] | | |
| Pigment Dispersion 3' | Copolymer 1' | | |
| Pigment Dispersion 4' | Copolymer 1' | | |
| Pigment Dispersion 5' | Copolymer 1' | | |
| Pigment Dispersion 6' | Copolymer 2' | | |
| Pigment Dispersion 7' | Copolymer 3' | | |
| Pigment Dispersion 8' | Copolymer 4' | | |
| Pigment Dispersion 9' | Copolymer 5' | | |
| Pigment Dispersion 10' | Copolymer 6' | | |
| Pigment Dispersion 11' | Copolymer 7' | | |
| Pigment Dispersion 12' | Copolymer 8' | | |
| Pigment Dispersion 13' | Copolymer 9' | | |
| Pigment Dispersion 14' | Copolymer 10' | | |
| Pigment Dispersion 15' | Copolymer 11' | | |
| Pigment Dispersion 16' | Copolymer 12' | | |
| Pigment Dispersion 17' | Copolymer 13' | | |
| Pigment Dispersion 18' | Copolymer 14' | | |
| Pigment Dispersion 19' | Copolymer 15' | | |
| Pigment Dispersion 20' | Copolymer 16' | | |
| Pigment Dispersion 21' | Copolymer 17' | | |
| Pigment Dispersion 22' | Copolymer 18' | | |
| Pigment Dispersion 23' | Copolymer 19' | | |
| Pigment Dispersion 24' | Copolymer 20' | | |
| Pigment Dispersion 25' | Copolymer 21' | | |
| Pigment Dispersion 26' | Copolymer 22' | | |
| Pigment Dispersion 27' | Copolymer 23' | | |
| Pigment Dispersion 28' | Copolymer 24' | | |
| Pigment Dispersion 29' | Copolymer 25' | | |
| Pigment Dispersion 30' | Copolymer 26' | | |
| Pigment Dispersion 31' | Copolymer 27' | | |
| Pigment Dispersion 32' | Copolymer 28' | | |
| Pigment Dispersion 33' | Copolymer 29' | | |
| Pigment Dispersion 34' | Copolymer 30' | | |
| Pigment Dispersion 35' | Copolymer 31' | | |
| Pigment Dispersion 36' | Copolymer 32' | | |
| Pigment Dispersion 37' | Copolymer 33' | | |
| Pigment Dispersion 38' | Copolymer 34' | | |
| Pigment Dispersion 39' | Copolymer 35' | 50 | |
| Pigment Dispersion 40' | Copolymer 36' | | 50 |
| Copolymer 1' (Additive) | | | |
| Hydro-soluble solvent | Glycerin | 10 | 10 |
| | 1,3-butanediol | 20 | 20 |
| | Trimethylol Propane | | |
| | 2-pyrrolidone | | |
| Distilled Water | | Balance | Balance |
| Total | | 100 | 100 |

Properties of the pigment dispersions 1' to 40' and the inks of Examples 1' to 36' and Comparative Examples 1' to 6'° were measured and evaluated as they were in Table 4. The results are shown in Table 12.

TABLE 12

(1)

| | Pigment | Evaluation Result | | | |
|---|---|---|---|---|---|
| | Dis- | Image Density | | Strike-Through Density | |
| | persion | OD Value | Rank | OD Value | Rank |
| Example 1' | 1' | 1.38 | Excellent | 0.06 | Excellent |
| Example 2' | 1' | 1.36 | Excellent | 0.07 | Excellent |
| Example 3' | 1' | 1.36 | Excellent | 0.07 | Excellent |
| Example 4' | 2' | 1.29 | Good | 0.08 | Excellent |
| Example 5' | 3' | 1.06 | Excellent | 0.08 | Excellent |
| Example 6' | 4' | 0.99 | Excellent | 0.07 | Excellent |
| Example 7' | 5' | 0.85 | Excellent | 0.06 | Excellent |
| Example 8' | 6' | 1.37 | Excellent | 0.06 | Excellent |
| Example 9' | 7' | 1.31 | Excellent | 0.10 | Good |
| Example 10' | 8' | 1.34 | Excellent | 0.06 | Excellent |
| Example 11' | 9' | 1.38 | Excellent | 0.07 | Excellent |
| Example 12' | 10' | 1.37 | Excellent | 0.08 | Excellent |
| Example 13' | 11' | 1.36 | Excellent | 0.07 | Excellent |
| Example 14' | 12' | 1.38 | Excellent | 0.07 | Excellent |
| Example 15' | 13' | 1.38 | Excellent | 0.07 | Excellent |
| Example 16' | 14' | 1.36 | Excellent | 0.06 | Excellent |
| Example 17' | 15' | 1.37 | Excellent | 0.07 | Excellent |
| Example 18' | 16' | 1.28 | Good | 0.09 | Excellent |
| Example 19' | 17' | 1.23 | Good | 0.10 | Good |
| Example 20' | 18' | 1.34 | Excellent | 0.08 | Excellent |
| Example 21' | 19' | 1.38 | Excellent | 0.09 | Excellent |
| Example 22' | 20' | 1.38 | Excellent | 0.07 | Excellent |
| Example 23' | 21' | 1.39 | Excellent | 0.07 | Excellent |
| Example 24' | 22' | 1.40 | Excellent | 0.06 | Excellent |
| Example 25' | 23' | 1.38 | Excellent | 0.06 | Excellent |
| Example 26' | 24' | 1.38 | Excellent | 0.06 | Excellent |
| Example 27' | 25' | 1.29 | Good | 0.08 | Excellent |
| Example 28' | 26' | 1.26 | Good | 0.10 | Good |
| Example 29' | 27' | 1.32 | Excellent | 0.08 | Excellent |
| Example 30' | 28' | 1.23 | Good | 0.11 | Good |
| Example 31' | 29' | 1.30 | Good | 0.08 | Excellent |
| Example 32' | 30' | 1.38 | Excellent | 0.07 | Excellent |
| Example 33' | 31' | 1.36 | Excellent | 0.08 | Excellent |
| Example 34' | 32' | 1.29 | Good | 0.07 | Excellent |
| Example 35' | 33' | 1.32 | Excellent | 0.10 | Good |
| Example 36' | 34' | 1.28 | Good | 0.08 | Excellent |
| Comparative Example 1' | 35' | 1.01 | Poor | 0.45 | Fair |
| Comparative Example 2' | 36' | 1.02 | | 0.50 | Poor |
| Comparative Example 3' | 37' | 0.90 | Poor | 0.60 | Poor |
| Comparative Example 4' | 38' | 0.80 | Poor | 0.60 | Poor |
| Comparative Example 5' | 39' | 0.90 | Poor | 0.70 | Poor |
| Comparative Example 6' | 40' | 0.80 | Poor | 0.70 | Poor |

(2)

| | Pigment | Evaluation Result | | | |
|---|---|---|---|---|---|
| | | Pigment Dispersion | | Ink | |
| | Dis-persion | Initial Viscosity | Storage Stability | Initial Viscosity | Storage Stability |
| Example 1' | 1' | Excellent | Excellent | Excellent | Excellent |
| Example 2' | 1' | Excellent | Excellent | Excellent | Good |
| Example 3' | 1' | Excellent | Excellent | Excellent | Excellent |
| Example 4' | 2' | Excellent | Excellent | Excellent | Excellent |
| Example 5' | 3' | Excellent | Excellent | Excellent | Excellent |
| Example 6' | 4' | Excellent | Excellent | Excellent | Excellent |
| Example 7' | 5' | Excellent | Excellent | Excellent | Excellent |
| Example 8' | 6' | Excellent | Excellent | Excellent | Excellent |

TABLE 12-continued

| | | | | | |
|---|---|---|---|---|---|
| Example 9' | 7' | Excellent | Excellent | Excellent | Excellent |
| Example 10' | 8' | Excellent | Good | Excellent | Excellent |
| Example 11' | 9' | Excellent | Excellent | Excellent | Good |
| Example 12' | 10' | Excellent | Excellent | Excellent | Good |
| Example 13' | 11' | Excellent | Excellent | Excellent | Good |
| Example 14' | 12' | Excellent | Excellent | Excellent | Good |
| Example 15' | 13' | Excellent | Excellent | Excellent | Good |
| Example 16' | 14' | Excellent | Excellent | Good | Excellent |
| Example 17' | 15' | Excellent | Excellent | Good | Excellent |
| Example 18' | 16' | Excellent | Good | Excellent | Good |
| Example 19' | 17' | Excellent | Good | Excellent | Good |
| Example 20' | 18' | Excellent | Excellent | Excellent | Excellent |
| Example 21' | 19' | Excellent | Good | Good | Good |
| Example 22' | 20' | Good | Good | Good | Good |
| Example 23' | 21' | Excellent | Excellent | Excellent | Excellent |
| Example 24' | 22' | Good | Excellent | Good | Good |
| Example 25' | 23' | Good | Good | Good | Good |
| Example 26' | 24' | Excellent | Excellent | Excellent | Excellent |
| Example 27' | 25' | Good | Excellent | Good | Excellent |
| Example 28' | 26' | Good | Excellent | Good | Excellent |
| Example 29' | 27' | Excellent | Excellent | Excellent | Excellent |
| Example 30' | 28' | Excellent | Good | Good | Good |
| Example 31' | 29' | Good | Good | Good | Good |
| Example 32' | 30' | Excellent | Excellent | Excellent | Excellent |
| Example 33' | 31' | Excellent | Excellent | Excellent | Good |
| Example 34' | 32' | Excellent | Excellent | Excellent | Excellent |
| Example 35' | 33' | Excellent | Excellent | Excellent | Excellent |
| Example 36' | 34' | Excellent | Excellent | Excellent | Good |
| Comparative Example 1' | 35' | Poor | Fair | Poor | Fair |
| Comparative Example 2' | 36' | Poor | Fair | Poor | Fair |
| Comparative Example 3' | 37' | Poor | Fair | Poor | Poor |
| Comparative Example 4' | 38' | Poor | Fair | Poor | Poor |
| Comparative Example 5' | 39' | Poor | Fair | Poor | Poor |
| Comparative Example 6' | 40' | Poor | Fair | Poor | Poor |

Synthesis of Copolymer

Synthesis Example 1"

A flask equipped with a stirrer, a thermometer and a nitrogen gas introduction pipe was charged with 500.0 parts of a solvent (ethanol), 30.0 parts of 1-methacryloxyethane-1,1-diphosphonic acid (MEDP) [monomer having the formula (I)], 10.0 parts of MPEGMA 9 [monomer having the formula (4-2)], 60.0 parts of 1-vinylnaphthalene [monomer having the formula (16)] and 4.0 parts of a polymerization initiator (azobisisobutylonitrile), and the mixture was heated to have a temperature of 65° C. Next, after the mixture was polymerized for 10 hrs under a nitrogen stream, about a half of the solvent in the reactant was removed. The reactant was injected in acetone to extract a copolymer, and the copolymer is further dried to prepare a copolymer. Potassium hydroxide was added to the copolymer while diluted to include a solid content in an amount of 10% with water such that the phosphonic acid group were neutralized by 100% to prepare a copolymer 1".

The copolymer 1" had a weight-average molecular weight of 5,000.

Synthesis Examples 2" to 23"

The procedure for preparation of the copolymer 1" in Synthesis Example 1" was repeated except for replacing MEDP, MPEGMA 9 or 1-vinylnaphthalene with monomers having the structure 1, 2 or 3 shown in Table 13 and the contents thereof with those shown therein to prepare copolymers 2" to 23".

Weight-average molecular weights of these copolymers are shown in Table 13.

Synthesis Examples 24" and 25"

The procedure for preparation of the copolymer 1" in Synthesis Example 1" was repeated except for replacing MEDP with methacrylate (Synthesis Example 24") or acrylate (Synthesis Example 25") to prepare a copolymers 24" and 25".

The copolymers 24" and 25" had weight-average molecular weights of 10000 and 2000 respectively.

Synthesis Examples 26" to 28"

The procedure for preparation of the copolymer 1" in Synthesis Example 1' was repeated except for using only MEDP (Synthesis Example 26"), only MPEGMA9 (Synthesis Example 27") or only 1-vinylnaphthalene (Synthesis Example 28") as a monomer without neutralization to prepare a copolymers 26" to 28".

The copolymers 26" to 28" had weight-average molecular weights of 5000 respectively.

Properties of the copolymers 1" to 28" are shown in Table 13. The structure 1 includes monomers having the structural units represented by the formula (1), the structure 2 includes monomers having the structural units represented by the formula (2) and the structure 3 includes monomers having the structural units represented by the formulae (8) and (9). The monomers in the copolymer 24" and 25" do not have the structural units represented by the formula (1).

Abbreviations in Table 13 represent the following compounds. Those already described are omitted.

1-ViN: 1-vinylnaphthalene
2-ViN: 2-vinylnaphthalene

TABLE 13

| | (1) | | |
|---|---|---|---|
| | Structure 1 | Structure 2 | Structure 3 |
| Copolymer 1" | MEDP | MPEGMA9 | 1-ViN |
| Copolymer 2" | AEDP | MPEGMA9 | 1-ViN |
| Copolymer 3" | MEDP | MPEGA | 1-ViN |
| Copolymer 4" | MEDP | EDEGA | 1-ViN |
| Copolymer 5" | MEDP | BDEGMA | 1-ViN |
| Copolymer 6" | MEDP | MTEGA | 1-ViN |
| Copolymer 7" | MEDP | MPEGMA30 | 1-ViN |
| Copolymer 8" | MEDP | MDPGMA | 1-ViN |
| Copolymer 9" | MEDP | MPEGMA9 | 2-ViN |
| Copolymer 10" | MEDP | MPEGMA9 | 1-ViN |
| Copolymer 11" | MEDP | MPEGMA9 | 1-ViN |
| Copolymer 12" | MEDP | MPEGMA9 | 1-ViN |
| Copolymer 13" | MEDP | MPEGMA9 | 1-ViN |
| Copolymer 14" | MEDP | MPEGMA9 | 1-ViN |
| Copolymer 15" | MEDP | MPEGMA9 | 1-ViN |
| Copolymer 16" | MEDP | MPEGMA9 | 1-ViN |
| Copolymer 17" | MEDP | MPEGMA9 | 1-ViN |
| Copolymer 18" | MEDP | MPEGMA9 | 1-ViN |
| Copolymer 19" | MEDP | MPEGMA9 | 1-ViN |
| Copolymer 20" | MEDP | MPEGMA9 | 1-ViN |
| Copolymer 21" | MEDP | MPEGMA9 | 1-ViN |
| Copolymer 22" | MEDP | MPEGMA9 | 1-ViN |
| Copolymer 23" | MEDP | MPEGMA9 | 1-ViN |
| Copolymer 24" | Methacrylate | MPEGMA9 | 1-ViN |
| Copolymer 25" | Acrylate | MPEGMA9 | 1-ViN |
| Copolymer 26" | MEDP | — | — |
| Copolymer 27" | — | MPEGMA9 | — |
| Copolymer 28" | — | — | 1-ViN |

TABLE 13-continued

(2)

|  | Structure 1 [% by Weight] | Structure 2 [% by Weight] | Structure 3 [% by Weight] | Weight-Average Molecular Weight |
|---|---|---|---|---|
| Copolymer 1" | 30.0 | 10.0 | 60.0 | 5000 |
| Copolymer 2" | 30.0 | 10.0 | 60.0 | 5000 |
| Copolymer 3" | 30.0 | 10.0 | 60.0 | 5000 |
| Copolymer 4" | 30.0 | 10.0 | 60.0 | 5000 |
| Copolymer 5" | 30.0 | 10.0 | 60.0 | 5000 |
| Copolymer 6" | 30.0 | 10.0 | 60.0 | 5000 |
| Copolymer 7" | 30.0 | 10.0 | 60.0 | 5000 |
| Copolymer 8" | 30.0 | 10.0 | 60.0 | 5000 |
| Copolymer 9" | 30.0 | 10.0 | 60.0 | 5000 |
| Copolymer 10" | 15.0 | 35.0 | 50.0 | 1500 |
| Copolymer 11" | 5.0 | 35.0 | 60.0 | 3000 |
| Copolymer 12" | 15.0 | 35.0 | 50.0 | 3000 |
| Copolymer 13" | 55.0 | 35.0 | 10.0 | 1500 |
| Copolymer 14" | 65.0 | 20.0 | 15.0 | 3000 |
| Copolymer 15" | 55.0 | 35.0 | 10.0 | 3000 |
| Copolymer 16" | 55.0 | 35.0 | 10.0 | 6000 |
| Copolymer 17" | 65.0 | 20.0 | 15.0 | 4500 |
| Copolymer 18" | 55.0 | 35.0 | 10.0 | 4500 |
| Copolymer 19" | 15.0 | 35.0 | 50.0 | 6000 |
| Copolymer 20" | 5.0 | 35.0 | 60.0 | 4500 |
| Copolymer 21" | 15.0 | 35.0 | 50.0 | 4500 |
| Copolymer 22" | 5.0 | 35.0 | 60.0 | 1500 |
| Copolymer 23" | 65.0 | 20.0 | 15.0 | 60000 |
| Copolymer 24" | 30.0 | 10.0 | 60.0 | 10000 |
| Copolymer 25" | 30.0 | 10.0 | 60.0 | 2000 |
| Copolymer 26" | 100.0 | — | — | 5000 |
| Copolymer 27" | — | 100.0 | — | 5000 |
| Copolymer 28" | — | — | 100.0 | 5000 |

Pigment Dispersion Preparation Examples 1" to 32"

Each of the pigment dispersions was prepared as follows.

Preparation Example 1"

Pigment Dispersion 1"

The following materials were premixed to prepare a mixed slurry. This was subjected to a circulation dispersion by a disc type media mill (DMR from Ashizawa Finetech Ltd.) with 0.05 mm zirconia beads at a filling rate of 55%, a peripheral speed of 10 m/s, a liquid temperature of 10° C. for 3 min. Then, the resultant dispersion was subjected to centrifugal separation by a centrifugal separator Model 7700 from KUBOTA Corporation to separate coarse particles to prepare a pigment dispersion 1' having a pigment concentration of 16% by weight.

| | |
|---|---|
| Carbon black (NIPEX160 from Degussa AG having a BET specific surface area of 150 m²/g, an average primary particle diameter of 20 nm a pH of 4.0 and a DBP oil absorption of 620 g/100 g | 160 |
| Copolymer 1" | 40 |
| Distilled water | 800 |

Preparation Example 2"

Pigment Dispersion 2"

The procedure for preparation of the pigment dispersion 1" in Preparation Example 1" was repeated except for replacing the copolymer 1 with an aqueous solution including polyoxyethylene (POE) (m=40)-β-naphthyl ether from Takemoto Oil & Fat Co., Ltd. in an amount of 10% by weight to a pigment dispersion 2" having a pigment concentration of 16% by weight.

Preparation Examples 3" to 32"

Pigment Dispersions 3" to 32"

The procedure for preparation of the pigment dispersion 1" in Preparation Example 1" was repeated except for changing the copolymer, the parts thereof, the pigment or the parts of distilled water such that the total is 1000 parts as shown in Table 14 to prepare pigment dispersions 3" to 32" each having a pigment concentration of 16% by weight.

The compositions of the pigment dispersions 1" to 32" are shown in Table 14. [*] represents an aqueous solution including polyoxyethylene (POE) (m=40)-β-naphthyl ether in an amount of 10% by weight

TABLE 14

(1)

| | Pigment Dispersion | | | | |
|---|---|---|---|---|---|
| | 1" | 2" | 3" | 4" | 5" |
| Copolymer 1" | 40 | | 40 | 40 | 40 |
| Copolymer 2" | | | | | |
| Copolymer 3" | | | | | |
| Copolymer 4" | | | | | |
| Copolymer 5" | | | | | |
| Copolymer 6" | | | | | |
| Copolymer 7" | | | | | |
| Copolymer 8" | | | | | |
| Copolymer 9" | | | | | |
| Copolymer 10" | | | | | |
| Copolymer 11" | | | | | |
| Copolymer 12" | | | | | |
| Copolymer 13" | | | | | |
| Copolymer 14" | | | | | |
| Copolymer 15" | | | | | |
| Copolymer 16" | | | | | |
| Copolymer 17" | | | | | |
| Copolymer 18" | | | | | |
| Copolymer 19" | | | | | |
| Copolymer 20" | | | | | |
| Copolymer 21" | | | | | |
| Copolymer 22" | | | | | |
| Copolymer 23" | | | | | |
| Copolymer 24" | | | | | |
| Copolymer 25" | | | | | |
| Copolymer 26" | | | | | |
| Copolymer 27" | | | | | |
| Copolymer 28" | | | | | |
| [*] | | 40 | | | |
| Carbon Black | 160 | 160 | | | |
| Pigment Blue 15:3 | | | 160 | | |
| Pigment Red 122 | | | | 160 | |
| Pigment Yellow 74 | | | | | 160 |
| Distilled Water | Balance | Balance | Balance | Balance | Balance |
| Total | 1000 | 1000 | 1000 | 1000 | 1000 |

(2)

| | Pigment Dispersion | | | | |
|---|---|---|---|---|---|
| | 6" | 7" | 8" | 9" | 10" |
| Copolymer 1" | | | | | |
| Copolymer 2" | 40 | | | | |
| Copolymer 3" | | 40 | | | |
| Copolymer 4" | | | 40 | | |

TABLE 14-continued

(2) continued

| | | | | | |
|---|---|---|---|---|---|
| Copolymer 5" | | | | 40 | |
| Copolymer 6" | | | | | 40 |
| Copolymer 7" | | | | | |
| Copolymer 8" | | | | | |
| Copolymer 9" | | | | | |
| Copolymer 10" | | | | | |
| Copolymer 11" | | | | | |
| Copolymer 12" | | | | | |
| Copolymer 13" | | | | | |
| Copolymer 14" | | | | | |
| Copolymer 15" | | | | | |
| Copolymer 16" | | | | | |
| Copolymer 17" | | | | | |
| Copolymer 18" | | | | | |
| Copolymer 19" | | | | | |
| Copolymer 20" | | | | | |
| Copolymer 21" | | | | | |
| Copolymer 22" | | | | | |
| Copolymer 23" | | | | | |
| Copolymer 24" | | | | | |
| Copolymer 25" | | | | | |
| Copolymer 26" | | | | | |
| Copolymer 27" | | | | | |
| Copolymer 28" | | | | | |
| [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

(3)

Pigment Dispersion

| | 11" | 12" | 13" | 14" | 15" |
|---|---|---|---|---|---|
| Copolymer 1" | | | | | |
| Copolymer 2" | | | | | |
| Copolymer 3" | | | | | |
| Copolymer 4" | | | | | |
| Copolymer 5" | | | | | |
| Copolymer 6" | | | | | |
| Copolymer 7" | 40 | | | | |
| Copolymer 8" | | 40 | | | |
| Copolymer 9" | | | 40 | | |
| Copolymer 10" | | | | 40 | |
| Copolymer 11" | | | | | 40 |
| Copolymer 12" | | | | | |
| Copolymer 13" | | | | | |
| Copolymer 14" | | | | | |
| Copolymer 15" | | | | | |
| Copolymer 16" | | | | | |
| Copolymer 17" | | | | | |
| Copolymer 18" | | | | | |
| Copolymer 19" | | | | | |
| Copolymer 20" | | | | | |
| Copolymer 21" | | | | | |
| Copolymer 22" | | | | | |
| Copolymer 23" | | | | | |
| Copolymer 24" | | | | | |
| Copolymer 25" | | | | | |
| Copolymer 26" | | | | | |
| Copolymer 27" | | | | | |
| Copolymer 28" | | | | | |
| [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

(4)

Pigment Dispersion

| | 16" | 17" | 18" | 19" | 20" |
|---|---|---|---|---|---|
| Copolymer 1" | | | | | |
| Copolymer 2" | | | | | |
| Copolymer 3" | | | | | |
| Copolymer 4" | | | | | |
| Copolymer 5" | | | | | |
| Copolymer 6" | | | | | |
| Copolymer 7" | | | | | |
| Copolymer 8" | | | | | |
| Copolymer 9" | | | | | |
| Copolymer 10" | | | | | |
| Copolymer 11" | | | | | |
| Copolymer 12" | 40 | | | | |
| Copolymer 13" | | 40 | | | |
| Copolymer 14" | | | 40 | | |
| Copolymer 15" | | | | 40 | |
| Copolymer 16" | | | | | 40 |
| Copolymer 17" | | | | | |
| Copolymer 18" | | | | | |
| Copolymer 19" | | | | | |
| Copolymer 20" | | | | | |
| Copolymer 21" | | | | | |
| Copolymer 22" | | | | | |
| Copolymer 23" | | | | | |
| Copolymer 24" | | | | | |
| Copolymer 25" | | | | | |
| Copolymer 26" | | | | | |
| Copolymer 27" | | | | | |
| Copolymer 28" | | | | | |
| [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

(5)

Pigment Dispersion

| | 21" | 22" | 23" | 24" | 25" |
|---|---|---|---|---|---|
| Copolymer 1" | | | | | |
| Copolymer 2" | | | | | |
| Copolymer 3" | | | | | |
| Copolymer 4" | | | | | |
| Copolymer 5" | | | | | |
| Copolymer 6" | | | | | |
| Copolymer 7" | | | | | |
| Copolymer 8" | | | | | |
| Copolymer 9" | | | | | |
| Copolymer 10" | | | | | |
| Copolymer 11" | | | | | |
| Copolymer 12" | | | | | |
| Copolymer 13" | | | | | |
| Copolymer 14" | | | | | |
| Copolymer 15" | | | | | |
| Copolymer 16" | | | | | |
| Copolymer 17" | 40 | | | | |
| Copolymer 18" | | 40 | | | |
| Copolymer 19" | | | 40 | | |
| Copolymer 20" | | | | 40 | |

TABLE 14-continued

| | | | | | |
|---|---|---|---|---|---|
| Copolymer 21" | | | | | 40 |
| Copolymer 22" | | | | | |
| Copolymer 23" | | | | | |
| Copolymer 24" | | | | | |
| Copolymer 25" | | | | | |
| Copolymer 26" | | | | | |
| Copolymer 27" | | | | | |
| Copolymer 28" | | | | | |
| [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

(6)

| | Pigment Dispersion | | | | |
|---|---|---|---|---|---|
| | 26" | 27" | 28" | 29" | 30" |
| Copolymer 1" | | | | | |
| Copolymer 2" | | | | | |
| Copolymer 3" | | | | | |
| Copolymer 4" | | | | | |
| Copolymer 5" | | | | | |
| Copolymer 6" | | | | | |
| Copolymer 7" | | | | | |
| Copolymer 8" | | | | | |
| Copolymer 9" | | | | | |
| Copolymer 10" | | | | | |
| Copolymer 11" | | | | | |
| Copolymer 12" | | | | | |
| Copolymer 13" | | | | | |
| Copolymer 14" | | | | | |
| Copolymer 15" | | | | | |
| Copolymer 16" | | | | | |
| Copolymer 17" | | | | | |
| Copolymer 18" | | | | | |
| Copolymer 19" | | | | | |
| Copolymer 20" | | | | | |
| Copolymer 21" | | | | | |
| Copolymer 22" | 40 | | | | |
| Copolymer 23" | | 40 | | | |
| Copolymer 24" | | | 40 | | |
| Copolymer 25" | | | | 40 | |
| Copolymer 26" | | | | | 40 |
| Copolymer 27" | | | | | |
| Copolymer 28" | | | | | |
| [*] | | | | | |
| Carbon Black | 160 | 160 | 160 | 160 | 160 |
| Pigment Blue 15:3 | | | | | |
| Pigment Red 122 | | | | | |
| Pigment Yellow 74 | | | | | |
| Distilled Water | Balance | Balance | Balance | Balance | Balance |
| Total | 1000 | 1000 | 1000 | 1000 | 1000 |

(7)

| | Pigment Dispersion | |
|---|---|---|
| | 26" | 27" |
| Copolymer 1" | | |
| Copolymer 2" | | |
| Copolymer 3" | | |
| Copolymer 4" | | |
| Copolymer 5" | | |
| Copolymer 6" | | |
| Copolymer 7" | | |
| Copolymer 8" | | |
| Copolymer 9" | | |
| Copolymer 10" | | |
| Copolymer 11" | | |
| Copolymer 12" | | |
| Copolymer 13" | | |
| Copolymer 14" | | |
| Copolymer 15" | | |
| Copolymer 16" | | |
| Copolymer 17" | | |
| Copolymer 18" | | |
| Copolymer 19" | | |
| Copolymer 20" | | |
| Copolymer 21" | | |
| Copolymer 22" | | |
| Copolymer 23" | | |
| Copolymer 24" | | |
| Copolymer 25" | | |
| Copolymer 26" | | |
| Copolymer 27" | 40 | |
| Copolymer 28" | | 40 |
| [*] | | |
| Carbon Black | 160 | 160 |
| Pigment Blue 15:3 | | |
| Pigment Red 122 | | |
| Pigment Yellow 74 | | |
| Distilled Water | Balance | Balance |
| Total | 1000 | 1000 |

Preparation of Ink for Inkjet Recording

Example 1"

The following materials were mixed and stirred for 1 hr. The resultant dispersion was subjected to pressure filtration by a polyvinylidenefluoride membrane filter having an average pore diameter of 5.0 µm to remove coarse particles and dusts. Thus, an ink was prepared.

| | |
|---|---|
| Pigment dispersion 1" (pigment concentration 16%) | 50 |
| Glycerin | 10 |
| 1,3-butanediol | 20 |
| Distilled water | 20 |

Examples 2" to 29" and Comparative Examples 1" to 5"

The procedure for preparation of the ink in Example 1" was repeated except for using materials shown in Table 15 to prepare inks of Examples 2" to 29" and Comparative Examples 1" to 5". [*] represents an aqueous solution including polyoxyethylene (POE) (m=40)-β-naphthyl ether in an amount of 10% by weight

TABLE 15

(1)

|  |  | Example | | | |
|---|---|---|---|---|---|
|  |  | 1" | 2" | 3" | 4" |
| Pigment Dispersion 1" | Copolymer 1" | 50 | 50 | 50 |  |
| Pigment Dispersion 2" | [*] |  |  |  | 50 |
| Pigment Dispersion 3" | Copolymer 1" |  |  |  |  |
| Pigment Dispersion 4" | Copolymer 1" |  |  |  |  |
| Pigment Dispersion 5" | Copolymer 1' |  |  |  |  |
| Pigment Dispersion 6" | Copolymer 2" |  |  |  |  |
| Pigment Dispersion 7" | Copolymer 3" |  |  |  |  |
| Pigment Dispersion 8" | Copolymer 4" |  |  |  |  |
| Pigment Dispersion 9" | Copolymer 5" |  |  |  |  |
| Pigment Dispersion 10" | Copolymer 6" |  |  |  |  |
| Pigment Dispersion 11" | Copolymer 7" |  |  |  |  |
| Pigment Dispersion 12" | Copolymer 8" |  |  |  |  |
| Pigment Dispersion 13" | Copolymer 9" |  |  |  |  |
| Pigment Dispersion 14" | Copolymer 10" |  |  |  |  |
| Pigment Dispersion 15" | Copolymer 11" |  |  |  |  |
| Pigment Dispersion 16" | Copolymer 12" |  |  |  |  |
| Pigment Dispersion 17" | Copolymer 13" |  |  |  |  |
| Pigment Dispersion 18" | Copolymer 14" |  |  |  |  |
| Pigment Dispersion 19" | Copolymer 15" |  |  |  |  |
| Pigment Dispersion 20" | Copolymer 16" |  |  |  |  |
| Pigment Dispersion 21" | Copolymer 17" |  |  |  |  |
| Pigment Dispersion 22" | Copolymer 18" |  |  |  |  |
| Pigment Dispersion 23" | Copolymer 19" |  |  |  |  |
| Pigment Dispersion 24" | Copolymer 20" |  |  |  |  |
| Pigment Dispersion 25" | Copolymer 21" |  |  |  |  |
| Pigment Dispersion 26" | Copolymer 22" |  |  |  |  |
| Pigment Dispersion 27" | Copolymer 23" |  |  |  |  |
| Pigment Dispersion 28" | Copolymer 24" |  |  |  |  |
| Pigment Dispersion 29" | Copolymer 25" |  |  |  |  |
| Pigment Dispersion 30" | Copolymer 26" |  |  |  |  |
| Pigment Dispersion 31" | Copolymer 27" |  |  |  |  |
| Pigment Dispersion 32" | Copolymer 28" |  |  |  |  |
| Hydro-soluble solvent | Glycerin | 10 |  | 20 | 10 |
|  | 1,3-butanediol | 20 | 30 |  | 20 |
|  | Trimethylol Propane |  |  | 5 |  |
|  | 2-pyrrolidone |  |  | 5 |  |
|  | Distilled Water | Balance | Balance | Balance | Balance |
|  | Total | 100 | 100 | 100 | 100 |

(2)

|  |  | Example | | | |
|---|---|---|---|---|---|
|  |  | 5" | 6" | 7" | 8" |
| Pigment Dispersion 1" | Copolymer 1" |  |  |  |  |
| Pigment Dispersion 2" | [*] |  |  |  |  |
| Pigment Dispersion 3" | Copolymer 1" | 30 |  |  |  |
| Pigment Dispersion 4" | Copolymer 1" |  | 50 |  |  |
| Pigment Dispersion 5" | Copolymer 1' |  |  | 30 |  |
| Pigment Dispersion 6" | Copolymer 2" |  |  |  | 50 |
| Pigment Dispersion 7" | Copolymer 3" |  |  |  |  |
| Pigment Dispersion 8" | Copolymer 4" |  |  |  |  |
| Pigment Dispersion 9" | Copolymer 5" |  |  |  |  |
| Pigment Dispersion 10" | Copolymer 6" |  |  |  |  |
| Pigment Dispersion 11" | Copolymer 7" |  |  |  |  |
| Pigment Dispersion 12" | Copolymer 8" |  |  |  |  |
| Pigment Dispersion 13" | Copolymer 9" |  |  |  |  |
| Pigment Dispersion 14" | Copolymer 10" |  |  |  |  |
| Pigment Dispersion 15" | Copolymer 11" |  |  |  |  |
| Pigment Dispersion 16" | Copolymer 12" |  |  |  |  |
| Pigment Dispersion 17" | Copolymer 13" |  |  |  |  |
| Pigment Dispersion 18" | Copolymer 14" |  |  |  |  |
| Pigment Dispersion 19" | Copolymer 15" |  |  |  |  |
| Pigment Dispersion 20" | Copolymer 16" |  |  |  |  |
| Pigment Dispersion 21" | Copolymer 17" |  |  |  |  |
| Pigment Dispersion 22" | Copolymer 18" |  |  |  |  |
| Pigment Dispersion 23" | Copolymer 19" |  |  |  |  |
| Pigment Dispersion 24" | Copolymer 20" |  |  |  |  |
| Pigment Dispersion 25" | Copolymer 21" |  |  |  |  |
| Pigment Dispersion 26" | Copolymer 22" |  |  |  |  |
| Pigment Dispersion 27" | Copolymer 23" |  |  |  |  |
| Pigment Dispersion 28" | Copolymer 24" |  |  |  |  |

TABLE 15-continued

| | | | | | |
|---|---|---|---|---|---|
| Pigment Dispersion 29" | Copolymer 25" | | | | |
| Pigment Dispersion 30" | Copolymer 26" | | | | |
| Pigment Dispersion 31" | Copolymer 27" | | | | |
| Pigment Dispersion 32" | Copolymer 28" | | | | |
| Hydro-soluble solvent | Glycerin | 10 | 10 | 10 | 10 |
| | 1,3-butanediol | 20 | 20 | 20 | 20 |
| | Trimethylol Propane | | | | |
| | 2-pyrrolidone | | | | |
| | Distilled Water | Balance | Balance | Balance | Balance |
| | Total | 100 | 100 | 100 | 100 |

(3)

| | | Example | | | |
|---|---|---|---|---|---|
| | | 9" | 10" | 11" | 12" |
| Pigment Dispersion 1" | Copolymer 1" | | | | |
| Pigment Dispersion 2" | [*] | | | | |
| Pigment Dispersion 3" | Copolymer 1" | | | | |
| Pigment Dispersion 4" | Copolymer 1" | | | | |
| Pigment Dispersion 5" | Copolymer 1' | | | | |
| Pigment Dispersion 6" | Copolymer 2" | | | | |
| Pigment Dispersion 7" | Copolymer 3" | 50 | | | |
| Pigment Dispersion 8" | Copolymer 4" | | 50 | | |
| Pigment Dispersion 9" | Copolymer 5" | | | 50 | |
| Pigment Dispersion 10" | Copolymer 6" | | | | 50 |
| Pigment Dispersion 11" | Copolymer 7" | | | | |
| Pigment Dispersion 12" | Copolymer 8" | | | | |
| Pigment Dispersion 13" | Copolymer 9" | | | | |
| Pigment Dispersion 14" | Copolymer 10" | | | | |
| Pigment Dispersion 15" | Copolymer 11" | | | | |
| Pigment Dispersion 16" | Copolymer 12" | | | | |
| Pigment Dispersion 17" | Copolymer 13" | | | | |
| Pigment Dispersion 18" | Copolymer 14" | | | | |
| Pigment Dispersion 19" | Copolymer 15" | | | | |
| Pigment Dispersion 20" | Copolymer 16" | | | | |
| Pigment Dispersion 21" | Copolymer 17" | | | | |
| Pigment Dispersion 22" | Copolymer 18" | | | | |
| Pigment Dispersion 23" | Copolymer 19" | | | | |
| Pigment Dispersion 24" | Copolymer 20" | | | | |
| Pigment Dispersion 25" | Copolymer 21" | | | | |
| Pigment Dispersion 26" | Copolymer 22" | | | | |
| Pigment Dispersion 27" | Copolymer 23" | | | | |
| Pigment Dispersion 28" | Copolymer 24" | | | | |
| Pigment Dispersion 29" | Copolymer 25" | | | | |
| Pigment Dispersion 30" | Copolymer 26" | | | | |
| Pigment Dispersion 31" | Copolymer 27" | | | | |
| Pigment Dispersion 32" | Copolymer 28" | | | | |
| Hydro-soluble solvent | Glycerin | 10 | 10 | 10 | 10 |
| | 1,3-butanediol | 20 | 20 | 20 | 20 |
| | Trimethylol Propane | | | | |
| | 2-pyrrolidone | | | | |
| | Distilled Water | Balance | Balance | Balance | Balance |
| | Total | 100 | 100 | 100 | 100 |

(4)

| | | Example | | | |
|---|---|---|---|---|---|
| | | 13" | 14" | 15" | 16" |
| Pigment Dispersion 1" | Copolymer 1" | | | | |
| Pigment Dispersion 2" | [*] | | | | |
| Pigment Dispersion 3" | Copolymer 1" | | | | |
| Pigment Dispersion 4" | Copolymer 1" | | | | |
| Pigment Dispersion 5" | Copolymer 1' | | | | |
| Pigment Dispersion 6" | Copolymer 2" | | | | |
| Pigment Dispersion 7" | Copolymer 3" | | | | |
| Pigment Dispersion 8" | Copolymer 4" | | | | |
| Pigment Dispersion 9" | Copolymer 5" | | | | |
| Pigment Dispersion 10" | Copolymer 6" | | | | |
| Pigment Dispersion 11" | Copolymer 7" | 50 | | | |
| Pigment Dispersion 12" | Copolymer 8" | | 50 | | |
| Pigment Dispersion 13" | Copolymer 9" | | | 50 | |
| Pigment Dispersion 14" | Copolymer 10" | | | | 50 |
| Pigment Dispersion 15" | Copolymer 11" | | | | |
| Pigment Dispersion 16" | Copolymer 12" | | | | |

TABLE 15-continued

|  |  | (5) |  |  |  |
|---|---|---|---|---|---|
|  |  | _____ Example _____ | | | |
|  |  | 17″ | 18″ | 19″ | 20″ |
| Pigment Dispersion 17″ | Copolymer 13″ | | | | |
| Pigment Dispersion 18″ | Copolymer 14″ | | | | |
| Pigment Dispersion 19″ | Copolymer 15″ | | | | |
| Pigment Dispersion 20″ | Copolymer 16″ | | | | |
| Pigment Dispersion 21″ | Copolymer 17″ | | | | |
| Pigment Dispersion 22″ | Copolymer 18″ | | | | |
| Pigment Dispersion 23″ | Copolymer 19″ | | | | |
| Pigment Dispersion 24″ | Copolymer 20″ | | | | |
| Pigment Dispersion 25″ | Copolymer 21″ | | | | |
| Pigment Dispersion 26″ | Copolymer 22″ | | | | |
| Pigment Dispersion 27″ | Copolymer 23″ | | | | |
| Pigment Dispersion 28″ | Copolymer 24″ | | | | |
| Pigment Dispersion 29″ | Copolymer 25″ | | | | |
| Pigment Dispersion 30″ | Copolymer 26″ | | | | |
| Pigment Dispersion 31″ | Copolymer 27″ | | | | |
| Pigment Dispersion 32″ | Copolymer 28″ | | | | |
| Hydro-soluble solvent | Glycerin | 10 | 10 | 10 | 10 |
|  | 1,3-butanediol | 20 | 20 | 20 | 20 |
|  | Trimethylol Propane | | | | |
|  | 2-pyrrolidone | | | | |
|  | Distilled Water | Balance | Balance | Balance | Balance |
|  | Total | 100 | 100 | 100 | 100 |

|  |  | (5) |  |  |  |
|---|---|---|---|---|---|
|  |  | _____ Example _____ | | | |
|  |  | 17″ | 18″ | 19″ | 20″ |
| Pigment Dispersion 1″ | Copolymer 1″ | | | | |
| Pigment Dispersion 2″ | [*] | | | | |
| Pigment Dispersion 3″ | Copolymer 1″ | | | | |
| Pigment Dispersion 4″ | Copolymer 1″ | | | | |
| Pigment Dispersion 5″ | Copolymer 1′ | | | | |
| Pigment Dispersion 6″ | Copolymer 2″ | | | | |
| Pigment Dispersion 7″ | Copolymer 3″ | | | | |
| Pigment Dispersion 8″ | Copolymer 4″ | | | | |
| Pigment Dispersion 9″ | Copolymer 5″ | | | | |
| Pigment Dispersion 10″ | Copolymer 6″ | | | | |
| Pigment Dispersion 11″ | Copolymer 7″ | | | | |
| Pigment Dispersion 12″ | Copolymer 8″ | | | | |
| Pigment Dispersion 13″ | Copolymer 9″ | | | | |
| Pigment Dispersion 14″ | Copolymer 10″ | | | | |
| Pigment Dispersion 15″ | Copolymer 11″ | 50 | | | |
| Pigment Dispersion 16″ | Copolymer 12″ | | 50 | | |
| Pigment Dispersion 17″ | Copolymer 13″ | | | 50 | |
| Pigment Dispersion 18″ | Copolymer 14″ | | | | 50 |
| Pigment Dispersion 19″ | Copolymer 15″ | | | | |
| Pigment Dispersion 20″ | Copolymer 16″ | | | | |
| Pigment Dispersion 21″ | Copolymer 17″ | | | | |
| Pigment Dispersion 22″ | Copolymer 18″ | | | | |
| Pigment Dispersion 23″ | Copolymer 19″ | | | | |
| Pigment Dispersion 24″ | Copolymer 20″ | | | | |
| Pigment Dispersion 25″ | Copolymer 21″ | | | | |
| Pigment Dispersion 26″ | Copolymer 22″ | | | | |
| Pigment Dispersion 27″ | Copolymer 23″ | | | | |
| Pigment Dispersion 28″ | Copolymer 24″ | | | | |
| Pigment Dispersion 29″ | Copolymer 25″ | | | | |
| Pigment Dispersion 30″ | Copolymer 26″ | | | | |
| Pigment Dispersion 31″ | Copolymer 27″ | | | | |
| Pigment Dispersion 32″ | Copolymer 28″ | | | | |
| Hydro-soluble solvent | Glycerin | 10 | 10 | 10 | 10 |
|  | 1,3-butanediol | 20 | 20 | 20 | 20 |
|  | Trimethylol Propane | | | | |
|  | 2-pyrrolidone | | | | |
|  | Distilled Water | Balance | Balance | Balance | Balance |
|  | Total | 100 | 100 | 100 | 100 |

|  |  | (6) |  |  |  |
|---|---|---|---|---|---|
|  |  | _____ Example _____ | | | |
|  |  | 21″ | 22″ | 23″ | 24″ |
| Pigment Dispersion 1″ | Copolymer 1″ | | | | |
| Pigment Dispersion 2″ | [*] | | | | |
| Pigment Dispersion 3″ | Copolymer 1″ | | | | |
| Pigment Dispersion 4″ | Copolymer 1″ | | | | |

TABLE 15-continued

| | | | | | |
|---|---|---|---|---|---|
| Pigment Dispersion 5" | Copolymer 1' | | | | |
| Pigment Dispersion 6" | Copolymer 2" | | | | |
| Pigment Dispersion 7" | Copolymer 3" | | | | |
| Pigment Dispersion 8" | Copolymer 4" | | | | |
| Pigment Dispersion 9" | Copolymer 5" | | | | |
| Pigment Dispersion 10" | Copolymer 6" | | | | |
| Pigment Dispersion 11" | Copolymer 7" | | | | |
| Pigment Dispersion 12" | Copolymer 8" | | | | |
| Pigment Dispersion 13" | Copolymer 9" | | | | |
| Pigment Dispersion 14" | Copolymer 10" | | | | |
| Pigment Dispersion 15" | Copolymer 11" | | | | |
| Pigment Dispersion 16" | Copolymer 12" | | | | |
| Pigment Dispersion 17" | Copolymer 13" | | | | |
| Pigment Dispersion 18" | Copolymer 14" | | | | |
| Pigment Dispersion 19" | Copolymer 15" | 50 | | | |
| Pigment Dispersion 20" | Copolymer 16" | | 50 | | |
| Pigment Dispersion 21" | Copolymer 17" | | | 50 | |
| Pigment Dispersion 22" | Copolymer 18" | | | | 50 |
| Pigment Dispersion 23" | Copolymer 19" | | | | |
| Pigment Dispersion 24" | Copolymer 20" | | | | |
| Pigment Dispersion 25" | Copolymer 21" | | | | |
| Pigment Dispersion 26" | Copolymer 22" | | | | |
| Pigment Dispersion 27" | Copolymer 23" | | | | |
| Pigment Dispersion 28" | Copolymer 24" | | | | |
| Pigment Dispersion 29" | Copolymer 25" | | | | |
| Pigment Dispersion 30" | Copolymer 26" | | | | |
| Pigment Dispersion 31" | Copolymer 27" | | | | |
| Pigment Dispersion 32" | Copolymer 28" | | | | |
| Hydro-soluble solvent | Glycerin | 10 | 10 | 10 | 10 |
| | 1,3-butanediol | 20 | 20 | 20 | 20 |
| | Trimethylol Propane | | | | |
| | 2-pyrrolidone | | | | |
| | Distilled Water | Balance | Balance | Balance | Balance |
| | Total | 100 | 100 | 100 | 100 |

(7)

| | | Example | | | |
|---|---|---|---|---|---|
| | | 25" | 26" | 27" | 28" |
| Pigment Dispersion 1" | Copolymer 1" | | | | |
| Pigment Dispersion 2" | [*] | | | | |
| Pigment Dispersion 3" | Copolymer 1" | | | | |
| Pigment Dispersion 4" | Copolymer 1" | | | | |
| Pigment Dispersion 5" | Copolymer 1' | | | | |
| Pigment Dispersion 6" | Copolymer 2" | | | | |
| Pigment Dispersion 7" | Copolymer 3" | | | | |
| Pigment Dispersion 8" | Copolymer 4" | | | | |
| Pigment Dispersion 9" | Copolymer 5" | | | | |
| Pigment Dispersion 10" | Copolymer 6" | | | | |
| Pigment Dispersion 11" | Copolymer 7" | | | | |
| Pigment Dispersion 12" | Copolymer 8" | | | | |
| Pigment Dispersion 13" | Copolymer 9" | | | | |
| Pigment Dispersion 14" | Copolymer 10" | | | | |
| Pigment Dispersion 15" | Copolymer 11" | | | | |
| Pigment Dispersion 16" | Copolymer 12" | | | | |
| Pigment Dispersion 17" | Copolymer 13" | | | | |
| Pigment Dispersion 18" | Copolymer 14" | | | | |
| Pigment Dispersion 19" | Copolymer 15" | | | | |
| Pigment Dispersion 20" | Copolymer 16" | | | | |
| Pigment Dispersion 21" | Copolymer 17" | | | | |
| Pigment Dispersion 22" | Copolymer 18" | | | | |
| Pigment Dispersion 23" | Copolymer 19" | 50 | | | |
| Pigment Dispersion 24" | Copolymer 20" | | 50 | | |
| Pigment Dispersion 25" | Copolymer 21" | | | 50 | |
| Pigment Dispersion 26" | Copolymer 22" | | | | 50 |
| Pigment Dispersion 27" | Copolymer 23" | | | | |
| Pigment Dispersion 28" | Copolymer 24" | | | | |
| Pigment Dispersion 29" | Copolymer 25" | | | | |
| Pigment Dispersion 30" | Copolymer 26" | | | | |
| Pigment Dispersion 31" | Copolymer 27" | | | | |
| Pigment Dispersion 32" | Copolymer 28" | | | | |

TABLE 15-continued (7)

| | | Example | | | |
|---|---|---|---|---|---|
| | | | | | |

| | | | | | | |
|---|---|---|---|---|---|---|
| Hydro-soluble solvent | Glycerin | 10 | 10 | 10 | 10 |
| | 1,3-butanediol | 20 | 20 | 20 | 20 |
| | Trimethylol Propane | | | | |
| | 2-pyrrolidone | | | | |
| | Distilled Water | Balance | Balance | Balance | Balance |
| | Total | 100 | 100 | 100 | 100 |

(8)

| | | Example | Com. Example | | |
|---|---|---|---|---|---|
| | | 29" | 1" | 2" | 3" |
| Pigment Dispersion 1" | Copolymer 1" | | | | |
| Pigment Dispersion 2" | [*] | | | | |
| Pigment Dispersion 3" | Copolymer 1" | | | | |
| Pigment Dispersion 4" | Copolymer 1" | | | | |
| Pigment Dispersion 5" | Copolymer 1' | | | | |
| Pigment Dispersion 6" | Copolymer 2" | | | | |
| Pigment Dispersion 7" | Copolymer 3" | | | | |
| Pigment Dispersion 8" | Copolymer 4" | | | | |
| Pigment Dispersion 9" | Copolymer 5" | | | | |
| Pigment Dispersion 10" | Copolymer 6" | | | | |
| Pigment Dispersion 11" | Copolymer 7" | | | | |
| Pigment Dispersion 12" | Copolymer 8" | | | | |
| Pigment Dispersion 13" | Copolymer 9" | | | | |
| Pigment Dispersion 14" | Copolymer 10" | | | | |
| Pigment Dispersion 15" | Copolymer 11" | | | | |
| Pigment Dispersion 16" | Copolymer 12" | | | | |
| Pigment Dispersion 17" | Copolymer 13" | | | | |
| Pigment Dispersion 18" | Copolymer 14" | | | | |
| Pigment Dispersion 19" | Copolymer 15" | | | | |
| Pigment Dispersion 20" | Copolymer 16" | | | | |
| Pigment Dispersion 21" | Copolymer 17" | | | | |
| Pigment Dispersion 22" | Copolymer 18" | | | | |
| Pigment Dispersion 23" | Copolymer 19" | | | | |
| Pigment Dispersion 24" | Copolymer 20" | | | | |
| Pigment Dispersion 25" | Copolymer 21" | | | | |
| Pigment Dispersion 26" | Copolymer 22" | | | | |
| Pigment Dispersion 27" | Copolymer 23" | 50 | | | |
| Pigment Dispersion 28" | Copolymer 24" | | 50 | | |
| Pigment Dispersion 29" | Copolymer 25" | | | 50 | |
| Pigment Dispersion 30" | Copolymer 26" | | | | 50 |
| Pigment Dispersion 31" | Copolymer 27" | | | | |
| Pigment Dispersion 32" | Copolymer 28" | | | | |
| Hydro-soluble solvent | Glycerin | 10 | 10 | 10 | 10 |
| | 1,3-butanediol | 20 | 20 | 20 | 20 |
| | Trimethylol Propane | | | | |
| | 2-pyrrolidone | | | | |
| | Distilled Water | Balance | Balance | Balance | Balance |
| | Total | 100 | 100 | 100 | 100 |

(9)

| | | Com. Example | |
|---|---|---|---|
| | | 4" | 5" |
| Pigment Dispersion 1" | Copolymer 1" | | |
| Pigment Dispersion 2" | [*] | | |
| Pigment Dispersion 3" | Copolymer 1" | | |
| Pigment Dispersion 4" | Copolymer 1" | | |
| Pigment Dispersion 5" | Copolymer 1' | | |
| Pigment Dispersion 6" | Copolymer 2" | | |
| Pigment Dispersion 7" | Copolymer 3" | | |
| Pigment Dispersion 8" | Copolymer 4" | | |
| Pigment Dispersion 9" | Copolymer 5" | | |
| Pigment Dispersion 10" | Copolymer 6" | | |
| Pigment Dispersion 11" | Copolymer 7" | | |
| Pigment Dispersion 12" | Copolymer 8" | | |
| Pigment Dispersion 13" | Copolymer 9" | | |
| Pigment Dispersion 14" | Copolymer 10" | | |
| Pigment Dispersion 15" | Copolymer 11" | | |
| Pigment Dispersion 16" | Copolymer 12" | | |
| Pigment Dispersion 17" | Copolymer 13" | | |
| Pigment Dispersion 18" | Copolymer 14" | | |
| Pigment Dispersion 19" | Copolymer 15" | | |
| Pigment Dispersion 20" | Copolymer 16" | | |

TABLE 15-continued

| | | | |
|---|---|---|---|
| Pigment Dispersion 21" | Copolymer 17" | | |
| Pigment Dispersion 22" | Copolymer 18" | | |
| Pigment Dispersion 23" | Copolymer 19" | | |
| Pigment Dispersion 24" | Copolymer 20" | | |
| Pigment Dispersion 25" | Copolymer 21" | | |
| Pigment Dispersion 26" | Copolymer 22" | | |
| Pigment Dispersion 27" | Copolymer 23" | | |
| Pigment Dispersion 28" | Copolymer 24" | | |
| Pigment Dispersion 29" | Copolymer 25" | | |
| Pigment Dispersion 30" | Copolymer 26" | | |
| Pigment Dispersion 31" | Copolymer 27" | 50 | |
| Pigment Dispersion 32" | Copolymer 28" | | |
| Hydro-soluble solvent | Glycerin | 10 | 10 |
| | 1,3-butanediol | 20 | 20 |
| | Trimethylol Propane | | |
| | 2-pyrrolidone | | |
| | Distilled Water | Balance | Balance |
| Total | | 100 | 100 |

Properties of the pigment dispersions 1" to 32" and the inks of Examples 1" to 29" and Comparative Examples 1" to 5" were measured and evaluated as they were in Table 4. The results are shown in Table 16.

TABLE 16

(1)

| | Pigment Dispersion | Image Density OD Value | Image Density Rank | Strike-Through Density OD Value | Strike-Through Density Rank |
|---|---|---|---|---|---|
| Example 1" | 1" | 1.38 | Excellent | 0.06 | Excellent |
| Example 2" | 1" | 1.35 | Excellent | 0.07 | Excellent |
| Example 3" | 1" | 1.36 | Excellent | 0.07 | Excellent |
| Example 4" | 2" | 1.28 | Good | 0.08 | Excellent |
| Example 5" | 3" | 1.09 | Excellent | 0.08 | Excellent |
| Example 6" | 4" | 0.98 | Excellent | 0.07 | Excellent |
| Example 7" | 5" | 0.86 | Excellent | 0.06 | Excellent |
| Example 8" | 6" | 1.30 | Excellent | 0.10 | Good |
| Example 9" | 7" | 1.35 | Excellent | 0.06 | Excellent |
| Example 10" | 8" | 1.37 | Excellent | 0.06 | Excellent |
| Example 11" | 9" | 1.36 | Excellent | 0.08 | Excellent |
| Example 12" | 10" | 1.37 | Excellent | 0.07 | Excellent |
| Example 13" | 11" | 1.37 | Excellent | 0.07 | Excellent |
| Example 14" | 12" | 1.38 | Excellent | 0.06 | Excellent |
| Example 15" | 13" | 1.37 | Excellent | 0.08 | Excellent |
| Example 16" | 14" | 1.28 | Good | 0.09 | Excellent |
| Example 17" | 15" | 1.23 | Good | 0.10 | Excellent |
| Example 18" | 16" | 1.33 | Excellent | 0.08 | Excellent |
| Example 19" | 17" | 1.38 | Excellent | 0.09 | Good |
| Example 20" | 18" | 1.38 | Excellent | 0.08 | Excellent |
| Example 21" | 19" | 1.39 | Excellent | 0.07 | Excellent |
| Example 22" | 20" | 1.40 | Excellent | 0.06 | Excellent |
| Example 23" | 21" | 1.39 | Excellent | 0.06 | Excellent |
| Example 24" | 22" | 1.38 | Excellent | 0.06 | Excellent |
| Example 25" | 23" | 1.29 | Good | 0.08 | Excellent |
| Example 26" | 24" | 1.25 | Good | 0.10 | Good |
| Example 27" | 25" | 1.32 | Excellent | 0.08 | Excellent |
| Example 28" | 26" | 1.22 | Good | 0.11 | Good |
| Example 29" | 27" | 1.30 | Excellent | 0.07 | Excellent |
| Comparative Example 1" | 28" | 1.01 | Poor | 0.45 | Fair |
| Comparative Example 2" | 29" | 1.02 | Poor | 0.50 | Poor |
| Comparative Example 3" | 30" | 0.90 | Poor | 0.60 | Poor |
| Comparative Example 4" | 31" | 0.80 | Poor | 0.60 | Poor |
| Comparative Example 5" | 32" | 0.90 | Poor | 0.70 | Poor |

(2)

| | | Evaluation Result | | | |
|---|---|---|---|---|---|
| | | Pigment Dispersion | | Ink | |
| | Pigment Dispersion | Initial Viscosity | Storage Stability | Initial Viscosity | Storage Stability |
| Example 1" | 1" | Excellent | Excellent | Excellent | Excellent |
| Example 2" | 1" | Excellent | Excellent | Excellent | Good |
| Example 3" | 1" | Excellent | Excellent | Excellent | Excellent |
| Example 4" | 2" | Excellent | Excellent | Excellent | Excellent |
| Example 5" | 3" | Excellent | Excellent | Excellent | Excellent |
| Example 6" | 4" | Excellent | Excellent | Excellent | Excellent |
| Example 7" | 5" | Excellent | Excellent | Excellent | Excellent |
| Example 8" | 6" | Excellent | Excellent | Excellent | Excellent |
| Example 9" | 7" | Excellent | Excellent | Excellent | Excellent |
| Example 10" | 8" | Excellent | Good | Excellent | Good |
| Example 11" | 9" | Excellent | Excellent | Excellent | Good |
| Example 12" | 10" | Excellent | Excellent | Excellent | Good |
| Example 13" | 11" | Excellent | Excellent | Excellent | Good |
| Example 14" | 12" | Excellent | Excellent | Excellent | Good |
| Example 15" | 13" | Excellent | Excellent | Excellent | Excellent |
| Example 16" | 14" | Excellent | Good | Excellent | Good |
| Example 17" | 15" | Excellent | Good | Excellent | Good |
| Example 18" | 16" | Excellent | Excellent | Excellent | Excellent |
| Example 19" | 17" | Excellent | Good | Good | Good |
| Example 20" | 18" | Good | Good | Good | Good |
| Example 21" | 19" | Excellent | Excellent | Excellent | Excellent |
| Example 22" | 20" | Good | Excellent | Good | Good |
| Example 23" | 21" | Good | Good | Good | Good |
| Example 24" | 22" | Excellent | Excellent | Excellent | Excellent |
| Example 25" | 23" | Good | Excellent | Good | Excellent |
| Example 26" | 24" | Good | Excellent | Good | Excellent |
| Example 27" | 25" | Excellent | Excellent | Excellent | Excellent |
| Example 28" | 26" | Excellent | Good | Good | Good |
| Example 29" | 27" | Good | Good | Good | Good |
| Comparative Example 1" | 28" | Poor | Fair | Poor | Fair |
| Comparative Example 2" | 29" | Poor | Fair | Poor | Fair |
| Comparative Example 3" | 30" | Poor | Fair | Poor | Poor |
| Comparative Example 4" | 31" | Poor | Fair | Poor | Poor |
| Comparative Example 5" | 32" | Poor | Fair | Poor | Poor |

Having now fully described the invention, it will be apparent to one of ordinary skill in the art that many changes and modifications can be made thereto without departing from the spirit and scope of the invention as set forth therein.

What is claimed is:

1. An ink for inkjet recording, comprising:
water;
a hydrosoluble solvent;
a pigment; and
a copolymer comprising a phosphonic acid group;
wherein the copolymer comprising a phosphonic acid group comprises structural units having the following formulae (1) and (2):

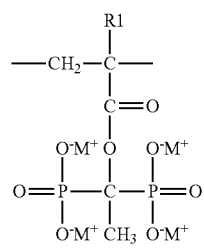
(1)

wherein R1 represents a hydrogen atom or a methyl group; and M represents a hydrogen atom, an alkali metal or an organic ammonium; and

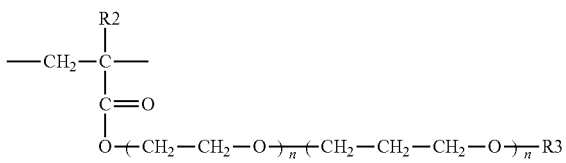
(2)

wherein R2 represents a hydrogen atom or a methyl group; R3 represents an alkyl group having 1 to 4 carbon atoms; and each of n and m represents 0 or an integer of from 1 to 30, provided n+m is from 2 to 30.

2. The ink for inkjet recording of claim 1, wherein the copolymer comprising a phosphonic acid group is synthesized from monomers having the following formulae (3) and (4) as starting materials respectively:

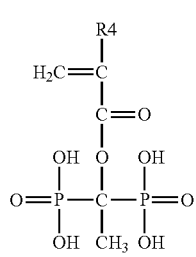
(3)

wherein R4 represents a hydrogen atom or a methyl group;

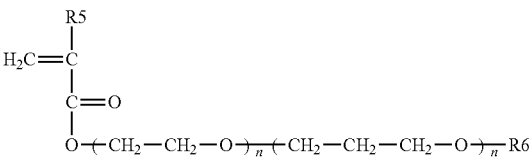
(4)

wherein R5 represents a hydrogen atom or a methyl group; R6 represents an alkyl group having 1 to 4 carbon atoms; and each of n and m represents 0 or an integer of from 1 to 30, provided n+m is from 2 to 30.

3. The ink for inkjet recording of claim 1, wherein the copolymer comprising a phosphonic acid group comprises a structural unit having any one of the following formulae (5) to (9):

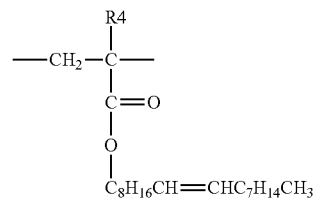
(5)

wherein R4 represents a hydrogen atom or a methyl group;

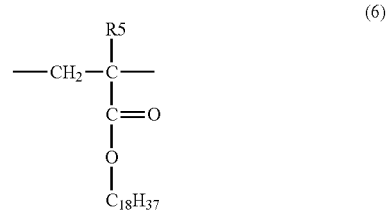
(6)

wherein R5 represents a hydrogen atom or a methyl group;

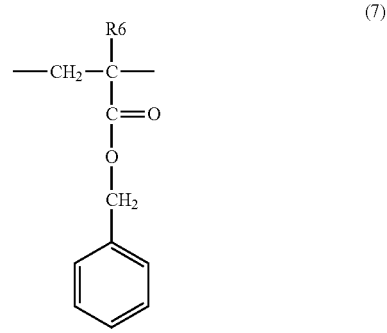
(7)

wherein R6 represents a hydrogen atom or a methyl group;

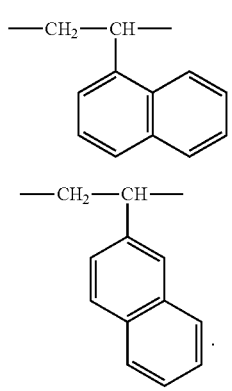

(8)

(9)

4. The ink for inkjet recording of claim 1, wherein the structural unit having the formula (1) is a structural unit having the following formula (10):

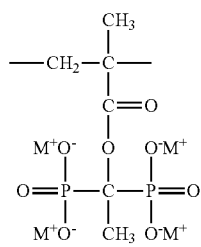

(10)

wherein M represents a hydrogen atom, an alkali metal or an organic ammonium.

5. The ink for inkjet recording of claim 1, wherein n is 9 and m is 0 in the structural unit having the formula (2).

6. The ink for inkjet recording of claim 1, wherein the structural unit having the formula (6) or (7) is a structural unit having the following formula (11) or (12):

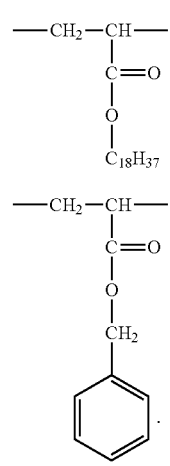

(11)

(12)

7. The ink for inkjet recording of claim 1, wherein the copolymer comprising a phosphonic acid group is synthesized from monomers having the formula (3), (4) and any one of the following formulae (13) to (17) as starting materials respectively:

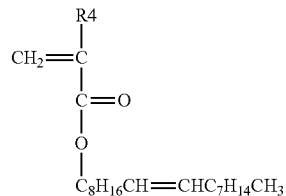

(13)

wherein R4 represents a hydrogen atom or a methyl group;

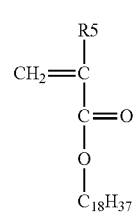

(12)

wherein R5 represents a hydrogen atom or a methyl group;

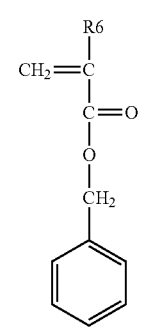

(13)

wherein R6 represents a hydrogen atom or a methyl group;

(14)

(15)

8. The ink for inkjet recording of claim 1, wherein the copolymer comprises the structural unit having the formula (1) in an amount of from 10 to 60% by weight.

9. The ink for inkjet recording of claim 1, wherein an aqueous solution or an aqueous dispersion comprising the copolymer in an amount of 10% by weight has a viscosity of from 1.5 to 30.0 mPa·s at 25° C.

10. The ink for inkjet recording of claim 1, wherein the copolymer has a weight-average molecular weight of from 2000 to 50000.

11. The ink for inkjet recording of claim 1, wherein M is a hydrogen atom, a potassium atom or a sodium atom.

12. The ink for inkjet recording of claim 1, wherein M comprises a hydrogen atom in an amount not greater than 30% by number.

13. The ink for inkjet recording of claim 1, wherein the hydrosoluble solvent comprises glycerin.

14. The ink for inkjet recording of claim 1, wherein the copolymer is included as a dispersant in a pigment dispersion.

15. The ink for inkjet recording of claim 14, wherein the pigment dispersion comprises the copolymer in an amount of from 10 to 100 parts by weight per 100 parts by weight of the pigment.

16. An ink cartridge, comprising a cartridge containing the ink according to claim 1.

17. An inkjet recorder, comprising:
   a recording head; and
   flyer configured to fly the ink according to claim 1 from the recording head to record an image on a recording medium.

18. An ink-recorded matter having information or an image recorded by the ink according to claim 1.

\* \* \* \* \*